US009573771B2

(12) United States Patent
Papsdorf et al.

(10) Patent No.: US 9,573,771 B2
(45) Date of Patent: Feb. 21, 2017

(54) SYSTEMS, APPARATUS, AND METHODS FOR GROUPING ARTICLES INTO ARRAYS OF VARIOUS CONFIGURATIONS

(71) Applicant: The Procter & Gamble Company, Cincinnati, OH (US)

(72) Inventors: Clifford Theodore Papsdorf, Loveland, OH (US); Jason Lee Debruler, West Chester, OH (US); Rodney Alan Holloway, Mariemont, OH (US); Geoffrey John Kerr, Geneva (CH)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/734,252

(22) Filed: Jun. 9, 2015

(65) Prior Publication Data
US 2016/0362254 A1 Dec. 15, 2016

(51) Int. Cl.
*B65B 35/54* (2006.01)
*B65B 35/56* (2006.01)
*B65G 47/08* (2006.01)
*B65G 47/26* (2006.01)

(52) U.S. Cl.
CPC ................. *B65G 47/266* (2013.01)

(58) Field of Classification Search
CPC ......... B65B 35/54; B65B 35/56; B65G 47/08; B65G 47/26
USPC ......... 198/418.5, 418.6, 418.7, 419.2, 419.3, 198/426, 427, 431, 459.1, 461.1
See application file for complete search history.

(56) References Cited

U.S. PATENT DOCUMENTS

| 4,199,050 A | 4/1980 | Moller |
| 4,718,540 A | 1/1988 | Greenwell |
| 4,768,642 A | 9/1988 | Hunter |

(Continued)

FOREIGN PATENT DOCUMENTS

JP  2006264737  10/2006

OTHER PUBLICATIONS

U.S. Appl. No. 14/734,270, filed Jun. 9, 2015, Papsdorf et al.
(Continued)

*Primary Examiner* — Douglas Hess
(74) *Attorney, Agent, or Firm* — Lauren Christine Gonzalez; Abbey A. Lopez; Gary J. Foose

(57) ABSTRACT

An article grouping system capable of forming arrays of articles having a variable number of rows and lanes is included. The article grouping system includes an infeed carrier apparatus having an infeed carrier surface that is movable in a first direction and an outfeed carrier apparatus having an outfeed carrier surface that is movable in a second direction. A grouping apparatus comprising a plurality of carriages and a carriage drive mechanism operatively connected with each carriage. The carriage drive mechanism causes each carriage to independently move in a third direction from an article receiving zone adjacent to the infeed carrier apparatus to an article discharge zone adjacent to the outfeed carrier apparatus. A transfer apparatus includes a frame and an article stabilization member operatively connected with the frame. The article stabilization member moves from an engaging location in the article discharge zone to a disengaging location.

20 Claims, 33 Drawing Sheets

(56) References Cited

U.S. PATENT DOCUMENTS

| | | | | |
|---|---|---|---|---|
| 4,887,414 | A * | 12/1989 | Arena | B65B 21/24 198/418.7 |
| 4,982,553 | A | 1/1991 | Itoh | |
| 5,174,430 | A * | 12/1992 | Ebira | B65G 47/648 198/418.5 |
| 5,203,444 | A * | 4/1993 | Munch | B65G 47/088 198/418.7 |
| 5,282,530 | A | 2/1994 | Neri | |
| 5,551,550 | A * | 9/1996 | Marshall | B65G 47/82 198/419.3 |
| 5,799,770 | A | 9/1998 | Radewagen | |
| 5,897,291 | A | 4/1999 | Gerwe et al. | |
| 6,082,523 | A | 7/2000 | Weeks | |
| 6,164,045 | A * | 12/2000 | Focke | B65B 5/105 198/429 |
| 6,260,689 | B1 | 7/2001 | Takemoto et al. | |
| 6,283,694 | B1 | 9/2001 | Spatafora et al. | |
| 6,889,485 | B2 * | 5/2005 | Davaillon | B65B 21/06 198/418.7 |
| 6,923,307 | B2 * | 8/2005 | Haan | B65G 47/261 198/347.4 |
| 7,000,755 | B2 * | 2/2006 | van Pinxteren | B65G 47/842 198/374 |
| 7,222,716 | B2 * | 5/2007 | Peterman | B65B 35/405 198/418.6 |
| 7,518,079 | B2 * | 4/2009 | Spangenberg Hansen | B07C 5/10 209/576 |
| 8,096,404 | B2 * | 1/2012 | Eschlbeck | B65G 1/1378 198/427 |
| 8,113,335 | B2 * | 2/2012 | Aronsson | B65G 47/841 198/419.2 |
| 8,167,113 | B2 * | 5/2012 | Mougin | B65G 47/82 198/370.07 |
| 8,448,776 | B2 | 5/2013 | Papsdorf et al. | |
| 8,448,777 | B2 * | 5/2013 | Pazdernik | B65G 47/088 198/418.6 |
| 8,485,342 | B2 * | 7/2013 | Mougin | B65G 47/082 198/370.07 |
| 8,612,050 | B2 * | 12/2013 | Lee | B65B 35/44 198/411 |
| 8,714,904 | B2 | 5/2014 | Michels | |
| 8,776,984 | B2 | 7/2014 | Monti | |
| 8,820,513 | B2 * | 9/2014 | Papsdorf | A61F 13/15764 198/470.1 |
| 9,016,476 | B2 * | 4/2015 | Bauer | B07C 5/00 209/2 |
| 2001/0050209 | A1 | 12/2001 | Takemoto et al. | |
| 2007/0068121 | A1 | 3/2007 | Mate et al. | |
| 2010/0193326 | A1 | 8/2010 | Mougin et al. | |
| 2011/0036684 | A1 | 2/2011 | Bonnain | |
| 2011/0173930 | A1 | 7/2011 | Poutot | |
| 2012/0273324 | A1 | 11/2012 | Mougin et al. | |
| 2014/0059976 | A1 | 3/2014 | Raudat et al. | |

OTHER PUBLICATIONS

U.S. Appl. No. 14/734,283, filed Jun. 9, 2015, Papsdorf et al.
U.S. Appl. No. 14/734,303, filed Jun. 9, 2015, Papsdorf et al.
U.S. Appl. No. 14/734,324, filed Jun. 9, 2015, Papsdorf et al.
U.S. Appl. No. 14/734,345, filed Jun. 9, 2015, Papsdorf et al.
Non-Final Office Action for U.S. Appl. No. 14/734,270, mailed Jul. 12, 2016, 9 pages.
Non-Final Office Action for U.S. Appl. No. 14/734,283, mailed Jul. 26, 2016, 7 pages.
International Search Report for Application Serial No. PCT/US2016/036118, mailed Sep. 27, 2016, 11 pages.
International Search Report for Application Serial No. PCT/US2016/036119, mailed Sep. 14, 2016, 11 pages.
International Search Report for Application Serial No. PCT/US2016/036120, mailed Aug. 22, 2016, 11 pages.

* cited by examiner

SYSTEMS, APPARATUS, AND METHODS FOR GROUPING ARTICLES INTO ARRAYS OF VARIOUS CONFIGURATIONS

FIELD

The present disclosure is directed to apparatuses, systems, and methods for grouping articles, and, more particularly, to apparatuses, systems, and methods for grouping articles of various sizes and shapes into arrays of articles of various configurations.

BACKGROUND

Articles such as consumer products, including cleaning and personal care compositions, may be packaged in a primary package, in the form of semi-rigid or rigid containers, for example. A plurality of primary packages containing the consumer products may be grouped and packaged in an outer, secondary package such as a carton, bundle, case, or display case to be shipped to a retail store or directly to a consumer. Systems and methods for packaging consumer products may include filling the consumer product into a primary package, capping the primary package, grouping a plurality of primary packages, and finally packing the group of primary packages into secondary packaging. Once primary packages are filled and capped, the primary packages may advance to a secondary packaging system.

Instability of primary packages can cause problems in conventional secondary packaging systems. Certain primary packages are inherently unstable due to, for example, the overall shape, shape of a base of the primary package, a high center of gravity of the primary package, or the minimal weight of the secondary package even with product contained therein. Secondary packaging systems may include an infeed carrier apparatus such as a conveyor that is configured to advance a plurality of primary packages in a first machine direction to be arranged into a group and finally packaged in a secondary package. A plurality of primary packages may advance on the infeed carrier in an upright configuration with a base of the primary packages resting on an outer surface of the infeed carrier. The primary packages may be unrestricted from movement relative to adjacent primary packages, which can result in adjacent primary packages colliding, and sometimes, falling over. The external surface geometry of certain primary packages are not compatible with contacting adjacent primary packages. Contact between such primary packages can result in primary packages being knocked over or can cause the primary packages to twist or shingle. Some primary package shapes are so unstable that such primary packages are often not commercialized in order to avoid such issues in the packaging process.

Conventional secondary packaging systems are often configured to handle primary packages of a particular size and shape. In addition, conventional secondary packaging systems are often configured for making groups of articles having a predetermined number of articles arranged in a particular configuration. For example, some sorting mechanisms include diverters for separating primary packages into single-file lanes to form multiple groups of primary packages. The diverters may be sized and/or arranged for primary packages of predetermined sizes or shapes. Moreover, the diverters may be arranged to sort the primary packages into a predetermined number of single-file lanes. In order to use the same secondary packaging system to package primary packages of different shapes and/or sizes, the diverters may need to be replaced with diverters of different sizes or rearranged in order to create different size groups. Thus, in order to package primary packages of different sizes and shapes and to create various different configurations of primary packages, multiple changeover parts may be needed and the secondary packaging system may need to be reconfigured. This adds time and cost to the secondary packaging operation.

Another issue with conventional secondary packaging systems is that they may have to be run at relatively slow speeds in order to maintain control of the primary packages. If run at higher speeds, the primary packages may become instable, resulting in primary packages falling over or being improperly arranged into groups. Running secondary packaging systems at slow speeds may cause the secondary packaging system to be the rate limiting process in the overall packaging process, which can decrease the overall throughput rate to the process.

Moreover, another issue associated with secondary packaging systems is that the processing conditions of the secondary packaging system may be dependent on the process conditions in an upstream process. For example, if an article is rejected for failing to meet quality standards, for example, or a primary package falls over and is rejected from the system, the secondary packaging system may have to be stopped or slowed down until the upstream processing conditions are stable or missing bottles are replaced.

Therefore, it would be desirable to provide a system and method that is capable of grouping articles of various shapes and sizes, including articles that are inherently stable and those that are inherently unstable.

It would be beneficial to provide a system and method that is capable of grouping articles of various shapes and sizes into groups of various sizes and configurations with minimal changeover parts and necessary reconfigurations.

It would be beneficial to provide a secondary packaging system and method that is capable of running at relatively high speeds.

It would also be beneficial to provide a system and method of grouping articles that is capable of continuous operation at relatively high speeds even when upstream processing conditions may result in missing articles or a slower infeed rate of articles.

SUMMARY

Aspects of the present disclosure include an article grouping system capable of forming arrays of articles having a variable number of rows and lanes. The article grouping system comprises an infeed carrier apparatus having an infeed carrier surface, wherein the infeed carrier surface is movable in a first direction. The article grouping system comprises an outfeed carrier apparatus having an outfeed carrier surface, wherein the outfeed carrier surface is movable in a second direction. The article grouping system comprises a grouping apparatus comprising a plurality of carriages and a carriage drive mechanism operatively connected with each carriage. Each carriage comprises a base and a plurality of support members operatively connected with the base to define a plurality of article receiving compartments for receiving individual articles. Each article receiving compartment is defined by a compartment width extending between adjacent support members. The carriage drive mechanism causes a carriage to independently move in a third direction from an article receiving zone adjacent to the infeed carrier apparatus to an article discharge zone adjacent to the outfeed carrier apparatus. A portion of the grouping apparatus is positioned intermediate the infeed carrier apparatus and the outfeed carrier apparatus, wherein each carriage is adjustable from a first configuration to a second configuration. In the first configuration the compartment width is defined a first length. In the second configuration the compartment width is defined by a second length, wherein the first length is different from the second length in order to receive articles of different dimensions. The article grouping system comprises a transfer apparatus comprising a frame and an article stabilization member operatively connected with the frame. The article stabilization member moves from an engaging location in the article discharge zone to a variable placement location on the outfeed carrier apparatus and back to the engaging location such that spacing between rows is adjustable.

Aspects of the present disclosure include a method of grouping articles of manufacture into a predetermined array having at least one row and at least one lane, the method including the steps of: a) providing a grouping apparatus comprising a first carriage, a second carriage, a third carriage, and a fourth carriage, wherein the first, second, third, and fourth carriages are operably engaged with the grouping apparatus, wherein the first, second, third, and fourth carriages each have a base and a plurality of support members that combine to define a plurality of article receiving compartments for receiving individual articles, wherein the article receiving compartments are each defined by a compartment width extending in the first direction, wherein the first, second, third, and fourth carriages are configured to advance in a first direction about an endless loop, wherein a portion of the grouping apparatus is positioned between the infeed carrier apparatus and the outfeed carrier apparatus; b) sensing the location of an article on the infeed carrier apparatus; c) indexing the first carriage in the first direction proximate to the infeed carrier apparatus in an article receiving zone to intermittently receive at least one article onto the first carriage, wherein timing of indexing the first carriage in the first direction is based on the position of the most downstream article on the infeed carrier apparatus; d) moving the at least one article on the first carriage in the first direction toward the outfeed carrier apparatus; e) indexing the second carriage in the first direction proximate to the infeed carrier apparatus in the article receiving zone to intermittently load at least one article onto the second carriage, wherein timing of indexing the second carriage in the first direction is based on the position of the most downstream article on the infeed carrier apparatus; f) transporting the at least one article on the second carriage to the outfeed carrier apparatus; g) stopping or decelerating the first carriage proximate to the outfeed carrier apparatus in an article discharge zone; h) stopping or decelerating the second carriage adjacent to the first carriage at the article discharge zone; i) transferring the at least one article from the first and second carriages onto the outfeed carrier apparatus to form a first row of articles, wherein the number of articles in the first row equals the number of lanes in the first row; j) advancing the first row of articles in a second direction on the outfeed carrier apparatus; k) indexing the third carriage in the first direction proximate to the infeed carrier in a receiving zone to intermittently load at least one article onto the third carriage; l) indexing the fourth carriage in the first direction proximate to the infeed carrier apparatus in the article receiving zone to intermittently load at least one article onto the second carriage; and m) transferring the at least one article from the third carriage onto the outfeed carrier apparatus to form a second row of articles adjacent to the first row of articles, wherein the number of articles in the second row equals the number of lanes in the second row, wherein the first and second rows of articles are spaced apart in the second direction by a row spacing.

Aspects of the present disclosure also include a method of grouping a plurality of articles into an array, wherein the plurality of the articles are received from an infeed carrier apparatus in a single lane and discharged onto an outfeed carrier apparatus in multiple lanes, the method comprising the steps of: a) providing a grouping apparatus comprising a first carriage, a second carriage, a third carriage, and a fourth carriage, wherein the first, second, third, and fourth carriages are operably engaged with the grouping apparatus, wherein the first, second, third, and fourth carriages each have a base and a plurality of support members that combine to define a plurality of article receiving compartments for receiving individual articles, wherein the article receiving compartments are each defined by a compartment width extending in the first direction, wherein the first, second, third, and fourth carriages are configured to advance in a first direction about an endless loop, wherein a portion of the grouping apparatus is positioned between the infeed carrier apparatus and the outfeed carrier apparatus; b) sensing the location of an article on the infeed carrier apparatus; c) indexing the first carriage in the first direction proximate to the infeed carrier apparatus in an article receiving zone to intermittently receive at least one article onto the first carriage, wherein timing of indexing the first carriage in the first direction is based on the position of the most downstream article on the infeed carrier apparatus; d) moving the at least one article on the first carriage in the first direction toward the outfeed carrier apparatus; e) indexing the second carriage in the first direction proximate to the infeed carrier apparatus in the article receiving zone to intermittently load at least one article onto the second carriage, wherein timing of indexing the second carriage in the first direction is based on the position of the most downstream article on the infeed carrier apparatus; f) transporting the at least one article on the second carriage to the outfeed carrier apparatus; g) stopping or decelerating the first carriage proximate to the outfeed carrier apparatus in an article discharge zone; h) stopping or decelerating the second carriage adjacent to the first carriage at the article discharge zone; i) transferring the at least one article from the first and second carriages onto the outfeed carrier apparatus to form a first row of articles, wherein the number of articles in the first row equals the number of lanes in the first row; j) advancing the first row of articles in a second direction on the outfeed carrier apparatus; k) indexing the third carriage in the first direction proximate to the infeed carrier in a receiving zone to intermittently load at least one article onto the third carriage; l) indexing the fourth carriage in the first direction proximate to the infeed carrier apparatus in the article receiving zone to intermittently load at least one article onto the second carriage; and m) transferring the at least one article from the third carriage onto the outfeed carrier apparatus to form a second row of articles adjacent to the first row of articles, wherein the number of articles in the second row equals the number of lanes in the second row, wherein the first and second rows of articles are spaced apart in the second direction by a row spacing.

DETAILED DESCRIPTION

Figure 1A:
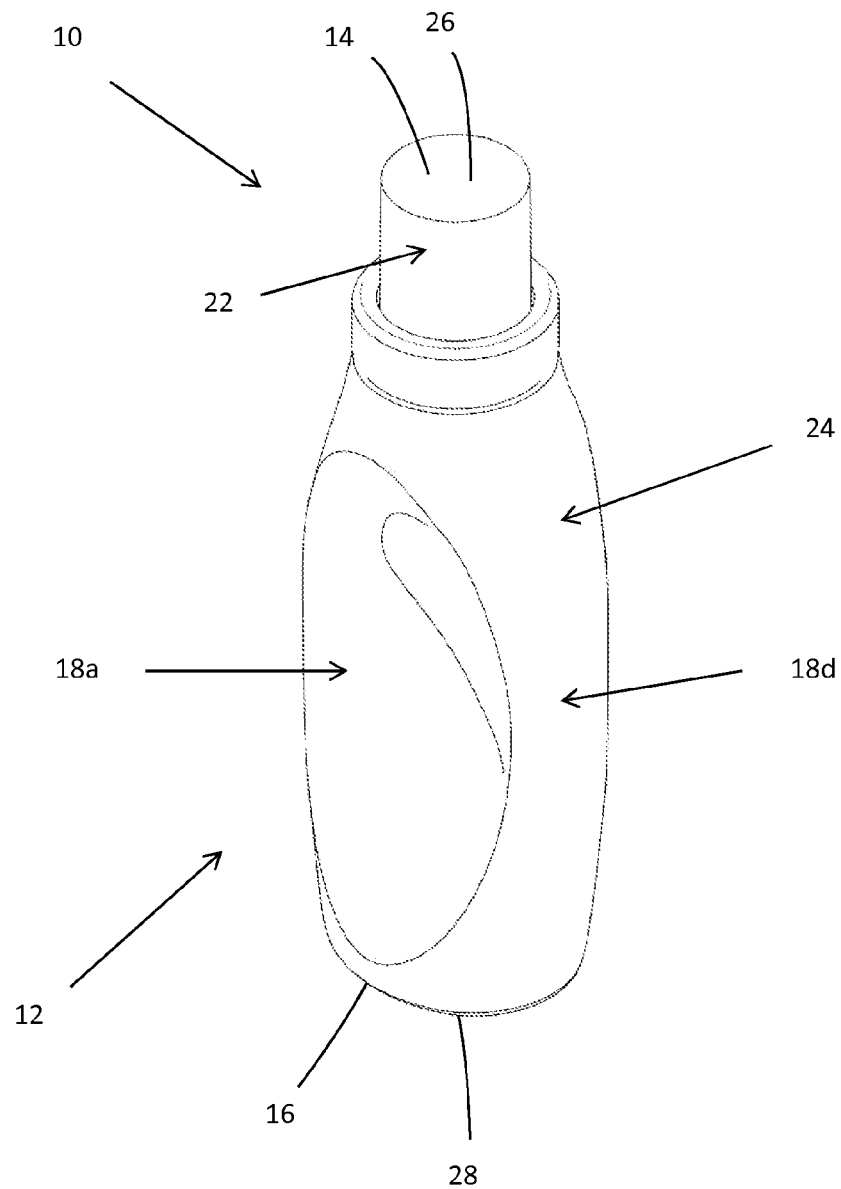
FIG. 1A is a perspective view of an article in the form of a container.

Various non-limiting exemplary configurations of the present disclosure will now be described to provide an overall understanding of the principles of the structure, function, manufacture, and use of the article grouping system and method of grouping articles disclosed herein. One or more examples of these non-limiting exemplary configurations are illustrated in the accompanying drawings. Those of ordinary skill in the art will understand that the article grouping system described herein and illustrated in the accompanying drawings are non-limiting example configurations and that the scope of the various non-limiting configurations of the present disclosure are defined solely by the claims. The features illustrated or described in connection with one non-limiting exemplary configuration may be combined with the features of other non-limiting exemplary configurations. Such modifications and variations are intended to be included within the scope of the present disclosure.

The term "machine direction" (MD) is used herein to refer to the direction of material or article flow through a process. In addition, relative placement and movement of a material or article can be described as travelling in the machine direction through a process from upstream in the process to downstream in the process.

The present disclosure provides, in part, article grouping systems for grouping articles. The article grouping systems may include carrier apparatuses, grouping apparatuses, and transfer apparatuses. The present disclosure also provides, in part, methods for grouping articles and methods for transferring articles.

The article grouping system of the present disclosure may be used to form arrays of articles comprising various number of rows and lanes of articles. Articles may advance in a first machine direction on an infeed carrier apparatus in single file with adjacent articles spaced apart in the first machine direction. The articles may advance successively onto an article carrier in the form of a grouping apparatus. The articles may advance in single file with adjacent articles spaced apart in a second machine direction. The articles may advance in the second machine direction to an outfeed carrier apparatus. Next, a transfer apparatus may transfer one or more articles from the grouping apparatus to the outfeed carrier apparatus. The transfer apparatus may subsequently transfer additional articles from the grouping apparatus to a position on the outfeed carrier apparatus adjacent to the previous articles placed on the outfeed carrier apparatus in order to form an array of articles. The transfer apparatus may continue transferring articles from the grouping apparatus to the outfeed carrier apparatus until the desired size array is formed. The articles may advance in a third machine direction on the outfeed carrier apparatus.

The first machine direction may be orthogonal to the second machine direction. The third machine direction may be parallel with the first machine direction. The third machine direction may be parallel with the first machine direction in order to provide a compact footprint to the manufacturing line.

An array of articles may comprise multiple lanes and multiple rows of articles. Each lane may extend in the third machine direction and each row may extend parallel with the second machine direction. The article grouping system and methods of grouping articles may be used to form arrays of articles having various numbers of rows and lanes. Moreover, the article grouping system and methods of grouping articles may be used to group articles of various sizes and shapes. In addition, the article grouping system and methods of grouping articles may be agile in order to continue operating after articles are missing or rejected upstream of the grouping apparatus.

The infeed carrier apparatus may advance the articles in a first machine direction on an infeed carrier surface. The infeed carrier surface may advance the articles at a constant speed or at a variable velocity.

The outfeed carrier apparatus may advance the articles in a third direction on an outfeed carrier surface. The outfeed carrier surface velocity may be variable. For example, if articles are missing or rejected upstream of the grouping apparatus, the outfeed carrier surface may be slowed down to give additional time for additional articles to advance onto the grouping apparatus. Once the grouping apparatus accounts for missing articles, the outfeed carrier surface velocity may be increased back to a standard operating velocity.

The grouping apparatus may include a frame and a plurality of transport members operatively connected with the frame. The grouping apparatus may include a plurality of carriage drive mechanisms and a grouping apparatus control system. Each carriage drive mechanism is operatively connected with one or more transport members. The grouping apparatus control system may cause each carriage drive mechanism to independently move the transport member(s) that are associated with the particular carriage drive mechanism in the second machine direction.

Each transport member may be connected with a carriage that is configured to advance articles in the second machine direction. The transport members may be configured to advance in the second machine direction from an article receiving zone to an article discharge zone and back to the article receiving zone. By independently controlling movement of the transport members, the grouping apparatus is able to compensate for missing articles upstream of the grouping apparatus, such as articles that were rejected upstream of the grouping apparatus. For example, one carriage may stop in the article receiving zone and wait for the next article to advance onto the carriage, while additional carriage(s) of the grouping apparatus are available at the article discharge zone to be transferred onto the outfeed carrier apparatus.

Each carriage may include a base and a plurality of support members connected with the base. Two adjacent support members and a portion of the base combine to form an article receiving compartment. The article receiving compartment may be defined by a compartment width. The article receiving compartment may be configured to receive an individual article. The support members are also configured to separate adjacent articles on the carriage such that adjacent articles are prevented from colliding and possibly tipping over while advancing on the grouping apparatus. Each carriage may have one or more article receiving compartments.

The compartment width of the article receiving compartments may be adjustable to accommodate articles of different shapes and sizes. The compartment width of the article receiving compartment may be decreased or increased, respectively, without disassembling any portion of the carriage. For example, support members of an article receiving compartment may be adjusted to be closer together or further apart in order to change the compartment width. Each carriage may be selectively positionable in a first configuration and a second configuration. In the first configuration, the compartment width of each compartment may be defined by a first compartment width. In the second configuration, the compartment width of each compartment may be defined by a second compartment width that is different from the first compartment width. The first compartment width may be greater or less than the second compartment width. Each carriage may comprise an adjustment mechanism. The adjustment mechanism may include rack and pinion systems, gear teeth and friction elements, adjustment screws, adjustment cam, an external positioner, hydraulic or pneumatic actuators, a locking mechanism. The adjustment mechanism may be mechanically or electrically driven.

Each transport member may be operatively connected with a carriage drive mechanism. Each transport member may be connected with a separate carriage drive mechanism, or a portion of the transport members of the grouping apparatus may be connected with a common carriage drive mechanism. The carriage drive mechanism may be operatively connected with the frame of the grouping apparatus. The carriage drive mechanism may be configured in various different ways. For example, the carriage drive mechanism may include a belt and sprocket system, a moving magnet linear motor drive system, or the like. Various numbers of carriage drive mechanisms may be used.

While the carriage drive mechanisms of the present disclosure are described in the context of advancing and grouping articles, it is to be appreciated that the carriage drive mechanisms may be used for various other purposes, including, but are not limited to, article stackers, article collators, article re-pitchers, missing article compensation, linear motion drives, linear processes requiring dwell time, article transport, drive of stacked sprockets, and drive of parallel belts, linear motion processes, tooling systems, including cutting and bonding processes. The carriage drive mechanism described can be a convenient approach for providing independent motion of movers or parallel drive belts for various applications.

While the transport member may be described as being connected with a carriage, it is to be appreciated that the transport member may be used in various different ways. For example, the transport member, with or without a carriage, may be configured to transport articles, to transport tooling, such as cutting or bonding tools, and the like.

The frame may include a first portion and a second portion. The first portion may include a first track and the second portion may include a second track. The first and second tracks may each comprise engaging surfaces. The first and second tracks may include two opposing linear sections connected with and separated by two opposing arcuate sections. The transport members may be defined by a first end portion, a second end portion, and a central portion separating the first and second end portions. The transport members may include a plurality of rollers operatively connected with the first and second end portions. The rollers connected with each end portion of the transport member may be spaced apart in the second machine direction by varying distances.

The first and second tracks may each include an outer track and an inner track. The transport member may include rollers that are operatively engaged with each of the outer and inner tracks. For example, outer translation rollers may be operatively connected with each of the first and second end portions of the transport member and operatively engaged with the outer tracks. Inner translation rollers may be operatively connected with each of the first and second end portions of the transport member and operatively engaged with the inner tracks. Engaging the outer translation rollers with the outer tracks and engaging the inner translation rollers with the inner tracks allows for the first and second end portions of the transport member to have a substantially Z-shape or S-shape. The shape of the first and second end portions of the transport member can allow adjacent transport members to at least partially nest together, allowing adjacent carriages to be positioned close together. In particular, a substantially Z-shaped or S-shaped first or second end portion of the transport member allows outer rollers and inner roller to at least partially overlap at the same or substantially the same second machine-directional MD2 position on the first and second tracks.

It is to be appreciated that the first and second tracks of the frame and the rollers of the transport member of the present disclosure may be used for supporting and defining a path for transport member motion in various ways. While the present disclosure discusses the first and second tracks and the rollers for use in the article grouping systems and grouping apparatus, the tracks and rollers can be used in various other apparatuses. For example, the tracks and rollers may be used for article stackers, article collators, article re-pitchers, missing article compensation, linear motion drives, linear processes requiring dwell time, and article transport. The tracks could be any combination of linear, arcuate segments, easement curves, and engineered cam paths. The track may form a closed travel path. The tracks may also be used for linear motion as the transport member could transverse back and force along a segment of track. The transport member may also be used for various other purposes other than those described in the present disclosure. The transport member could support an article carrier, tooling that interacts with an article, or to support other components of an apparatus.

The grouping apparatus may also include one or more sensors. The sensors may be used to sense the position of articles advancing through various stages of article grouping system. The sensors may be used to determine the position, speed, and/or acceleration of advancing articles in the article grouping system relative to other apparatuses of the system.

The transfer apparatus may include a frame and at least one article stabilization member. The transfer apparatus also includes a transfer apparatus drive mechanism that is operatively connected with the article stabilization member. The transfer apparatus may also include a transfer apparatus control system. The transfer apparatus control system is operatively engaged with the one or more transfer apparatus drive mechanisms. The transfer apparatus control system causes the article stabilization member or members to move about a closed travel path from an engaging location proximate to a discharge zone of the grouping apparatus to a placement location adjacent to the outfeed carrier surface and then back to the engaging location. The transfer apparatus control system may independently control movement of each of the article stabilization member(s).

In an exemplary configuration comprising two article stabilization members, the transfer apparatus drive mechanism(s) may move the article stabilization members about the closed travel path substantially out of phase from one another.

The placement location of the article stabilization member may be variable in the third machine direction. That is, the article stabilization member is able to discharge articles in a variable third machine-directional position on the outfeed carrier apparatus in order to form a plurality of arrays of articles of various predetermined arrangements. Stated another way, the distance between the engaging location and the placement location may be different each time the article stabilization member travels from the engaging location to the placement location. This also allows the transfer apparatus to adapt to different velocities, accelerations, and jerk of the outfeed carrier surface.

The article handling system and grouping apparatus may be used to handle various articles, including primary packages in the form of containers, for example. The containers may be used to contain various products, including products in various forms and for various purposes. For example, the container may be used to contain liquid compositions such as cleaning and/or personal care compositions. However, it is to be appreciated that the product may include various compositions in various other forms, including solid, powder, granule, liquid, gel, emulsion, or the like.

While the systems and apparatuses of the present disclosure can easily handle conventionally shaped articles (e.g., cylindrical, and/or symmetrical articles), the systems and apparatuses of the present disclosure are particularly suited to handle articles having shapes that may be relatively unstable and/or have incompatible contact surfaces with adjacent articles while advancing through an article converting line. Unstable articles may include articles with articles with small bases that will easily tip over; articles having a high center of gravity; vertical projection of the center of gravity of an article approaches an edge of the bottom periphery surface of the article; articles with angled and/or off-center necks; asymmetrical articles; articles of non-constant cross section; etc. The systems and apparatuses may be well suited to handle articles that are not compatible with conveying systems that rely on contact between adjacent articles because of incompatible sidewall shapes. Contact between such articles can result in articles being knocked over or can cause the articles to twist or shingle.

Figure 1B:
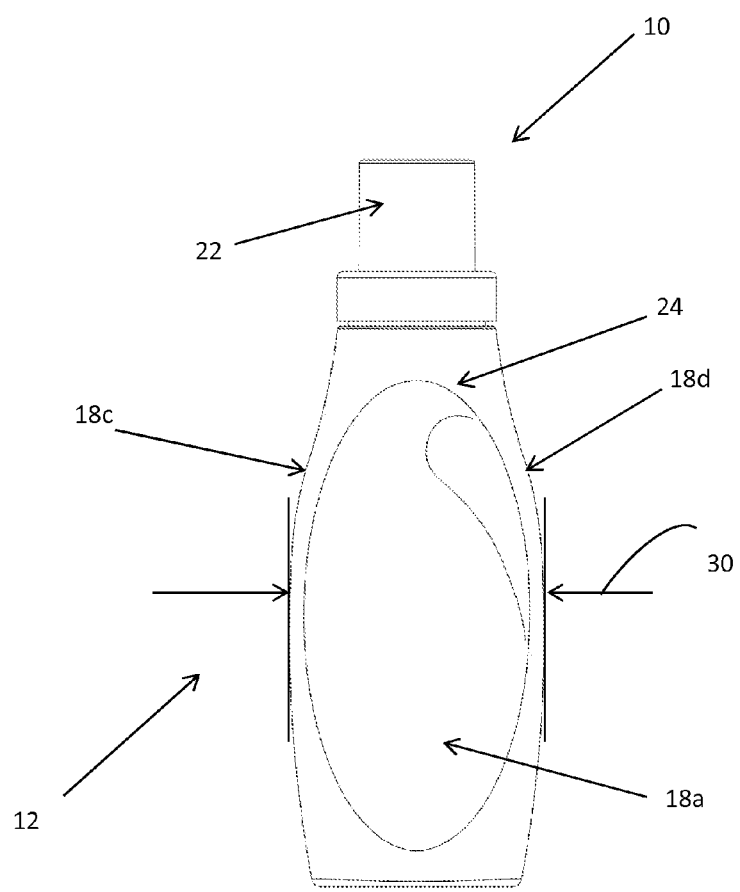
FIG. 1B is a front, elevation view of an article in the form of a container.
Figure 2:
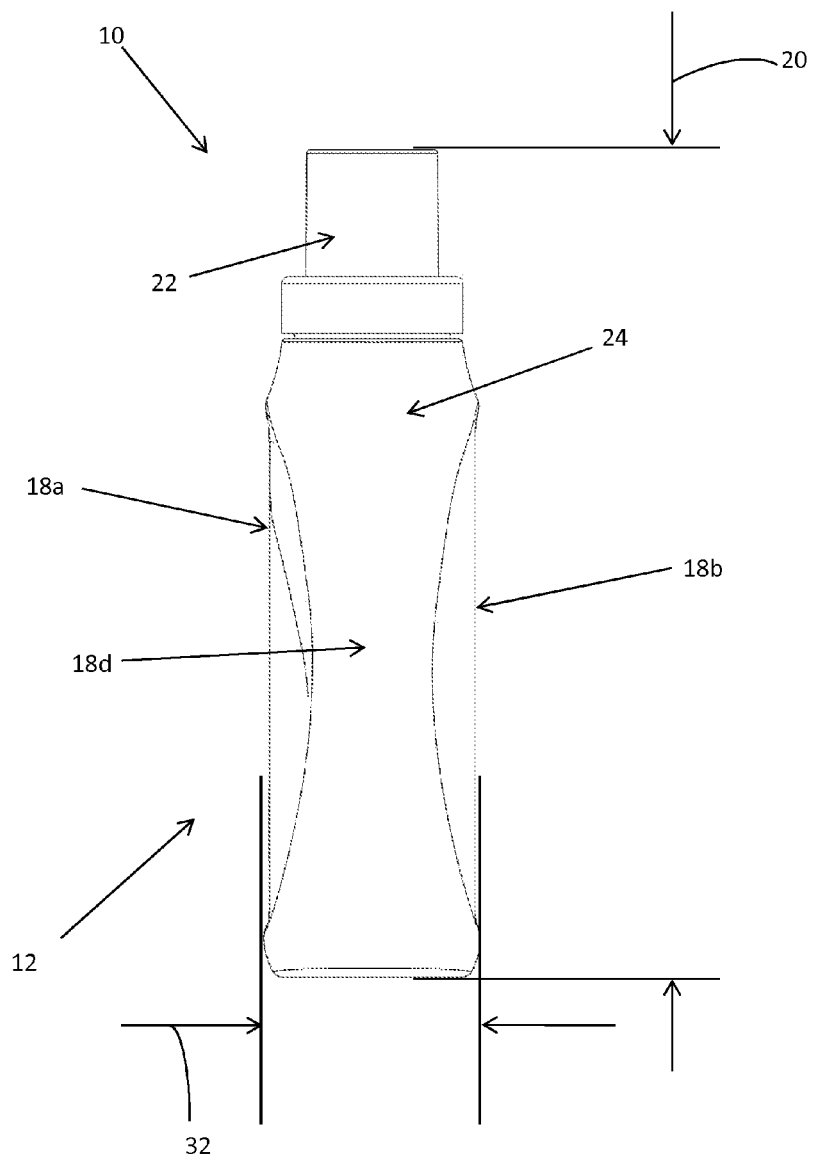
FIG. 2 is a side, elevation view of an article in the form of a container.

FIGS. 1A, 1B, and 2 illustrate exemplary articles 10 in the form of containers 12 that may be grouped using the systems, apparatuses, and/or methods of the present disclosure. The containers 12 may serve as primary packages for consumer goods, for example. The container 12 may be defined by a top periphery surface 14 and a bottom periphery surface 16. The top periphery surface 14 may be flat, substantially flat, curved, or may have a curvilinear surface. The bottom periphery surface 16 may be flat or substantially flat, or may include multiple surfaces within a single plane or at least three points within a single plane. Having such a bottom periphery surface 16 results in a container 12 that can statically rest on a planar surface such as a shelf, countertop, or table. A distance between an outermost point 26 of the top periphery surface 14 and an outermost point 28 of the bottom periphery surface 16 defines a height 20 of the container 12.

The container 12 may include one or more sidewalls 18 separating the top and bottom periphery surfaces 14 and 16. The sidewall or sidewalls 18 may, for example, include a first sidewall 18a, a second opposing sidewall 18b that opposes the first sidewall 18a, a third sidewall 18c, and a fourth sidewall 18d that opposes the third sidewall 18c. The first and second sidewalls 18a and 18b may be separated by a distance that defines a depth 32 of the container 12. The third and fourth sidewalls 18c and 18d may be separated by a distance that defines a width 30 of the container 12. As shown in FIGS. 1A, 1B, and 2, the container 12 may include one or more separate portions, such as a lid 22 and a reservoir 24 enclosed by the lid 22. In other exemplary configurations, the container 12 may include only a reservoir 24 or the lid 22 and the reservoir 24 may be single, unitary structure. In other exemplary configurations, the container 12 may include more than one reservoirs 24 or more than one lids 22.

The systems and apparatuses of the present disclosure are able to handle articles of various sizes and shapes. Exemplary containers 12 may have a height in the range of about 100 millimeters (mm) to about 350 mm. The reservoir may have a maximum width of about 30 mm to about 150 mm. Moreover, the containers may have a maximum depth of about 30 mm to about 150 mm. The containers may be configured to hold various amounts of composition. For example, the containers may have a volume of about 100 milliliters to about 3000 milliliters. The systems, apparatuses, and methods of the present disclosure may be configured to create groups of containers of various different masses. For example, the mass of the container and any contents in the container may be in the range of about 0.1 kilogram (kg) to about 3 kg. The size of the system and apparatus can be scaled to accommodate smaller or larger articles. The container 12, including the lid 22 and/or the reservoir 24, may be composed of various rigid or semi-rigid materials, including high density polyethylene, polypropylene, polyethylene terephthalate, thermoplastic elastomers, aluminum, and glass. The lid 22 and the reservoir 24 may be composed of the same material, or the lid 22 and the reservoir 24 may be composed of different materials.

Figure 3A:
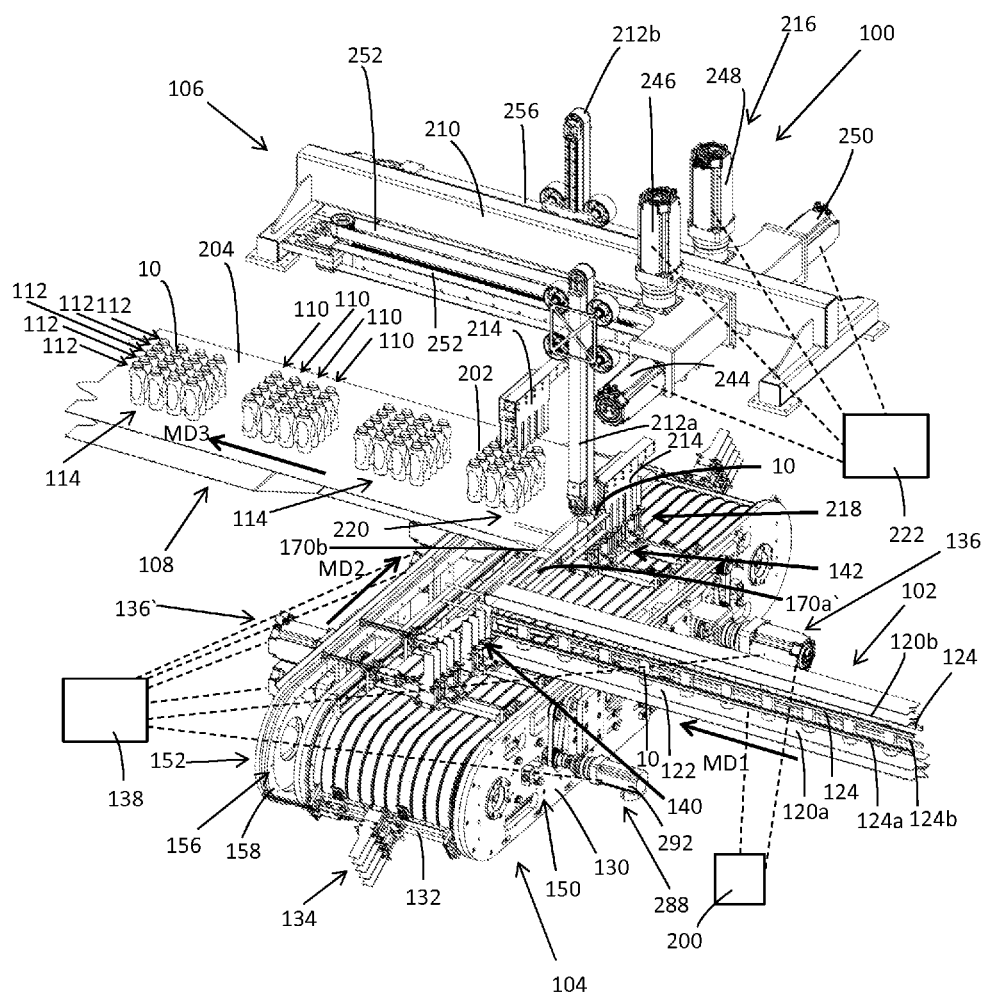
FIG. 3A is a perspective view of an article grouping system.
Figure 3B:
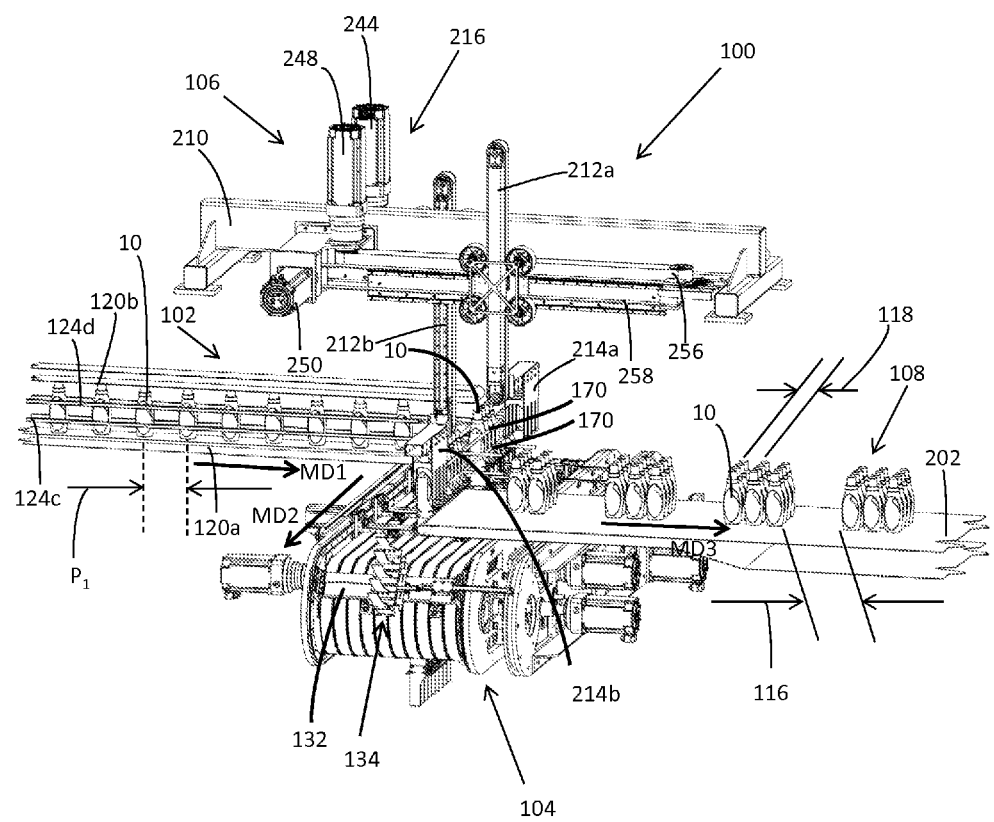
FIG. 3B is a perspective view of an article grouping system.

As previously mentioned, the systems, apparatuses, and methods of the present disclosure may be used to form arrays of articles having various numbers of rows and lanes of articles. FIGS. 3A and 3B illustrate an exemplary article grouping system 100 that is adapted to advance articles of various shapes and sizes and form arrays of articles of various sizes and configurations. The systems, apparatuses, and methods of the present disclosure may be described with reference to the various components of the containers shown in FIGS. 1A, 1B, and 2. However, it is to be appreciated that the systems, apparatuses, and methods of the present disclosure may be used to group various types of articles 10, including primary packages and secondary packages, as well as various other articles. Primary and/or secondary packages may include containers, bottles, cans, canisters, boxes, cartons, tubes, pouches, jars, bags, and the like. Secondary packages may also include cases, trays, shrink bundle packs, cartons, or reusable rigid containers. The packages may comprises various materials, such as rigid, semi-rigid, or flexible plastic, cardboard, metal, glass, and the like. The articles may be filled with product or may be empty. Articles 10 may include other three-dimensional objects that can be organized into groups, including, for example, razor cartridges, toilet paper rolls, paper towel rolls, and tampons.

With reference to FIGS. 3A-6, a plurality of articles 10 may advance in a first machine direction MD1 on an infeed carrier apparatus 102 toward a grouping apparatus 104. The articles 10 may be arranged on the infeed carrier apparatus 102 in a single file lane with adjacent articles 10 spaced apart in the first machine direction MD1. From the infeed carrier apparatus 102, the articles 10 may sequentially advance onto the grouping apparatus 104. The grouping apparatus 104 advances one or more articles 10 in the second machine direction MD2 to an outfeed carrier apparatus 108. A transfer apparatus 106 may be used to transfer one or more articles 10 from the grouping apparatus 104 to the outfeed carrier apparatus 108. The grouping apparatus 104 may continue advancing subsequent articles 10 in the second machine direction MD2 to the outfeed carrier apparatus 108. The transfer apparatus 106 may transfer subsequent articles 10 to the outfeed carrier apparatus 108 to form an array 114 of articles 10.

The transfer apparatus 106 may form arrays 114 of articles 10 that comprise various numbers of rows 110 and lanes 112. The rows 110 of articles 10 may extend in a direction parallel with the second machine direction MD2. The lanes 112 of articles 10 may extend in a direction parallel with the third machine direction MD3. The arrays 114 of articles 10 may advance in the third machine direction MD3 to a downstream process, such as a downstream packaging process where the arrays 114 of articles 10 may be packaged into secondary packages. In the claims, the first, second, and third machine directions MD1, MD2, and MD3 may be referred to as a machine direction, a first direction, a second direction, or a third direction depending on which direction is recited first.

With reference to FIGS. 3A-6, the infeed carrier apparatus 102 may be configured to advance articles 10 in the first machine direction MD1 on an infeed carrier surface 120. The infeed carrier surface 120 may be configured to advance the articles 10 toward the grouping apparatus 104. The infeed carrier surface 120 may advance the articles 10 at a constant speed or at a variable speed. The articles 10 may advance on the infeed carrier apparatus 102 in a single file lane, with adjacent articles 10 spaced apart in the first machine direction MD1 by an article pitch $P_1$. The "pitch" refers to the distance between midpoints of the base of two adjacent articles. The articles 10 may be spaced from each adjacent article 10 on the infeed carrier surface 120 by a constant article pitch $P_1$. Or, in other configurations, the article pitch $P_1$ may be variable. The article pitch $P_1$ may be periodic, random due to missing articles, or random. The article pitch $P_1$ may be greater than the article width 30 or article depth 32 depending upon the positioning of the article 10 in order to maintain some spacing between adjacent articles 10 and to insure that the articles with incompatible sidewall shapes will not contact each other, which could cause articles to tip over or shingle.

The infeed carrier apparatus 102 may be configured in various ways. For example, the infeed carrier apparatus 102 may be configured as a conveyor, including linear or curved conveyor, for example. The infeed carrier apparatus 102 may advance the articles 10 by contact with any periphery points or surfaces of the article 10 such as the top periphery surface, bottom periphery surface, sidewall, or corners. The infeed carrier apparatus 102 may advance the articles 10 by frictional force between the infeed carrier surface 120 and the articles 10. The friction force between the infeed carrier surface 120 and the articles 10 can be increased by applying negative pressure to the bottom periphery surface 16 of the article 10 through apertures in the infeed carrier surface 120.

The infeed carrier apparatus 102 may comprise two infeed carrier surfaces, such as first and second infeed carrier surfaces 120a and 120b shown in FIG. 3A, with one infeed carrier surface positioned above the other infeed carrier surface, each infeed carrier surface 120 configured to contact one of the top or bottom periphery surfaces of the article. The second infeed carrier surface 120b may generate a normal force down in the direction of the first infeed carrier surface 120a. The downward force generated by the second infeed carrier surface 120b can generate high friction forces between the bottom periphery surface 16 of the article 10 with the first infeed carrier surface 120a and the top periphery surface 16 of the article 10 with the second infeed carrier surface 120b, which can provide positive control to unstable articles. The first and second infeed carrier surfaces 120a and 120b may each be configured as a conveyor comprising first and second belts 122a and 122b each arranged in endless loops.

While it is shown in FIGS. 3A and 3B that the infeed carrier apparatus 102 comprises first and second infeed carrier surfaces 120a and 120b, it is to be appreciated that the infeed carrier apparatus 102 may be configured in various different ways in order to advance the articles 10 in the first machine direction MD1 to the grouping apparatus 104. For example, the infeed carrier apparatus 102 may comprise a single infeed carrier surface 120 that contacts one of the top or bottom periphery surfaces of the article. The infeed carrier apparatus 102 may also be configured as a rotary carrier, such as a rotary star wheel. The infeed carrier apparatus 102 may be configured as a feed screw or individually driven pushers or fingers that are configured to advance articles 10. The infeed carrier apparatus 102 may also advance the articles 102 using motive force transmitted by a fluid stream, vibration, electrostatic forces, magnetic forces, and the like.

The infeed carrier apparatus 102 may comprise one or more infeed carrier surfaces 120 that are configured to advance articles to the grouping apparatus 104. As a result, the grouping apparatus 104 may be configured to receive articles 10 from one or more infeed carrier surfaces 120 at a time. Each infeed carrier surface 120 can optionally supply different articles 10 which can create an array 114 of different articles 10. The infeed carrier surfaces 120 may be arranged side-by-side to one another, or the infeed carrier surfaces 120 may be arranged on opposite sides of the grouping apparatus 104. Each infeed carrier surface 120 may advance the same article 10 to the grouping apparatus 104, or one infeed carrier surface 120 may advance one type of article 10 and at least one other infeed carrier surface 120 may be configured to advance a different article 10. Each infeed carrier surface 120 may be associated with a separate apparatus such as a conveyor or rotary star wheel.

Figure 4:
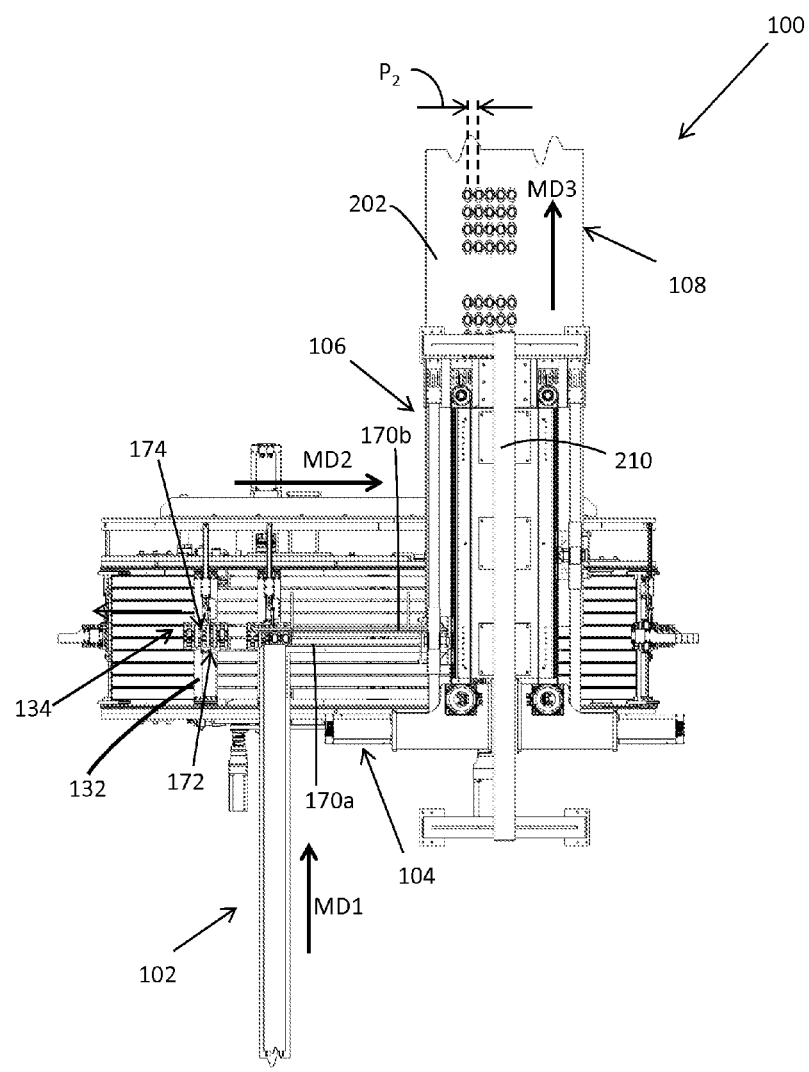
FIG. 4 is a top, plan view of an article grouping system.

With reference to FIGS. 3A-4, the infeed carrier apparatus 102 may include one or more infeed guide members 124. For example, as shown in FIGS. 3A-4, the infeed carrier apparatus 102 may comprise four infeed guide members 124, two infeed guide members 124a and 124b disposed adjacent to one edge of the infeed carrier apparatus 102 and two infeed guide members 124c and 124d disposed adjacent to the opposite edge of the infeed carrier apparatus 102. The infeed guide members 124 may extend in the first machine direction MD1. The infeed guide members 124 may provide support as the articles 10 advance in the first machine direction MD1 to prevent the articles 10 from falling over in the second machine direction MD2, especially if the articles 10 are inherently unstable. Moreover, the infeed guide members 124 may assist in controlling the second machine-directional MD2 positioning of the articles 10 on the infeed carrier surface 120. The position and elevation of the infeed guide members 124 can be manually or automatically adjusted to accommodate different shapes and sizes of articles 10. While it is shown in FIGS. 3A-4 that the infeed carrier apparatus 102 includes four infeed guide members 124, it is to be appreciated that fewer or greater than four infeed guide members 124 may be used. For example, the infeed guide members 124 may be disposed adjacent to only one edge of the infeed carrier apparatus 102 or may be disposed adjacent to both edges of the infeed carrier apparatus 102. The infeed guide members 124 may be used in combination with the first and second infeed carrier surfaces 120a and/or 120b to positively control articles 10, especially unstable articles. Or, the infeed guide members 124 may be used in place of the first and second infeed carrier surfaces 120a and 120b to positively control advancing articles 10.

With reference to FIGS. 3A-7B, from the infeed carrier apparatus 102, the articles 10 advance onto the grouping apparatus 104. The grouping apparatus 104 is configured to sequentially receive individual articles 10 advancing in a first machine direction MD1 on the infeed carrier apparatus 102 and advance the articles 10 in a second machine direction MD2 to an outfeed carrier apparatus 108.

The grouping apparatus 104 may also change the pitch between adjacent articles. For example, the adjacent articles 10 may be spaced apart by a first article pitch $P_1$ while advancing on the infeed carrier apparatus 102 and adjacent articles 10 on the grouping apparatus 104 may be spaced apart by a second article pitch $P_2$ that is different from the first article pitch $P_1$.

Figure 7A:
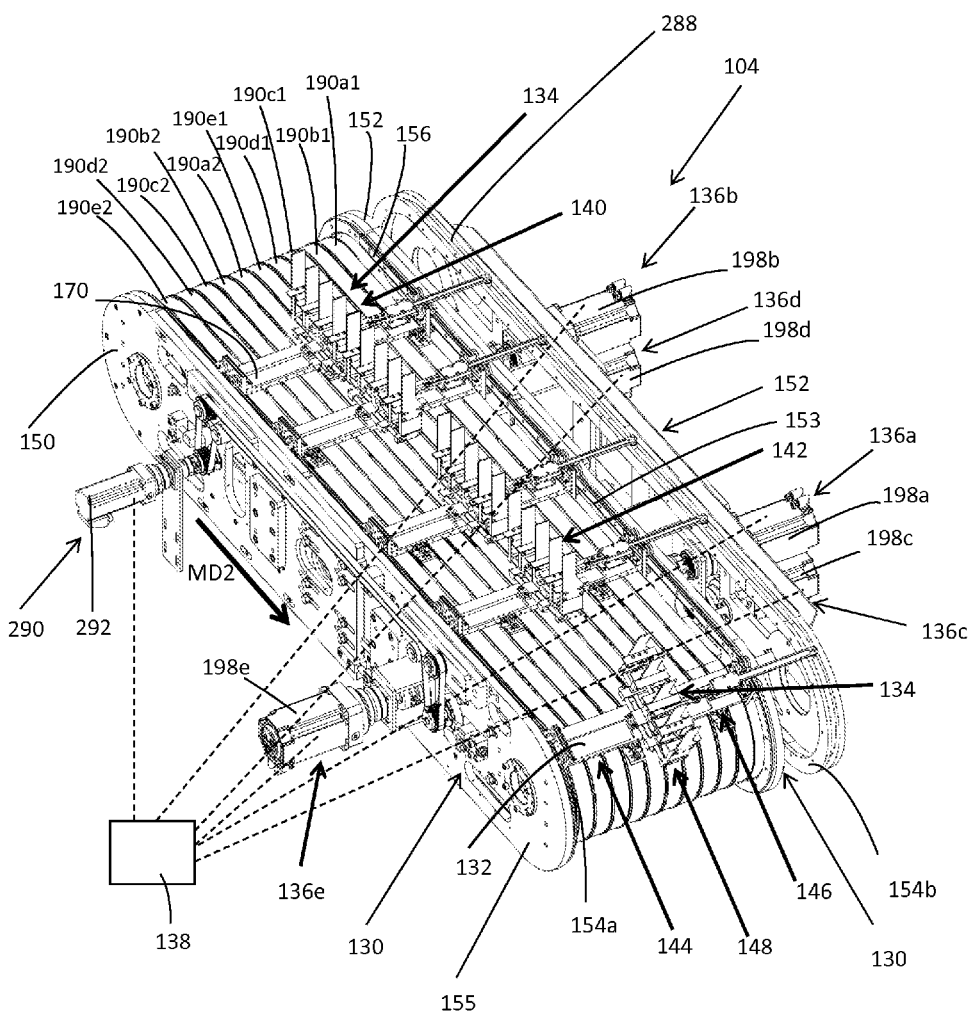
FIG. 7A is a perspective view of a grouping apparatus.

With reference to FIGS. 3A and 7A, the grouping apparatus 104 includes a frame 130 and a plurality of transport members 132 operatively connected with the frame 130. Each transport member 132 may be connected with a carriage 134. The grouping apparatus 104 may also include a plurality of carriage drive mechanisms 136 and a grouping apparatus control system 138. Each carriage drive mechanism 136 is operatively connected with one or more carriages 134. The grouping apparatus control system 138 may cause each carriage drive mechanism 136 to independently move the transport member(s) 132 that are associated with the particular carriage drive mechanism 136 in the second machine direction MD2. The transport members 132 may travel in the second machine direction MD2 about a closed travel path.

Figure 5:
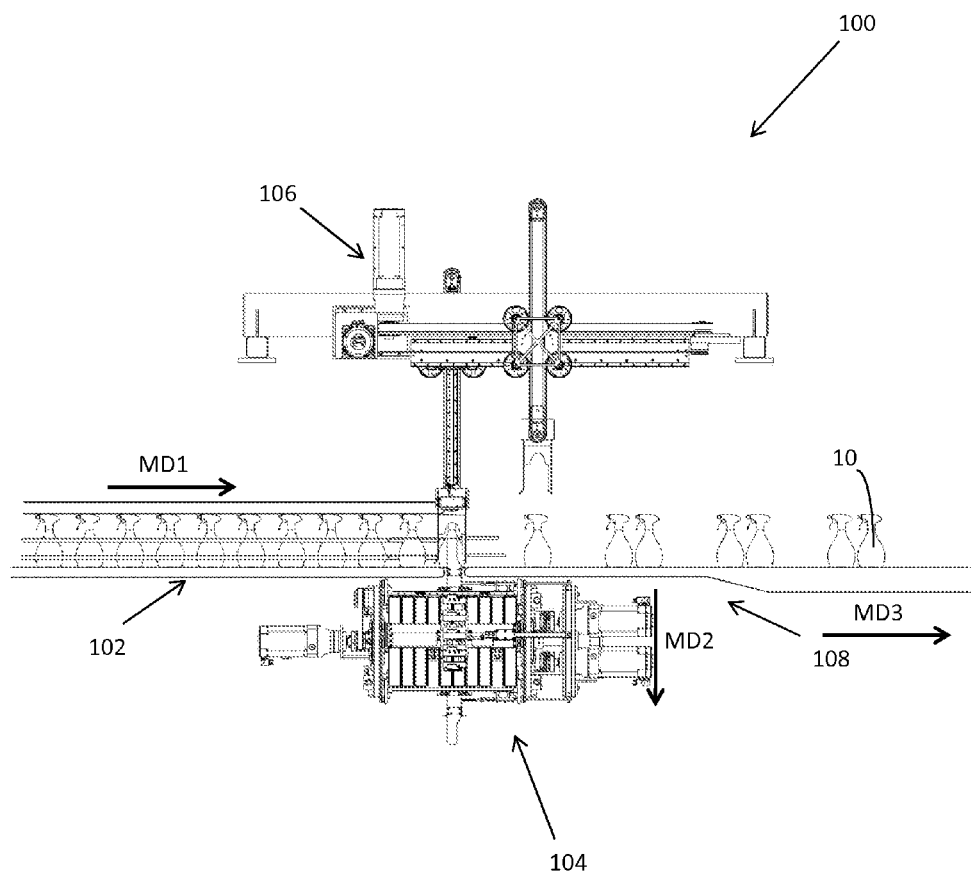
FIG. 5 is a side, elevation view of an article grouping system.

Each transport member 132 may be configured to move the carriage 134 associated with the transport member 132 in the second machine direction MD2 about the closed travel path from an article receiving zone 140 to an article discharge zone 142 and back to the article receiving zone 140. With reference to FIGS. 3A and 5, a portion of the grouping apparatus 104 may be positioned intermediate the infeed and outfeed carrier apparatuses 102 and 108. The article receiving zone 140 may be positioned adjacent to the infeed carrier apparatus 102 and the article discharge zone 142 may be positioned adjacent to the outfeed carrier apparatus 108.

With reference to FIGS. 7A-9, the frame 130 may include a first portion 150 and a second portion 152. The first portion 150 may include a first track 154a and the second portion 152 may include a second track 154b. The first and second tracks 154a and 154b may each comprise engaging surfaces, such as engaging surfaces 158a and 158b shown in FIGS. 7B-9 for illustrative purposes only, that engage with the rollers 155. The engaging surfaces 158a and 158b of the first and second tracks 154a and 154b may be flat or may include grooves or slots.

The first and second tracks 154a and 154b can be parallel to the path of carriage drive belts 190. The first and second tracks 154a and 154b can consist of a combination of linear sections 161 and arcuate sections 163 where the linear sections 161 may be tangent to the arcuate sections 163. The linear sections 161 for engaging surfaces 158a and 158b can be substantially parallel to the linear spans of carriage drive belts 190 supported between carriage drive sprocket 192 and carriage idler sprocket 194. The arcuate sections 163 for engaging surfaces 158a and 158b can be substantially concentric to carriage drive sprocket 192 and carriage idler sprocket 194. The first and second tracks 154a and 154b may include two opposing linear sections 161 connected with and separated by two opposing arcuate sections 163.

Figure 7B:
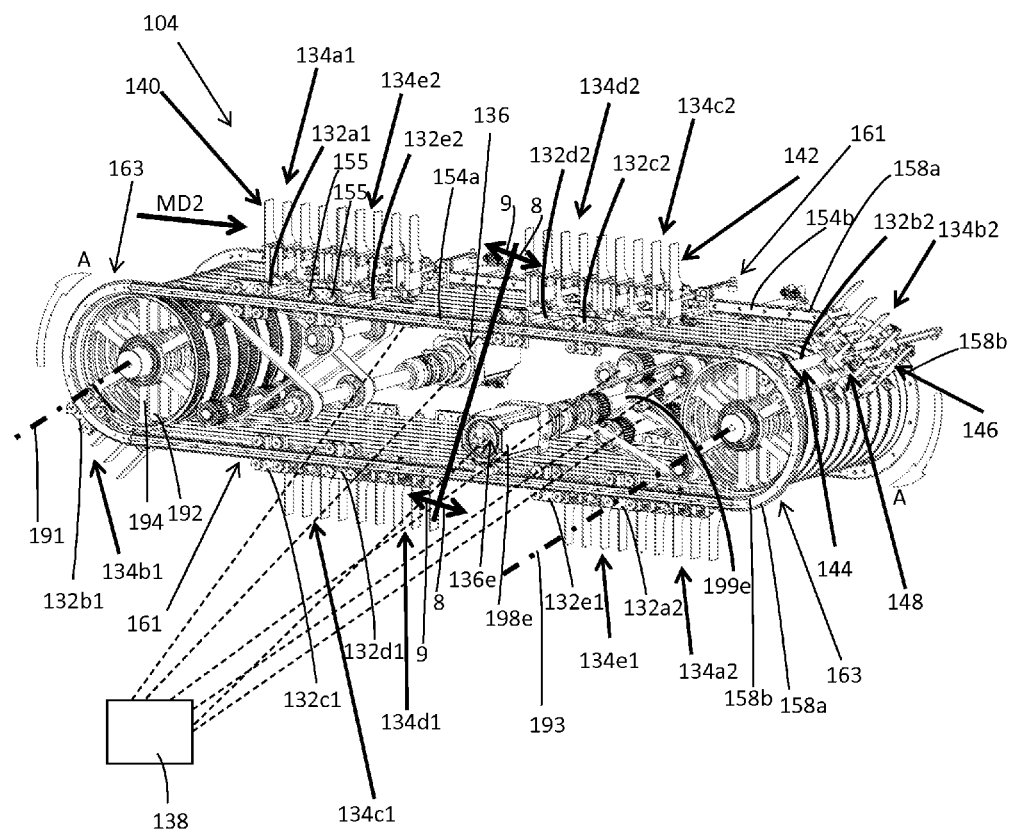
FIG. 7B is a perspective view of the grouping apparatus of FIG. 7A with a frame of the grouping apparatus removed to more clearly show first and second tracks of the grouping apparatus engaged with a plurality of transport members.
Figure 8:
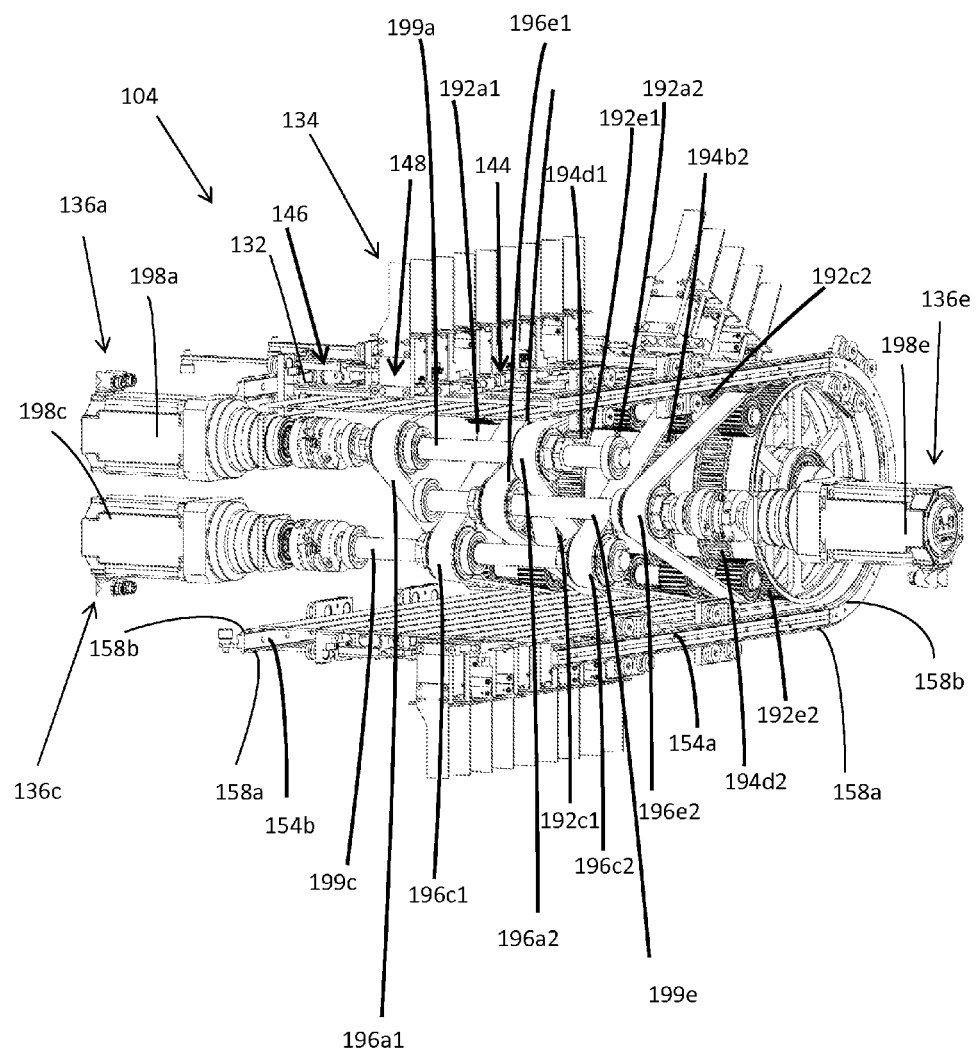
FIG. 8 is a perspective view of portion 8-8 of the grouping apparatus of FIG. 7B.
Figure 9:
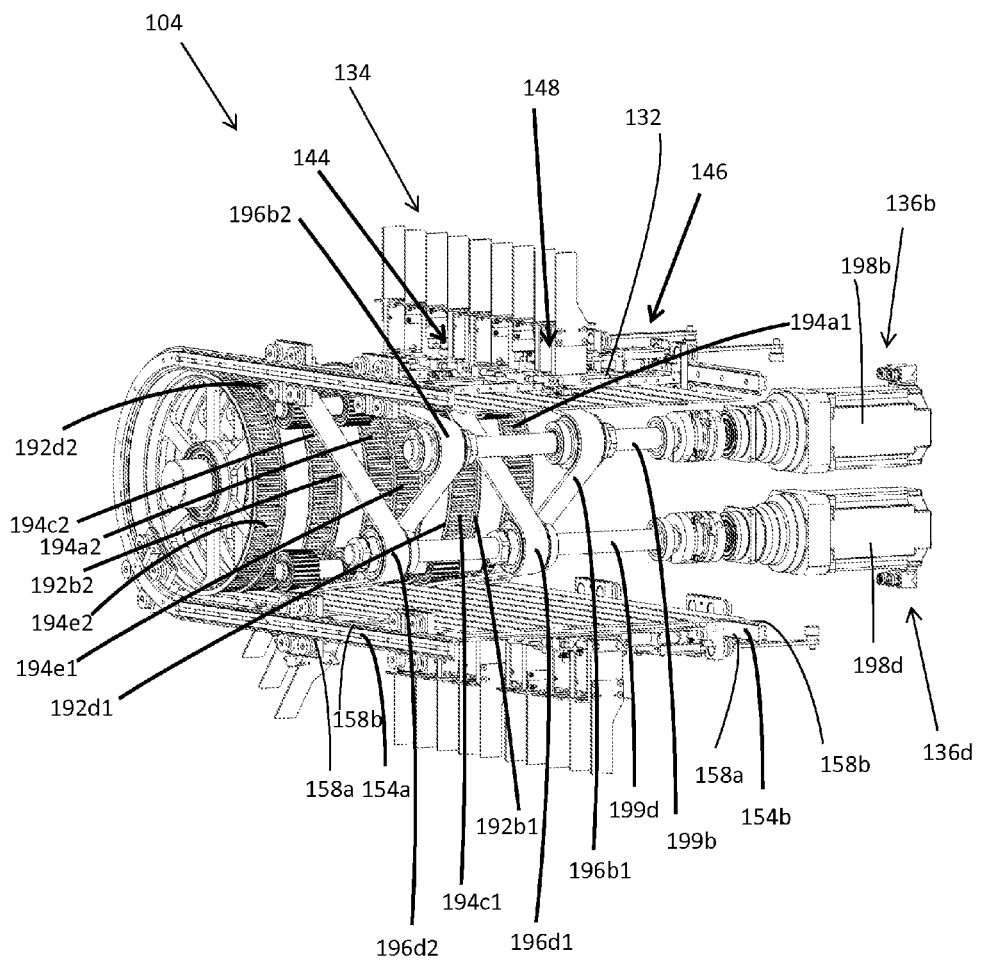
FIG. 9 is a perspective view of portion 9-9 of the grouping apparatus of FIG. 7B.

With reference to FIGS. 7A and 7B, the transport member 132 may be defined by a first end portion 144 and a second end portion 146 separated by a central portion 148. An individual carriage 134 may be connected with each transport member 132. The carriage 134 may be fixedly connected with the transport member 132. The carriage 134 may be connected with the transport member 132 in the first end portion 144, the second end portion 146, or the central portion 148. For illustrative purposes only, the carriage 134 of FIGS. 7A and 7B is connected with the central portion 148 of the transport member 132. Each carriage 134 may be connected with a transport member 132 in the same first machine-directional MD1 position. However, it is to be appreciated that each carriage 134 may be connected with a transport member 132 in different first machine-directional MD1 positions.

With reference to FIG. 7B, the transport members 132 may include a plurality of rollers 155 operatively connected with the first and second end portions 144 and 146. At least one roller 155 may be connected with the first end portion 144 of the transport member 132 and at least at least one roller 155 may be connected with the second end portion 146 of the transport member 132. The rollers 155 may be rotatably or non-rotatably connected with the transport member 132.

With reference to FIGS. 7A-16, the transport member 132 may be engaged with the first and second tracks 154a and 154b in various different ways. The rollers 155 operatively connected with the first end portion 144 of the transport member 132 may be operatively engaged with the first track 154a and the rollers 155 operatively connected with the second end portion 146 of the transport member 132 may be operatively engaged with the second track 154b. The rollers 155 may be slideably or rollably engaged with the first or second tracks 154a and 154b. The rollers 155 may be rotatable or non-rotatable relative to the first or second track 154a or 154b. Engaging the transport member 132 with the first and second tracks 154a and 154b may assist in controlling the second machine-directional MD2 positioning of the transport member 132 as the transport member 132 moves in the second machine direction MD2 about the closed travel path. For example, the rollers 155 and the first or second track 154a or 154b may be configured to prevent one end portion of the first or second track 154a or 154b from swinging out of the second machine-directional MD2 alignment from the opposite end portion of the transport member 132, which can be caused by high accelerations acting on the transport member 132.

As shown in FIGS. 7B-9, the rollers 155 of each transport member 132 may be operatively engaged with one or more surfaces of the first and second tracks 154a and 154b, such as engaging surfaces 158a and 158b. A portion of the rollers 155 may be engaged with first engaging surfaces 158a and a portion of the rollers 155 may be engaged with second engaging surface 158b of the first or second tracks 154a and 154b. The first engaging surfaces 158a may be parallel with the second engaging surfaces 158b. One or more rollers 155 spaced apart in the second machine direction MD2 may be connected with the first end portion 144 of the transport member 132 and may be operatively engaged with the first engaging surface 158a of the first track 154a. One or more rollers 155 spaced apart in the second machine direction MD2 may be connected with the first end portion 144 of the transport member 132 and may be engaged with the second engaging surface 158b of the first track 154a. Likewise, one or more rollers 155 spaced apart in the second machine direction MD2 may be connected with the second end portion 146 of the transport member 132 and may be engaged with the first engaging surface 158a of the second track 154b. One or more rollers 155 spaced apart in the second machine direction MD2 may be connected with the second end portion 146 of the transport member 132 and may be engaged with the second engaging surface 158b of the second track 154b.

Four rollers 155 connected with the first end portion 144 of the transport member 132 can be arranged in a trapezoidal configuration to allow all four rollers 155 to engage while in either the linear or arcuate sections 161 and 163. In the linear sections 161, two rollers 155 can engage with first engaging surface 158a while the other two rollers engage with second engaging surface 158b. In the arcuate sections 163, two rollers 155 can engage with first engaging surface 158a while the other two rollers engage with second engaging surface 158b. Likewise, four rollers 155 connected with the second end portion 146 of the transport member 132 can be arranged in a trapezoidal configuration to allow all four rollers 155 to engage while in both the linear and arcuate sections 161 and 163. In this arrangement and at very high operating speeds, the rollers 155 can transition abruptly from linear sections 161 to arcuate sections 163 and from arcuate sections 163 to linear sections 161 of first and second engaging surfaces 158a and 158b.

Figure 10:
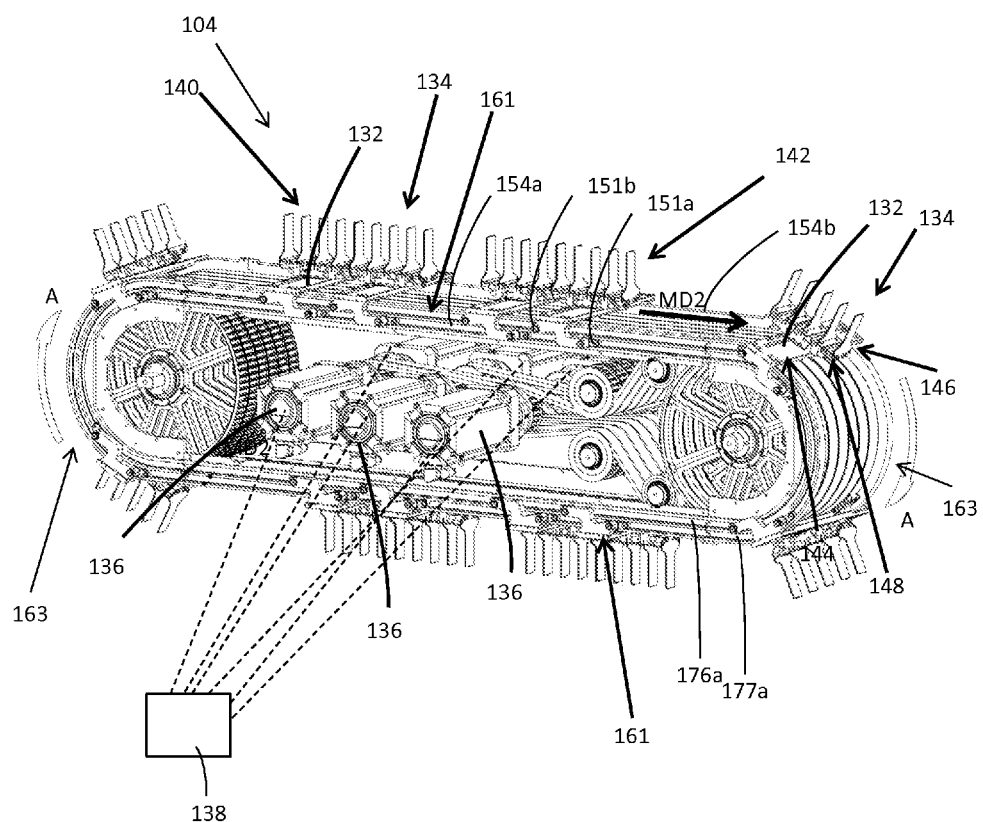
FIG. 10 is a perspective view of a grouping apparatus with a frame of the grouping apparatus removed to more clearly show the first and second tracks of the grouping apparatus engaged with a plurality of transport members.
Figure 11A:
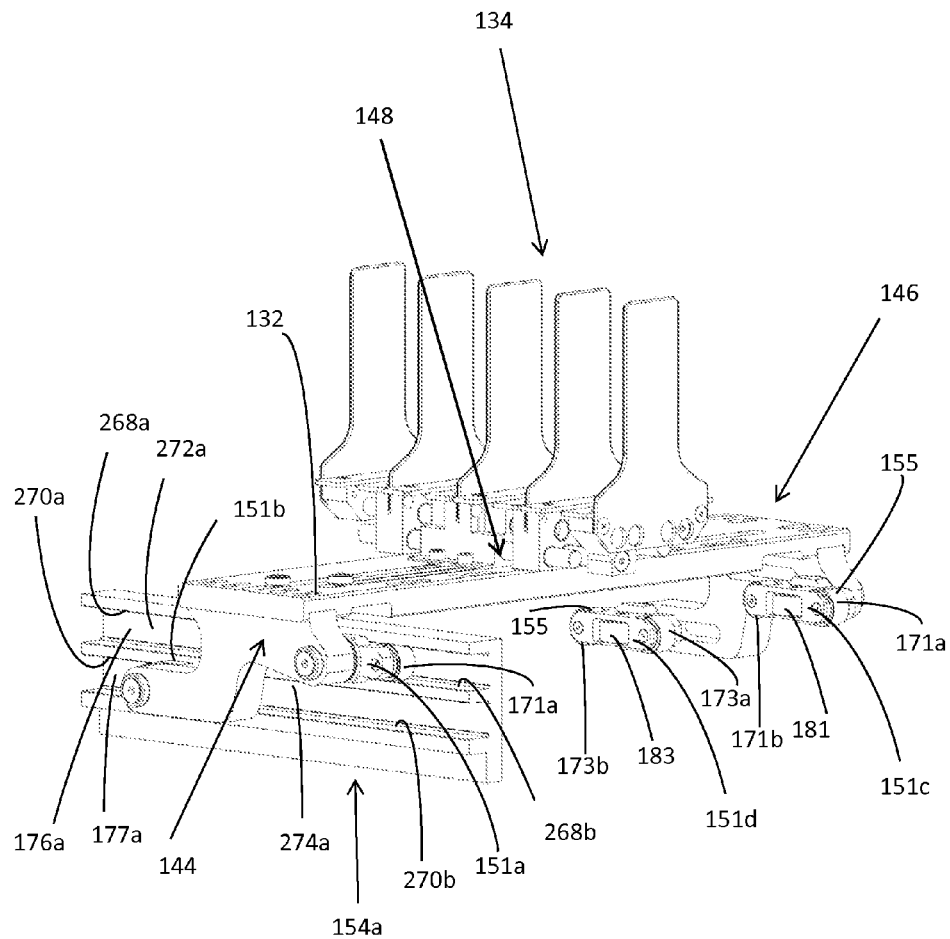
FIG. 11A is a perspective view of a transport member engaged with a portion of a first track, with the remaining portion of the first track and a second track removed to more clearly show the transport member.
Figure 11B:
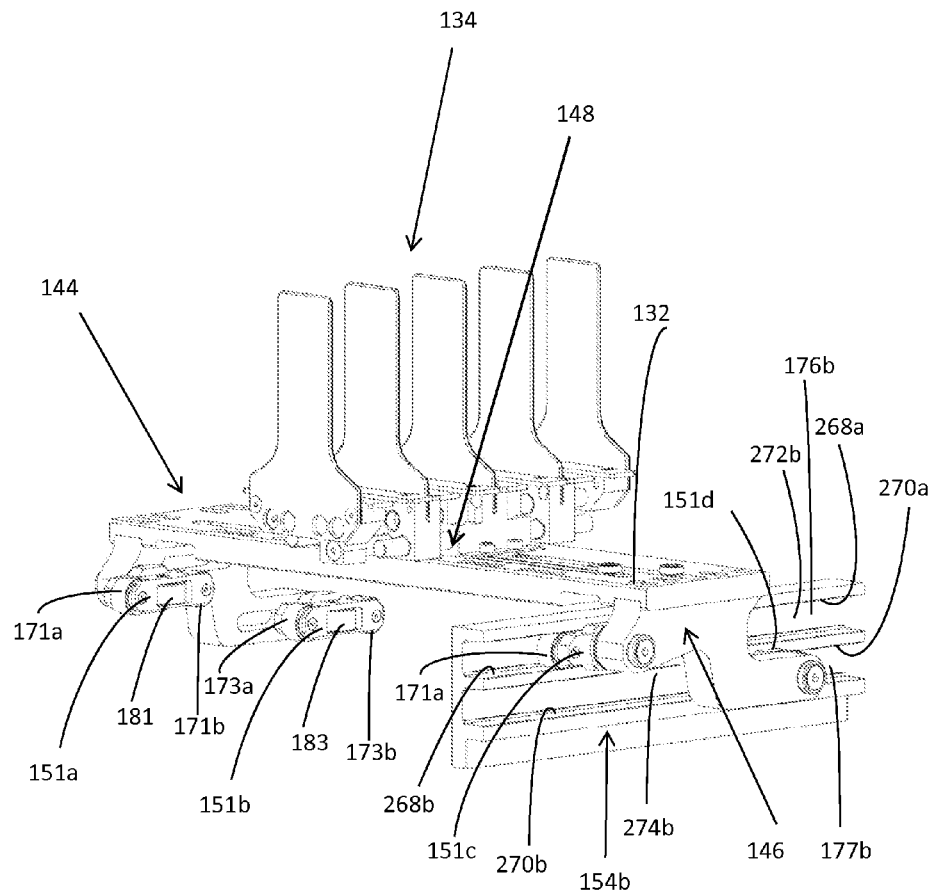
FIG. 11B is a perspective view of a transport member engaged with a portion of a second track, with the remaining portion of the second track and a first track removed to more clearly show the transport member.
Figure 12:
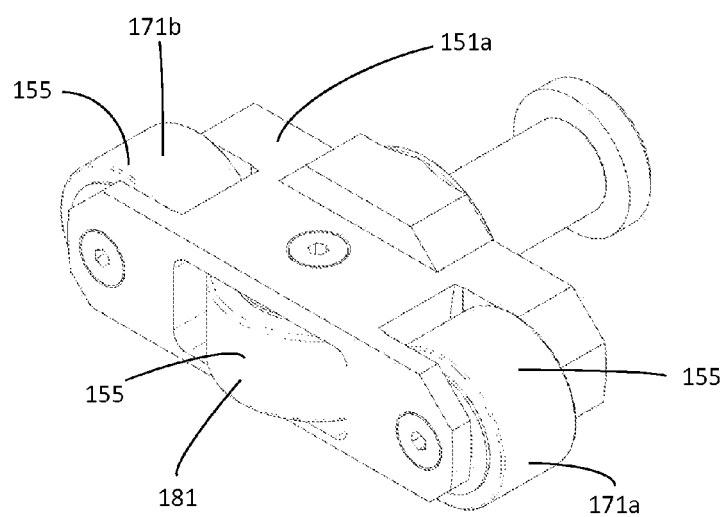
FIG. 12 is a perspective view of a roller support member of a transport member operatively connected with a plurality of rollers.

With reference to FIGS. 10-12, the rollers 155 connected with the first and second end portions 144 and 146 of the transport member 132 may be spaced apart in the second machine direction MD2 by varying distances. For example, the transport member 132, such as shown in FIGS. 10-12 for illustrative purposes only, may include rollers 155 connected with each of the first and second end portions 144 and 146 that are spaced apart in the second machine direction MD2 by a greater distance than the rollers 155 shown in FIGS. 7B-9. In order to space the rollers 155 of FIGS. 10-12 by a relatively large distance in the second machine direction MD2 while allowing adjacent transport members 132 to be positioned relatively close to one another on the first and second tracks 154a and 154b, the first and second tracks 154a and 154b may each include an outer track 176 and an inner track 177, shown as outer tracks 176a and 176b and inner tracks 177a and 177b in FIG. 10, 11A, 11B, or 12. The transport member 132 may include rollers 155 that are operatively engaged with each of the outer and inner tracks 176a,b and 177a,b. For example, outer translation rollers 171 may be operatively connected with each of the first and second end portions 144 and 146 of the transport member 132 and operatively engaged with the outer tracks 176a and 176b. Inner translation rollers 173 may be operatively connected with each of the first and second end portions 144 and 146 of the transport member 132 and operatively engaged with the inner tracks 177a and 177b.

With reference to FIGS. 11A-12, engaging outer translation rollers 171 with the outer tracks 176 and engaging inner translation rollers 173 with the inner tracks 177 allows for the first and second end portions 144 and 146 of the transport member to have a substantially Z-shape or S-shape. The shape of the first and second end portions 144 and 146 of the transport member 132 can allow the first and second end portions 144 and 146 of adjacent transport members 132 to at least partially nest together, which, in turn, allows adjacent carriages 134 to position relatively close together. In particular, a substantially Z-shaped or S-shaped first or second end portion 144 or 146 of the transport member 132 allows outer rollers 171 and inner roller 173 to at least partially overlap at the same or substantially the same second machine-directional MD2 position on the first and second tracks 154a and 154b. Nesting of the transport members allows the spacing in the second machine direction MD2 between outer translation rollers 171 on the first roller support members 151a and 151c and inner translation rollers 173 on the second roller support members 151b and 151d to be greater than the length of the transport member 132 and/or the carriage 134 as measured in the second machine direction MD2. This increased spacing between rollers 155 provides greater stability for the carriages 134. The increased spacing between rollers 155 also can better resist twisting moments in the plane of the top surface of transport member 132 induced by high accelerations transmitted by a single carriage drive belt 190 which can be offset from the center of mass of the carriage 134.

With reference to FIGS. 11A and 11B, the first and second tracks 154a and 154b may include multiple engaging surfaces for the rollers 155. For example, the outer tracks 176 may include horizontal outer track surfaces 268a and 268b that are parallel to each other and that are configured to engage with outer translation rollers 171. The inner tracks 177 may include horizontal inner track surfaces 270a and 270b that are parallel with each other and that are configured to engage with inner translation rollers 173. The outer tracks 176 may also include vertical outer track surfaces 272a and 272b that are orthogonal to the outer horizontal track surfaces 268a and 268b. The inner tracks 177 may include vertical inner track surfaces 274a and 275b that are orthogonal to the inner horizontal track surfaces 270a and 270b.

With continuing reference to FIGS. 11A and 11B, the transport member 132 may include rollers 155 that are configured to engage with the vertical outer and inner track surfaces 272 and 274, respectively. For example, the transport member 132 may include outer vertical roller 181 that is configured to engage with vertical outer track surface 272. The transport member 132 may include inner vertical roller 183 that is configured to engage with vertical inner track surface 274. Engaging outer and inner vertical rollers 181 and 183 with the vertical outer and inner track surfaces 272 and 274 controls the clearance between the transport member 132 and the first and second tracks 154a and 154b, which may limit the ability of one end portion of the transport member 132 to swing in the second machine direction MD2 relative to the other portions of the transport member 132. This, in turn, reduces wear and incidences of breakage of the transport member 132.

With reference to FIGS. 10-12, the transport member 132 may include a plurality of roller support members 151 that are operatively connected the rollers 155 to the transport members 132. For example, first and second roller support members 151a and 151b may be connected with the first end portion 144 and third and fourth roller support members 151c and 151d may be connected with the second end portion 146 of each transport member 132. Each roller support member 151 may be movably connected with the transport member 132. For example, the roller support members 151 may be pivotally connected with the transport member 132. Each roller support member 151 may be operatively connected with one or more rollers 155 that are operatively engaged with the first or second track 154a or 154b. For example, the first and third roller support members 151a and 151c may each be operatively connected with outer translation rollers 171 and outer vertical rollers 181. The second and fourth roller support members 151b and 151d may each be operatively connected with inner translation rollers 173 and inner vertical rollers 183.

By pivotally connected the roller support members 151 with the transport member 132, the transport member 132 can transition from the linear sections to the arcuate sections. For example, as outer translation rollers 171a transition between a linear section 161 and an arcuate section 163 or an arcuate section 163 to a linear section 161 of the outer tracks 176a and 176b, the first and third roller support members 151a and 151c pivot relative to the transport member 132. Pivoting of the roller support members 151a and 151c helps to steer vertical outer rollers 181 and prevents skidding of vertical outer rollers 181 relative to the outer vertical surface 272 on outer tracks 176a and 176b. Likewise, as inner translation rollers 173a transition between a linear section and an arcuate section or an arcuate section to a linear section of the inner tracks 177a and 177b, the second and fourth roller support members 151b and 151d pivot relative to the transport member 132. Pivoting of the second and fourth roller support members 151b and 151d helps to steer vertical inner rollers 183 and prevents skidding of vertical inner rollers 183 relative to the inner tracks 177a and 177b.

Abrupt transitions from straight and arcuate sections 161 and 163 can prevent the transport member 132 from travelling smoothly and quietly at very high operating speeds. The transport member 132 can experience high acceleration and jerk as it transitions between linear sections 161 to arcuate sections 163 and arcuate sections 163 to linear sections 161. These high accelerations of the transport member 132 can be transmitted to the carriage drive mechanism 136 and can result in high peak drive torque spikes at the motors 198 and high peak force spikes transmitted by the carriage drive belts 190. As inner and outer translation rollers 173b, 173a, 171b, and 171a, respectively, sequentially transition between a linear section to an arcuate section or an arcuate section to a linear section of horizontal inner and outer track surfaces 270a, 270b, 268a, and 268b, the wide spacing between rollers 155 spreads out the time for transitioning the motion of the carriage 134 from a linear to arcuate or arcuate to linear path. This reduces acceleration and jerk acting on the carriage 134. This results in a smoother running carriage drive mechanism 136 with reduced peak drive torque at the motors 198 and reduced peak forces transmitted by the carriage drive belts 190.

Figure 15:
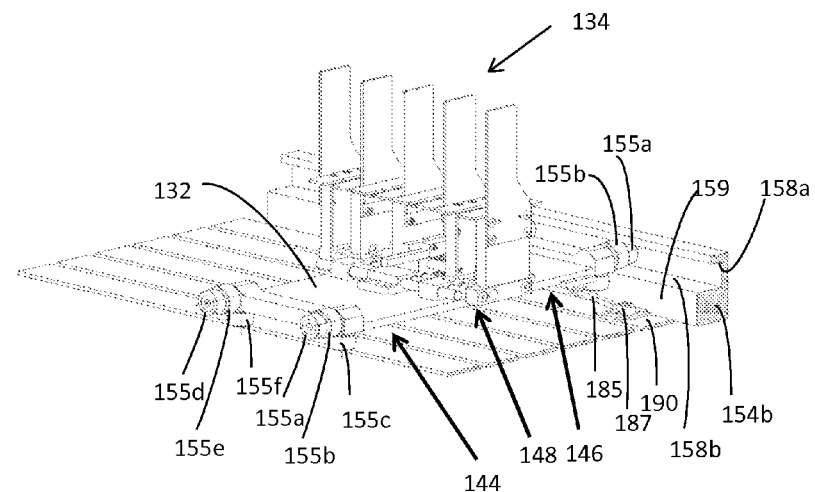
FIG. 15 is a perspective view of a portion of the grouping apparatus of FIG. 13 with portions of the grouping apparatus removed to move clearly show a portion of the second track and a transport member connected with the second track.
Figure 16:
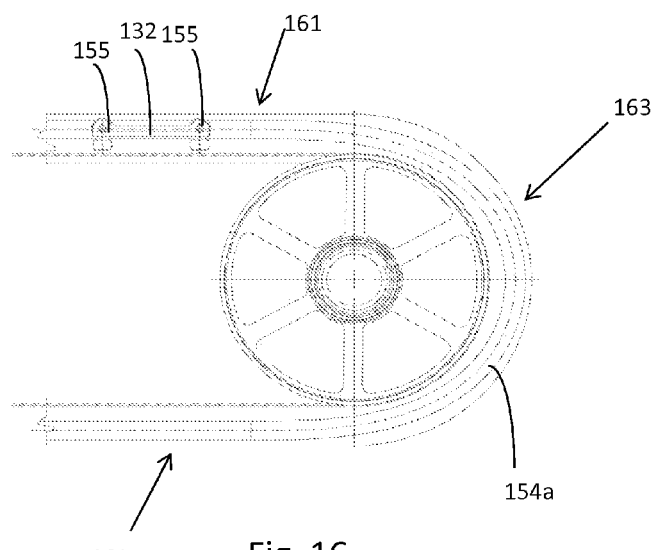
FIG. 16 is a side, elevation view of a portion of the grouping apparatus of FIG. 13 having a track with a linear section and a curved section.

With reference to FIGS. 13-16, the shape of the first and second tracks 154a and 154b may deviate from a simple combination of linear sections 161 and arcuate sections 163 where the linear sections 161 are tangent to the arcuate sections as shown in FIGS. 7B-9 and 10-12. The first and second tracks 154a and 154b can be engineered to minimize the acceleration and jerk acting on the carriage 134 as it traverses the closed path established by the first and second tracks 154a and 154b. This is accomplished by allowing for a variable offset between the path of the first and second tracks 154a and 154b and the path of drive belts 190 supported by drive sprocket 192 and carriage idler sprocket 194. The paths for the first and second tracks 154a and 154b can optionally include portions that are substantially parallel to linear spans of carriage drive belts 190 supported between carriage drive sprocket 192 and carriage idler sprocket 194. The paths for the first and second tracks 154a and 154b can optionally include portions that are concentric to carriage drive sprocket 192 and carriage idler sprocket 194. Easement curves for the path of engaging surfaces 158a and 158b can be engineered to provide a gradual transition between linear sections 161 and arcuate sections 163. Referring to FIG. 16, linear sections 161 can be connected to an arcuate section 163 that comprises a continuous engineered cam path with a variable radius relative to the axis of rotation for drive sprocket 192 and carriage idler sprocket 194. Easement curves and engineered cam paths can eliminate the high infinite jerk that can be created by transitions from linear sections 161 to arcuate sections 163 of the first and second tracks 154a and 154b. This reduces acceleration and jerk acting on the carriage 134. This results in a smoother running carriage drive mechanism 136 with reduced peak drive torque at the motors 198 and reduced peak forces transmitted by the carriage drive belts 190.

Referring to FIGS. 13-16, the rollers 155 can be configured so that each roller only rotates in a single direction as the transport member 132 moves in the second machine direction MD2 about the closed travel path. For example, first and second rollers 155a and 155b can be axially stacked to operatively engage with tracks 154a and 154b. The diameter of the first roller 155a is less than or equal to the diameter of the second roller 155b. The first roller 155a operably engages the first engaging surfaces 158a. The second roller 155b operably engages the second engaging surfaces 158b. In operation, as the transport member 132 traverses the path of engaging surfaces 158a and 158b, rollers 155a and 155b only rotate in one direction when the rollers are in contact with the engaging surfaces 158a or 158b. This eliminates the reversing rotation and skidding that are typical when a single roller switches back and force between parallel surfaces of a track. First and second rollers 155a and 155b can be concentric or can be eccentric which can allow rotation of eccentric axis to adjust clearance between rollers and the first and second engaging surfaces 158a and 158b.

Likewise fourth and fifth rollers 155d and 155e can be axially stacked to operatively engage with tracks 154a and 154b. The diameter of fourth roller 155d is less than or equal to the diameter of fifth roller 155e. Fourth roller 155d operably engages engaging surfaces 158a and fifth roller 155e operably engages engaging surfaces 158b. In operation as the transport member 132 traverses the path of engaging surfaces 158, fourth and fifth rollers 155d and 155e only rotate in one direction when the rollers are in contact with the engaging surfaces 158. This eliminates the reversing rotation and skidding that are typical when a single roller switches back and force between sides of a track groove. Fourth and fifth 155d and 155e can be concentric or can be eccentric which can allow rotation of eccentric axis to adjust clearance between rollers and the engaging surfaces.

With reference to FIGS. 13-16, the transport member 132 may include first and second vertical rollers 155c and 155f. The first and second vertical rollers 155c may be operatively engaged with vertical engaging surfaces 159. The third engaging surface 159 may be orthogonal to the first and second engaging surfaces 158a and 158b. The first and second vertical rollers 155c and 155f, like the outer and inner vertical rollers 181 and 183 of FIGS. 11A-11B, help resist twisting moments in the plane of the top surface of transport member 132 induced by high accelerations transmitted by a single carriage drive belt 190 which can be offset from the center of mass of the carriage 134. Stated another way, the first and second vertical rollers 155c and 155f help maintain the first and second end portions 144 and 146 of the transport member 132 at substantially the same second machine-directional MD2 position on the first and second tracks 154a and 154b.

Connection of carriage drive belt or drive belts 190 to the transport member 132 must be able to transmit motive force as the offset distance between carriage drive belt 190 and transport member 132 varies. A link 185 as shown in FIG. 15 can be connected attachment member 187 by pivots or flexible attachment between drive belt 190 and transport member 132 to transmit force.

With reference to FIGS. 7A, 7B, and 17-20B, each carriage 134 includes a base 160 and a plurality of support members 162 connected with the base 160. Each carriage 134 may include internal support members such as support members 162b, 162c, and 162d and external support members such as support members 162a and 162e. Two adjacent support members 162, such as a first support member 162a and a second support member 162b shown in FIG. 17 for illustrative purposes only, and a portion of the base 160 combine to form an article receiving compartment 164. The article receiving compartment 164 is configured to receive an individual article 10. An article 10 may advance into an article receiving compartment 164 at a first open end 172 and may exit the article receiving compartment 164 at a second open end 174. The support members 162 are also configured to separate adjacent articles 10 advancing on a single carriage 134. By separating adjacent articles 10 on the carriage 134, adjacent articles 10 are prevented from colliding and possibly tipping over while advancing on the grouping apparatus 104. Each support member 162 may be defined by a height 166 and a depth 168.

Figure 17:
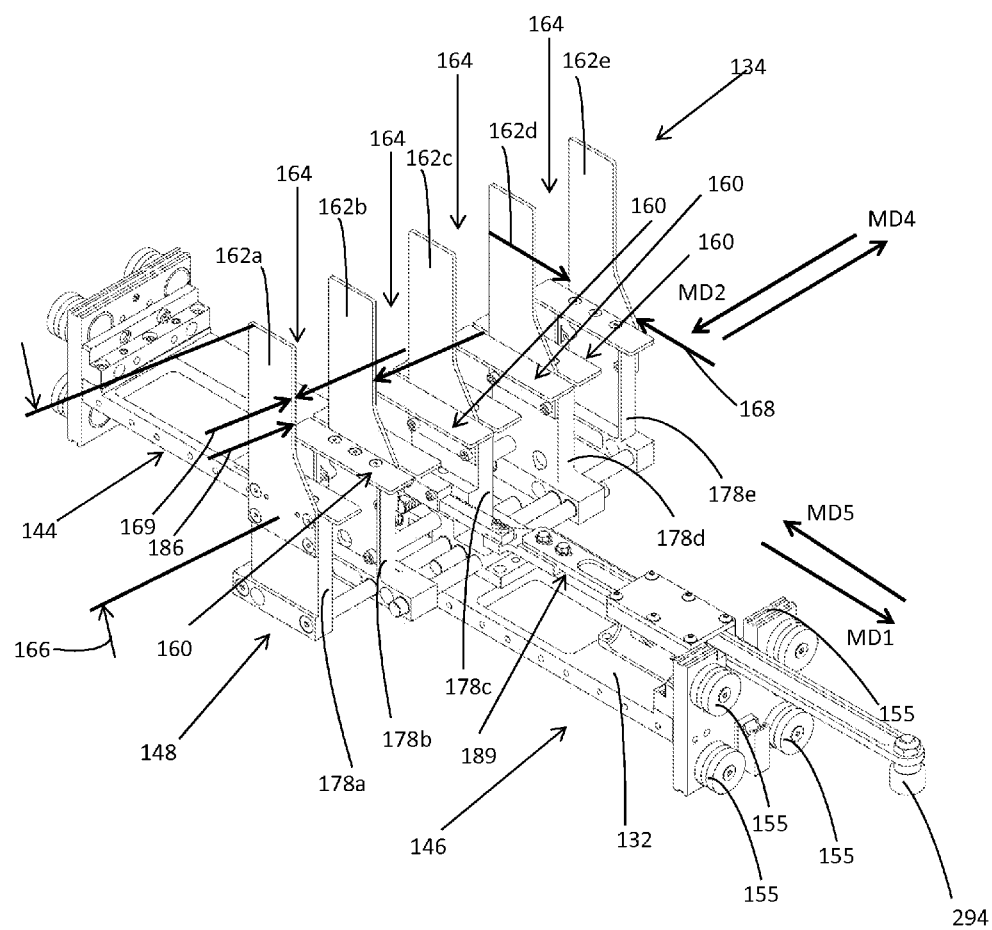
FIG. 17 is a perspective view of a transport member and a carriage connected with the transport member.

Each carriage 134 may have one or more article receiving compartments 164. As shown in FIG. 17, a carriage may have four article receiving compartments 164. However, it is to be appreciated that each carriage 134 may have fewer or greater than four article receiving compartments 164. Each carriage 134 of the grouping apparatus 104 may have the same number of article receiving compartments 164, or different carriages 134 of the grouping apparatus 104 may have a different number of article receiving compartments 164. The article receiving compartments 164 may be defined by a compartment width 186.

The compartment width 186 of the article receiving compartment 164 is optimally configured to provide some clearance between the side walls 18 of the article 10 and the support members 162. The compartment width 186 may be greater than the depth 32 of the article 10 when the depth 32 is aligned in the second machine direction MD2 or the compartment width 186 may be greater than the width 30 of the article 10 when the width 30 is aligned in the second machine direction MD2. For example, the compartment width 186 may be adjusted to 0.1 to 2.0 mm greater than the article depth 32 when the depth 32 is aligned in the second machine direction MD2. As such, the article 10 is able to move in the first machine direction MD1 relative to the support members 162 as the article 10 is advanced by the transport member 132.

While the example in FIG. 17 shows a receiving compartment 164 with parallel sides created from parallel support members 162 of constant thickness 169, it is possible to create a receiving compartment 164 with non-parallel sides. This might be desirable if the article 10 has a substantially smaller depth 32 near the bottom than near the top of the article or if the article 10 has a substantially larger depth 32 near the bottom than near the top of the article. This may better control article 10 stability while advancing the carriage 134 with high accelerations. A receiving compartment 164 with non-parallel sides may be accomplished by employing support members 162 with non-constant thickness 169 along their elevation. This can also be accomplished by installing variable thickness inserts adjacent to the support members 162, adding air bladders to the support member to modify thickness or by adjusting the relative angle between a plurality of articulated support members 162.

With reference to FIG. 17, each article receiving compartment 164 may be configured to receive a single article 10. An article receiving compartment 164 of a predetermined size may be configured to receive an article 10 having various shapes and dimensions. For example, a single article receiving compartment 164 of a predetermined size may be capable of receiving single articles 10 of various heights, widths, depths, and/or overall shapes. The support members 162 may have various heights 166 extending from the base 160. For example, the height 166 of the support members 162 may be greater than the height 20 of the articles 10 to be received, less than the height 20 of the articles 10 to be received, or substantially the same as the height 20 of the articles 10 to be received. The support members 162 may have various widths 168. The depth 168 may be constant or variable from the base 160 to the end of the support members 162. For example, the depth 168 of the support members 162 may be designed to be less than the width 30 of the articles 10 to be received, greater than the width 30 of the articles 10 to be received, or substantially equal to the width 30 of the articles 10 to be received. The height 166 of the support members 162 may be less than the height 20 of the articles 10 to be received and the depth 168 of the support members 162 to be less than the width 30 of the articles 10 to be received.

While it is shown in FIGS. 7A and 7B that the grouping apparatus 104 may comprise ten carriages 134 and FIG. 10 that the grouping apparatus 104 may comprise twelve carriages 134, it is to be appreciated that the grouping apparatus 104 may comprise fewer or greater than ten carriages 134. For example, the grouping apparatus 104 may comprise three carriages, four carriages, five carriages, six carriages, seven carriages, eight carriages, nine carriages, ten carriages, eleven, twelve carriages, or any number greater than twelve carriages. The grouping apparatus 104 may comprise at least three carriages, or at least four carriages, or at least five carriages.

With reference to FIGS. 3A, 3B, 4 and 6, the grouping apparatus 104 may also comprise one or more guide members 170, such as guide member 170a and guide member 170b shown for exemplary purposes only. The guide members 170a and 170b may extend in the second machine direction MD2 and may be disposed adjacent to the travel path of the carriages 134. As a result, the guide members 170a and 170b may aid in controlling the first machine-directional MD1 position of the articles 10 as they advance in the second machine direction MD2 on a carriage 134. The guide members 170a and 170b may be disposed adjacent to both open ends 172 and 174 of the carriages 134 or a guide member 170 may be positioned on only one of the two open ends 172 or 174 of the carriages 134. The guide member(s) 170a and 170b may extend in the second machine direction MD2 along a portion of the grouping apparatus 104. For example, guide member(s) 170a may extend from downstream of the article receiving zone 140 to the article discharge zone 142 of the grouping apparatus 104 to control the first machine-directional MD1 positioning of the articles 10 as the articles 10 advance on a carriage 134 from the article receiving zone 140 to the article discharge zone 142. Guide member(s) 170b may extend from the article receiving zone 140 to upstream of the article discharge zone 142 of the grouping apparatus 104. Positioning one or more guide members 170 proximal to the second open end 174 in the article receiving zone 140 may also assist in changing the direction of movement of the articles 10 from the first machine direction MD1 on the infeed carrier apparatus 102 to the second machine direction MD2 on the grouping apparatus 104 and may also prevent the articles 10 from advancing through the second open end 174 of an article receiving compartment 164. As shown in FIG. 4, by arranging the carriages 134 of each transport member 132 in the same first machine-directional MD1 position on the grouping apparatus 104, each carriage 134 is able to advance in the second machine direction MD2 unhindered by guide member(s) 170. The location and elevation of guide members 170 may be manually or automatically adjustable to accommodate different article 10 shapes and sizes.

The compartment width 186 of each article receiving compartment 164 may be adjustable. With reference to FIGS. 17-20B, the base 160 may include at least two base portions 178, shown in FIG. 17 as first, second, third, fourth, and fifth base portions 178a, 178b, 178c, 178d, and 178e, respectively, for illustrative purposes only. A support member 162 may be connected with each base portion 178. The support members 162 may be fixedly connected with the base portions 178. While it is shown that the base comprises five base portions 178, it is to be appreciated that the base may comprise one, two, three, four, five, or more than five base portions 178. Each base portion 178 may be operatively connected with each other base portion 178. Base portions 178 may be brought nearer to adjacent base portions 178 or base portions 178 may be moved away from adjacent base portions 178. As a result, the compartment width 186 of the article receiving compartment 164 may be decreased or increased, respectively, without disconnecting the support members 162 from the base 160. That is, the base 160 may be selectively positionable in a first configuration and a second configuration. In the first configuration, the compartment width may be defined by a first length. In the second configuration, the compartment width may be defined by a second length that is different from the first length. The first length may be greater or less than the second length.

The compartment width may be adjusted in various ways. For example, each carriage 134 may comprise an adjustment mechanism 189. The adjustment mechanism 189 may be configured to equally adjust the compartment width 186 between all support members 162 of a carriage 134. Or, the adjustment mechanism 189 may be configured to individually adjust different compartment widths 186 between adjacent support members 162 on a carriage.

Figure 18:
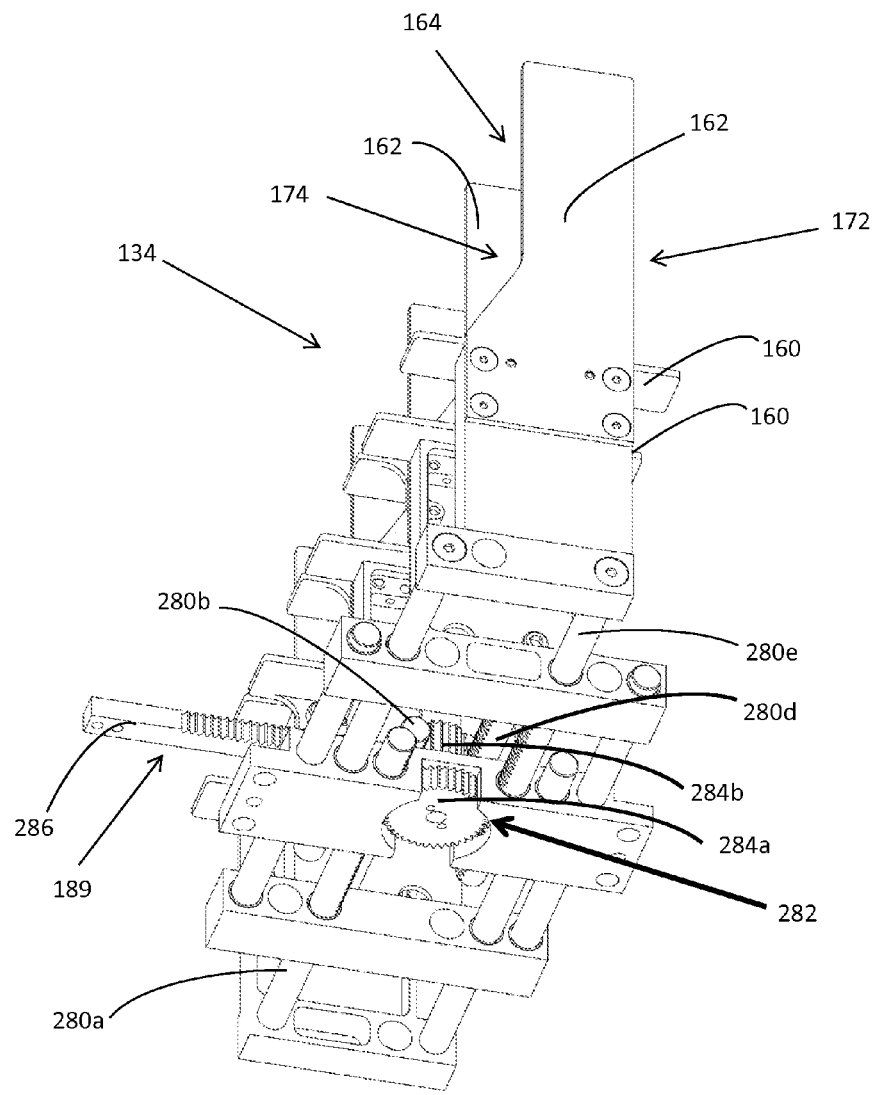
FIG. 18 is a bottom, perspective view of a carriage having an adjustment mechanism.
Figure 19:
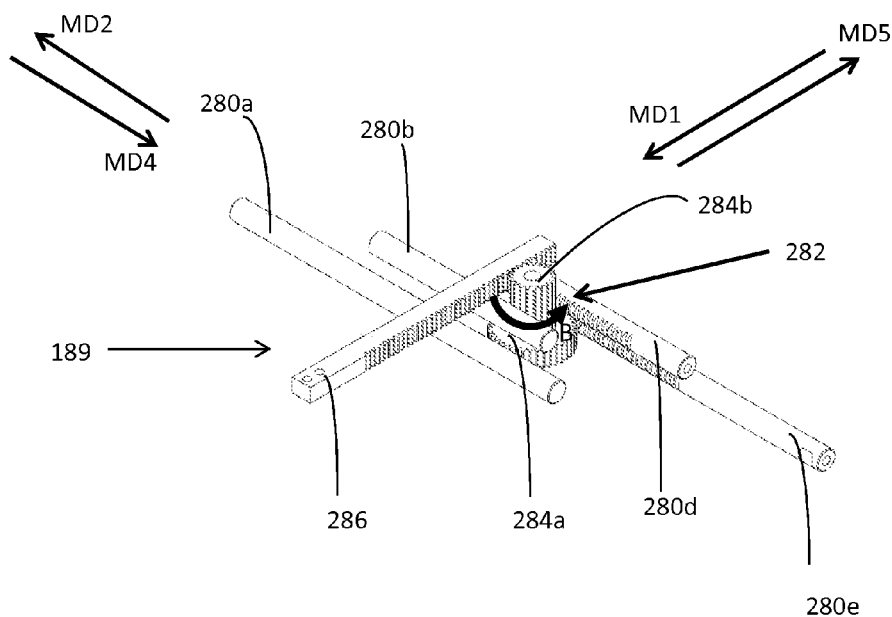
FIG. 19 is a perspective view of a rack pinion system of an adjustment mechanism.
Figure 20A:
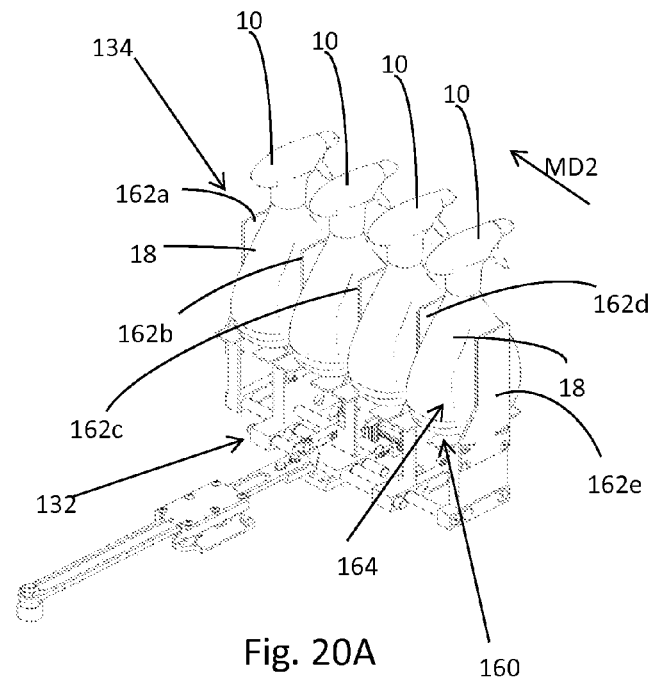
FIG. 20A is a perspective view of a carriage, an adjustment mechanism, and a plurality of articles disposed in article receiving compartments of the carriage.
Figure 20B:
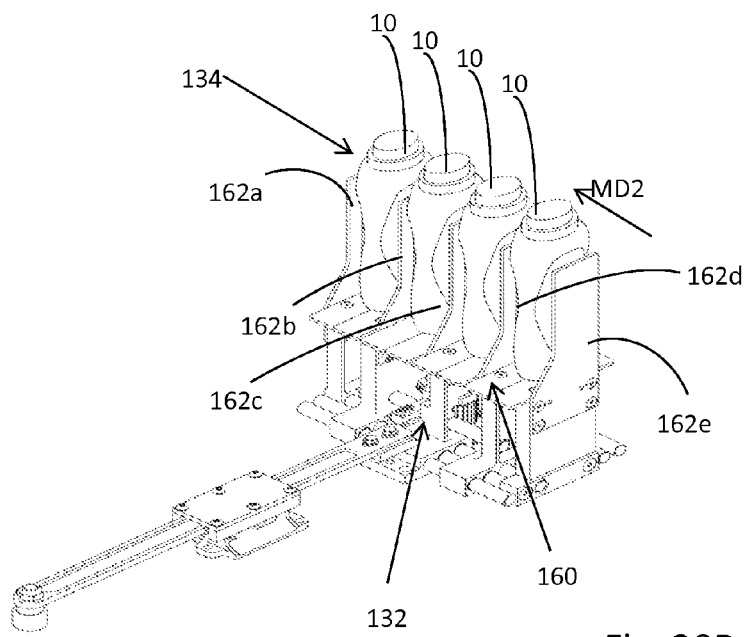
FIG. 20B is a perspective view of a carriage, an adjustment mechanism, and a plurality of articles disposed in article receiving compartments of the carriage.

With reference to FIGS. 17-19, the adjustment mechanism 189 may be configured to equally adjust the compartment width 186. In order to equally adjust the compartment widths 186, the central base portion 178c may be fixedly connected with the carriage 134. The other base portions, such as base portions 178a, 178b, 178d, and 178e may be operatively connected with racks 280a, 280b, 280d, and/or 280e, respectively. The racks 280a, 280b, 280d, and 280e may be arranged parallel with each other. Racks 280a, 280b, 280d, and 280e may each be configured to traverse the second machine direction MD2 and in a fourth machine direction MD4 that is opposite to the second machine direction MD2. Movement of rack 280a in the second or fourth machine direction MD2 or MD4 causes base portion 178a to traverse in the second or fourth machine direction MD2 or MD4, respectively. Likewise, movement of rack 280b in the second or fourth machine direction MD2 or MD4 causes base portion 178b to traverse in the second or fourth machine direction MD2 or MD4, respectively; movement of rack 280d in the second or fourth machine direction MD2 or MD4 causes base portion 178d to traverse in the second or fourth machine direction MD2 or MD4, respectively; and movement of rack 280e in the second or fourth machine direction MD2 or MD4 causes base portion 178e to traverse in the second or fourth machine direction MD2 or MD4, respectively.

Central pinion 282 may include a first coaxial pinion gear 284a connected with a second coaxial pinion gear 284b. The first and second coaxial pinion gears 284a and 284b may be configured to rotate together in direction B. The first coaxial pinion gear 284a may have twice the tooth count as the second coaxial pinion gear 284b. Adjustment rack 286 may be aligned to traverse in a fifth machine direction MD5 that is parallel with the first machine direction MD1. Adjustment rack 286 may be in meshed contact with the second coaxial pinion gear 284b. The racks 280b and 280d may also be in meshed contact with the second coaxial pinion gear 284b on opposite sides of the second coaxial pinion gear 284b. The racks 280a and 280e may be in meshed contact with opposite sides of the first coaxial pinion gear 284a. Alternatively adjustment rack 286 may be in meshed contact with the first coaxial pinion gear 284a.

In an example adjustment of the carriage 134, a two millimeter movement of adjustment rack 286 in the first machine direction MD1 may cause corresponding rotation of the second coaxial pinion gear 284b and the first coaxial pinion gear 284a. Rotation of the first and second coaxial pinion gears 284a and 284b results in a two millimeter motion of the rack 280b and corresponding second base portion 178b in the fourth machine direction MD4 and a two millimeter motion of the rack 280d and corresponding forth base portion 178d in the second machine direction MD2. Due to the larger diameter of the first coaxial pinion gear 284a, the two millimeter first machine directional MD1 movement of adjustment rack 286 results in the rack 280a and corresponding first base portion 178a moving four mm in the fourth machine direction MD4 and the rack 280e and corresponding fifth base portion 178e moving four mm in the second machine direction MD2. Hence the first machine directional MD1 adjustment of adjustment rack 286 results in equal adjustment with two mm reduction of the compartment widths 186 between all support members 162 on the carriage 134.

Referring to FIGS. 3A, 7A, and 17-19, the adjustment mechanism 189 may be operatively connected to an adjustment cam 288. The adjustment cam 288 may be used to simultaneously adjust the compartment widths 186 for all article receiving compartments 164 of all of the carriages 134. The adjustment cam 288 is configured to translate in a direction parallel with the first machine direction MD1 using adjustment cam translation mechanism 290 and adjustment cam motor 292. The end of adjustment rack 286 for each carriage 134 may include a cam follower 294 that rollably or slideably engages with adjustment cam 288. In the case when the control surface of the adjustment cam 288 is coplanar with a vertical plane parallel to the second machine direction MD2, then the compartment width 186 for every carriage 134 are adjusted to be the same.

Various mechanisms may be used to move the adjustment rack 286. For example, a locking mechanism may be used to temporarily fix the adjustment rack 286 at a particular position relative to the carriage 134. The locking mechanism may employ friction, locking teeth, threads, pins or other methods to temporarily fix the adjustment rack 286 relative to the carriage 134. To adjust the adjustment rack 286, the adjustment rack 286 is disengaged from the locking mechanism and is then able to move parallel with the first machine direction MD1. Adjustment of the adjustment rack 286 may be accomplished by an external positioner while the carriage 134 is either stationary or moving. The external positioner may be a robot, mechanically or electrically driven positioner, or a stationary cam that moves the position of a cam follower attached to the adjustment rack 286 when there is relative motion between the carriage 134 and an adjustment cam.

The adjustment mechanism 189 may be used to adjust the compartment width 186 of each article receiving compartment 164 to accommodate articles 10 of different dimensions. The adjustment mechanism 189 may be used to readjust the compartment width 186 in between processing of different size and/or shaped articles 10.

The adjustment mechanism 189 may be controlled in various ways. The adjustment mechanism 189 may be electronically or mechanically controlled. For example, the grouping apparatus control system 138 may command motion of the adjustment cam motor 292 that, in turn, causes adjustment to the first machine direction MD1 position of cam 288 and position of the adjustment rack 286. First machine-directional MD1 positioning of the adjustment cam 288 may be manually adjusted by adjustment cam translation mechanism 290. Or, automatic adjustment of the adjustment rack 286 may occur through coordination with the movement of carriages 134 with the motor(s) 198 of the grouping apparatus 104. For example, when adjusting to a wider compartment width 186, carriages 134 may be advanced to increase space between adjacent carriages 134.

The adjustment mechanism 189 may adjust the compartment widths 186 either statically or dynamically. For example, the compartment width 186 can be adjusted dynamically as the carriage 134 advance in the second machine direction MD2. In one example, the compartment width 186 may be arranged in a first configuration in the article receiving zone 140. As the same carriage 135 advances in the second machine direction MD2, the compartment width 186 may be adjusted to a second configuration prior to arriving at the article discharge zone 142. In such an example, the article receiving compartment 164 may provide a larger clearance for the article 10 in the first configuration than in the second configuration at the article discharge zone 142. Or, the article receiving compartment 164 may provide a smaller clearance for the article in the first configuration than in the second configuration at the article discharge zone 142.

The compartment width 186 may be dynamically adjusted to more than two configurations. For example, the adjustment mechanism 189 may induce oscillating movement to the support members 162 in order to oscillate the compartment width 186 in order to assist the articles 10 in aligning to the most stable orientation. Dynamic adjustment of the compartment width 186 may be accomplished by an adjustment cam 288 with control surface of the adjustment cam 288 not coplanar with a vertical plane parallel to the second machine direction MD2.

The adjustment mechanism 189 may be configured in various other ways. For example, gear teeth may be used in racks 280b and 280c and in the coaxial pinion 282 can be replaced with friction elements. Adjustment screws may also be used to produce equal motion of the compartment widths 186. One or more adjustment screws may be used that turn a different number of rotations or screws with section of varying pitch may also be used. Adjustment cams may also be employed such as a translating or rotating plate cam. Various other adjustment mechanisms include a belt or cable operated spreading mechanism; mechanical linkages; multiple linear or rotary motors; or hydraulic or pneumatic actuation. The adjustment mechanism may also allow base portion 178 to be disengaged and adjusted by an external actuator such as a robot or a plate cam. The base portion may then be engaged by a friction brake or other locking mechanism that prevents movement of the base portion 178 relative to the carriage 134. The adjustment mechanism 189 may be mechanically or electrically driven.

Instead of a plurality of base portions, as shown in FIGS. 17 and 18, the carriage may comprise a single base portion. It is to be appreciated that the compartment width of a carriage comprising a single base portion may not be adjustable. Or, the compartment width of a carriage comprising a single base portion may be adjustable by disengaging and reengaging portions of the carriage 134, such as the support members 162.

As discussed above and with reference to FIGS. 7A-9, each transport member 132 may be operatively connected with a carriage drive mechanism 136. Each carriage 134 may be connected with a separate carriage drive mechanism 136, or a portion of the carriages 134 of the grouping apparatus 104 may be connected with a common carriage drive mechanism 136. The carriage drive mechanism 136 may be operatively connected with the frame 130 of the grouping apparatus 104. The carriage drive mechanism 136 may be configured in various different ways. For example, the carriage drive mechanism 136 may include a belt and sprocket system, a chain and sprocket system, a pulley and cable system, moving magnet linear motor drive system, or the like.

The grouping apparatus 104 may comprise various number of carriage drive mechanisms 136. For example, the grouping apparatus 104 may include five carriage drive mechanisms 136 such as shown in FIGS. 7A and 7B or may comprise six carriage drive mechanisms 136 as shown in FIG. 10. However, it is to be appreciated that various numbers of carriage drive mechanisms 136 may be used, including fewer or greater than five carriage drive mechanisms. The number of carriage drive mechanisms 136 needed may depend upon the required article throughput rates of the particular manufacturing process and the variable range of lanes 112 that may need to be created in the article discharge zone 142.

With reference to FIGS. 7A-9, the carriage drive mechanism 136 may comprise a belt and sprocket system. Each carriage drive mechanism 136 may comprise a carriage drive belt 190 that is operatively connected with at least one transport member 132 and the carriage 134 associated with the transport member 132. Each transport member 132 may be operatively connected with at least carriage drive belts 190. For illustrative purposes only, a first carriage 134a1 and a sixth carriage 134a2 may each be operatively connected with first and second carriage drive belts 190a1 and 190a2; a second carriage 134b1 and a seventh carriage 134b2 may each be operatively connected with third and fourth carriage drive belts 190b1 and 190b2; a third carriage 134c1 and an eighth carriage 134c2 may each be operatively connected with fifth and sixth carriage drive belts 190c1 and 190c2; a fourth carriage 134d1 and a ninth carriage 134d2 may each be operatively connected with seventh and eighth carriage drive belts 190d1 and 190d2; and a fifth carriage 134e1 and a tenth carriage 134MD2 may each be operatively connected with ninth and tenth carriage drive belts 190e1 and 190e2. However, it is to be appreciated that each carriage drive belt may be operatively connected with one, two, or more than two carriages. Moreover, each carriage may be operatively connected with one or more than one carriage drive belts 190. The transport members 132 connected with a particular carriage drive belt(s) 190 may be equally spaced apart relative to the carriage drive belt(s) 190.

Figure 13:
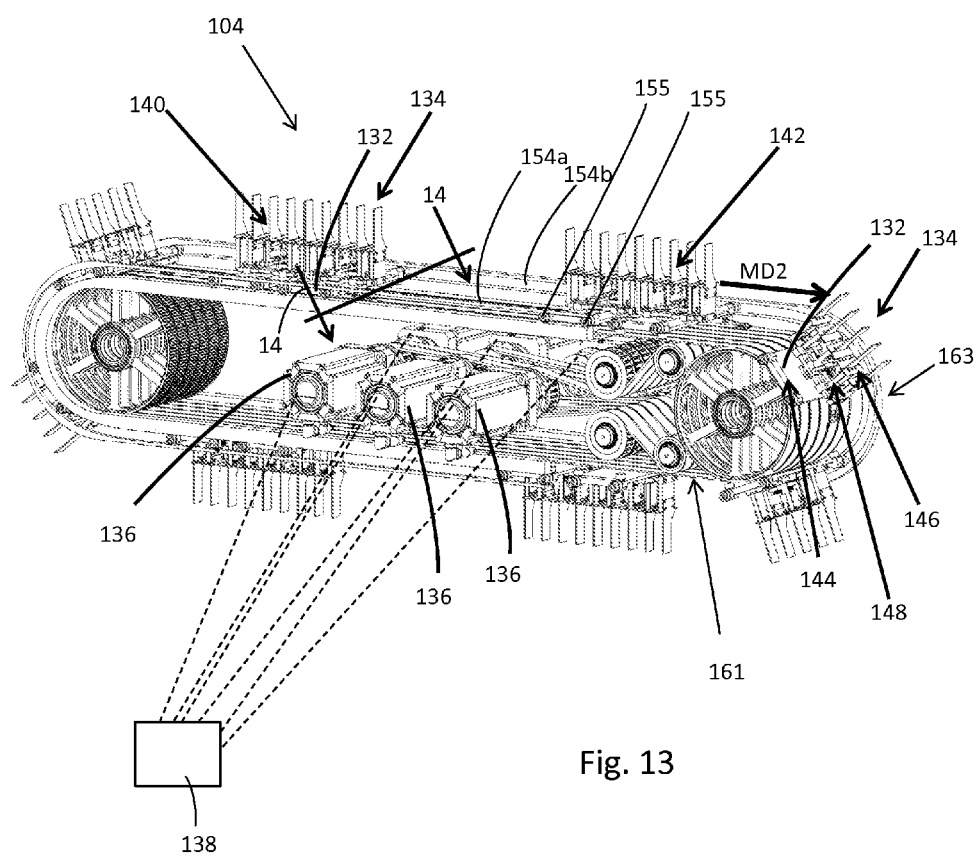
FIG. 13 is a perspective view of a grouping apparatus with a frame removed to more clearly show the first and second tracks of the grouping apparatus engaged with a plurality of transport members.
Figure 14:
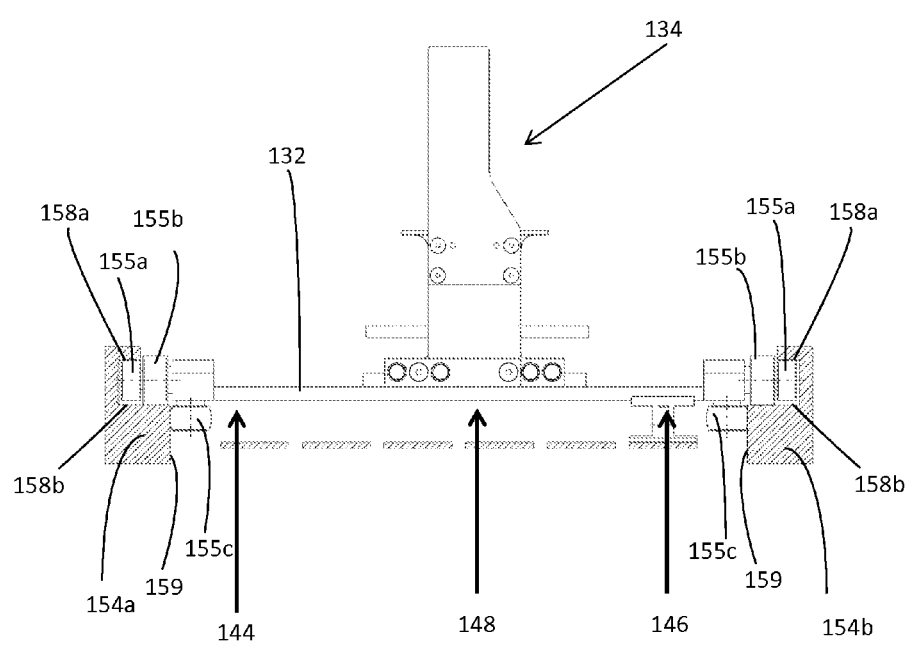
FIG. 14 is a cross-sectional view of the grouping apparatus of FIG. 13 taken along lines 14-14.

Connecting each transport member 132 with two carriage drive belts 190 may help maintain alignment of the transport member 132 in a direction perpendicular to the second machine direction MD2 without twisting as the transport member 132 experiences high accelerations. However, each transport member 132 may be connected with more or less than two carriage drive belts 190. For example, as shown in FIG. 13, each transport member 132 may be operatively connected with one carriage drive belt 190.

Carriage drive belts 190 for each carriage drive mechanism 136 may be arranged side-by-side from each adjacent carriage drive belt 190. Each carriage drive belt 190 may be operatively engaged with a carriage drive sprocket 192 and a carriage idler sprocket 194. With reference to FIGS. 7A-9, the carriage drive sprockets 192 and the carriage idler sprockets 194 may alternate being coaxial with either a first axis of rotation 191 and a second axis of rotation 193. Alternating the carriage drive sprockets 192 and the carriage idler sprockets 194 being coaxial with the first and second axis of rotation 191 and 193 may allow for relatively compact footprint of the grouping apparatus 104.

With reference to FIGS. 7A-9, each sprocket drive belt 196 is operatively engaged with the drive shaft 199, which is operatively connected with the motor 198. The sprocket drive belt 196 may be operatively engaged with the carriage drive sprocket 192 at a position of the carriage drive sprocket 192 not engaged with the carriage drive belt 190. It is to be appreciated that engaging the carriage drive sprocket 192 at a position of the carriage drive sprocket 192 not engaged with the carriage drive belt 190 allows for a compact shape and overall footprint for the grouping apparatus 104. The sprocket drive belt 196 can be a double-sided timing belt.

The carriage drive sprocket 192 and the carriage idler sprocket 194 may be configured to rotate in direction A about axis of rotation 191 or 193, respectively. In operation for each carriage drive mechanism 136, the motor rotates the drive shaft, causing the sprocket drive belt 196 to rotate the carriage drive sprocket 192 in direction A, which, in turn, causes the carriage drive belt 190 to move in the second machine direction MD2. Moving the carriage drive belt 190 also causes the carriage idler sprocket 194 to rotate in direction A.

For illustrative purposes only, and with reference to FIGS. 7A-9, a first motor 198*a* is operatively connected with first and second sprocket drive belts 196*a*1 and 196*a*2. The first sprocket drive belt 196*a*1 is operatively engaged with a first carriage drive sprocket 192*a*1 and the second sprocket drive belt 196*a*2 is operatively engaged with a second carriage drive sprocket 192*a*2. A second motor 198*b* is operatively connected with third and fourth sprocket drive belts 196*b*1 and 196*b*2. The third sprocket drive belt 196*b*1 is operatively engaged with a third carriage drive sprocket 192*b*1 and the fourth sprocket drive belt 196*b*2 is operatively engaged with a fourth carriage drive sprocket 192*b*2. A third motor 198*c* is operatively connected with fifth and sixth sprocket drive belts 196*c*1 and 196*c*2. The fifth sprocket drive belt 196*c*1 is operatively engaged with the fifth carriage drive sprocket 192*c*1 and the sixth sprocket drive belt 196*c*2 is operatively engaged with the sixth carriage drive sprocket 192*c*2. A fourth motor 198*d* is operatively connected with seventh and eighth sprocket drive belts 196*d*1 and 196*d*2. The seventh sprocket drive belt 196*d*1 is operatively engaged with a seventh carriage drive sprocket 192*d*1 and the eighth sprocket drive belt 196*d*2 is operatively engaged with an eighth carriage drive sprocket 192*d*2. A fifth motor 198*e* is operatively connected with ninth and tenth sprocket drive belts 196*e*1 and 196*e*2. The ninth sprocket drive belt 196*e*1 is operatively engaged with a ninth carriage drive sprocket 192*e*1 and the tenth sprocket drive belt 196*e*2 is operatively engaged with a tenth carriage drive sprocket 192*e*2.

With continuing reference to FIGS. 7A-9, the first carriage drive belt 190*a*1 may be operatively engaged with the first carriage drive sprocket 192*a*1 at one end of the grouping apparatus 104 and operatively engaged with a first carriage idler sprocket 194*a*1 at the opposite end of the grouping apparatus 104. Likewise, the second carriage drive belt 190*a*2 may be operatively engaged with the second carriage drive sprocket 192*a*2 and a second carriage idler sprocket 194*a*2. The third carriage drive belt 190*b*1 may be operatively engaged with the third carriage drive sprocket 192*b*1 and a third carriage idler sprocket 194*b*1. The fourth carriage drive belt 190*b*2 may be operatively engaged with the fourth carriage drive sprocket 192*b*2 and a fourth carriage idler sprocket 194*b*2. The fifth carriage drive belt 190*c*1 may be operatively engaged with the fifth carriage drive sprocket 192*c*1 and a fifth carriage idler sprocket 194*c*1. The sixth carriage drive belt 190*c*2 may be operatively engaged with the sixth carriage drive sprocket 192*c*2 and a sixth carriage idler sprocket 194*c*2. The seventh carriage drive belt 190*d*1 may be operatively engaged with the seventh carriage drive sprocket 192*d*1 and a seventh carriage idler sprocket 194*d*1. The eighth carriage drive belt 190*d*2 may be operatively engaged with the eighth carriage drive sprocket 192*d*2 and an eighth carriage idler sprocket 194*d*2. The ninth carriage drive belt 190*e*1 may be operatively engaged with the ninth carriage drive sprocket 192*e*1 and a ninth carriage idler sprocket 194*e*1. The tenth carriage drive belt 190*e*2 may be operatively engaged with the tenth carriage drive sprocket 192*e*2 and a tenth carriage idler sprocket 194*e*2.

While it is shown in FIGS. 7A-9 that the carriage drive sprocket 192 and the carriage idler sprocket 194 rotate about either the first axis of rotation 191 in direction A or about the second axis of rotation 193 in direction A, it is to be appreciated that the carriage drive sprocket 192 and the carriage idler sprocket 194 may also be configured to rotate in a direction opposite to direction A.

While each transport member 132 is connected with one or more carriage drive belts 190, the grouping apparatus 104 comprises carriage drive belts 190 that are not associated with certain transport members 132. For example, the transport member 132*a*1 may be operatively connected with carriage drive belts 190*a*1 and 190*a*2. Movement of carriage drive belts 190*b*1, 190*b*2, 190*c*1, 190*c*2, 190*d*1, 190*d*2, 190*e*1, and 190*e*2 that are not connected with transport member 132*a*1 will not cause movement of or affect the movement of transport member 132*a*1 if transport members are not allowed to collide. Instead, only carriage drive belts 190*a*1 and 190*a*2 will cause movement to transport member 132*a*1. Transport member 132*a*1 is able to move unimpeded over top of the carriage drive belts 190*b*1, 190*b*2, 190*c*1, 190*c*2, 190*d*1, 190*d*2, 190*e*1, and 190*e*2. The other transport members 132 operate in a similar manner. Each transport member 132 may be connected with a carriage drive mechanisms 136 and will be able to move unimpeded over carriage drive mechanisms 136 associated with the other transport member 132.

While it is shown in FIGS. 7A-9 that each carriage drive belt 190 is operatively engaged with one carriage drive sprocket 192 and one carriage idler sprocket 194, it is to be appreciated that each carriage drive belt 190 may be engaged with more than one carriage idler sprocket 194 or with more than one drive sprocket 192. As such, while it is shown in FIGS. 7A-9 that the carriage drive belts 190 are arranged in a substantially race-track shape around the carriage drive sprockets 192 and carriage idler sprockets 194, comprising two 180-degree curved sections connected with two parallel linear sections, it is to be appreciated that the carriage drive belts 190 may be arranged in various other shaped configurations depending upon the number and arrangement of the carriage idler sprockets 194. The carriage drive belts 190 may engage a portion of each drive sprocket 192 and idler sprocket 194, conforming to an arcuate shape around each drive sprocket 192 and each idler sprocket 194. If a carriage drive mechanism 136 comprises a total of three carriage drive sprockets and/or carriage idler sprockets, the carriage drive belts may be arranged in a substantially triangular shape. If the carriage drive mechanism comprises a total of four carriage drive sprockets and/or carriage idler sprockets, the carriage drive belts may be arranged in a substantially rectangular shape.

Figure 21:
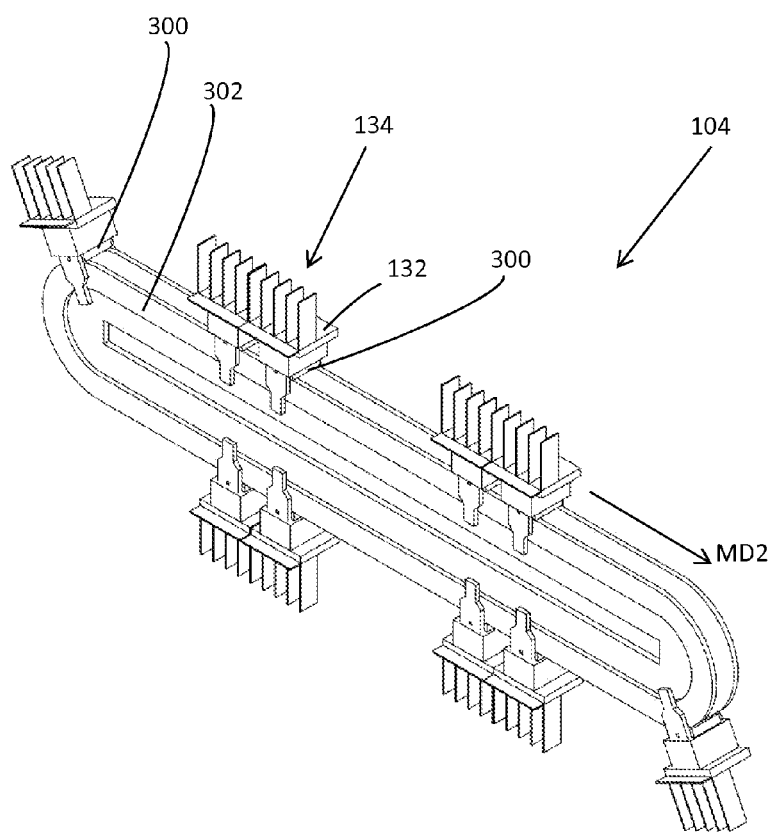
FIG. 21 is a perspective view of a grouping apparatus having a moving magnet linear drive system.

With reference to FIG. 21, the carriage drive mechanism 136 may also comprise a moving magnet linear motor drive system instead of the belt and sprocket system shown in FIGS. 7B and 10. Each transport member 132 may be operatively connected with mechanism magnet 300 that moves with the transport member 132. The magnet 300 is influenced by an electromagnetic field from electrically energized coils 302 around the path of motion that creates movement in the magnet 300 and connected transport member 132. A moving magnetic linear motor drive system may move the transport members, and thus the carriage associated with each transport member, about the closed travel path.

With reference to FIGS. 3A-7B, the grouping apparatus 104 also includes a grouping apparatus control system 138. The grouping apparatus control system 138 causes each carriage drive mechanism 136 to move the respective carriages 134 about the closed travel path. Individually controlling movement of multiple carriages 134 has several advantages, including allowing the grouping apparatus 104 to be flexible to changing conditions in upstream and downstream processing of articles. For example, individually controlling movement of the carriages 134 allows the grouping apparatus 104 to operate at relatively high throughput rates even when some articles have been rejected from the process. For example, an individual carriage 134 is able to wait at the article receiving zone 140 of the grouping apparatus 104 for the next article to advance onto the carriage 134 while other carriages 134 are able to continue delivering articles to the article discharge zone 142. Moreover, independently controlling carriages 134 allows the grouping apparatus 104 to act as an accumulator, meaning that the grouping apparatus 104 can receive articles at a rate greater or less than the rate of articles being removed from the grouping apparatus 104. This, in turn, decouples control of the movement of articles 10 entering the receiving zone 140 and articles 10 being removed at the discharge zone 142

Independently controlling carriages 134 allows individual carriages to be performing different functions at the same time. For example, one carriage 134 can actively be moving through the article receiving zone 140 to receive articles from the infeed carrier apparatus 102, while one or more carriages 134 are advancing to the article discharge zone 142. At the same time, one or more carriages 134 may momentarily stop or decelerate at the article discharge zone 142 to transfer articles onto the outfeed carrier apparatus 108. Additionally, one or more carriages 134 can be travelling from the article discharge zone 142 back to the article receiving zone 140 to receive more articles 10. Furthermore, individual carriages 134 are able to move at different speeds and accelerations in order for the carriages 134 to be in the desired locations at the desired times.

With reference to FIG. 3A, the grouping apparatus 104 may also include one or more sensors 200. The sensors 200 may have various functions. For example, one or more sensors 200 may be used to monitor the position of the most downstream article advancing on the infeed carrier surface 120 toward the grouping apparatus 104. The sensor 200 may also confirm presence of article 10. The sensor 200 may identify and compensate for articles 10 that have shifted position during conveying. In the event that the articles are too far out of position such as too close for the articles to feed into adjacent flights, the sensor 200 can identify this issue so the grouping apparatus control system 138 can shut the system down or force a reject. This sensor 200 may communicate with the grouping apparatus control system 138, causing a carriage drive mechanism 136 to index the carriage 134 positioned in the article receiving zone 140 in the second machine direction MD2 as the article advances onto the carriage 134. The sensor 200 could include any device that can detect the presence or position of an article 10. Non-limiting examples for sensor 200 could be a through beam optical sensor, retro-reflective optical sensor, ultrasonic sensor, capacitive sensor, laser distance measurement sensor, a 2D camera, a 3D camera, a line scan camera, a pneumatic sensor, and a mechanical lever arm that is actuated by a passing article 10. Also the position and presence of article 10 can be inferred without a sensor 10 by inferring position of articles 10 conveyed from an upstream source such as a filler and capper.

An advantage of the grouping apparatus 104 is that the grouping apparatus control system 138 is able to provide real-time adjustments to the movement of the individual carriages 134 to account for various process conditions, including a missing or misplaced article or articles. As a result, the grouping apparatus 104 is able to operate without having to shut down and/or significantly reduce speeds because of process variability occurring upstream or downstream of the grouping apparatus 104.

With reference to FIGS. 3A-7B, in operation, a carriage 134 advances to the article receiving zone 140 of the grouping apparatus to receive articles 10 advancing on the infeed carrier apparatus 102. As an article 10 advances into an article receiving compartment 164 of the carriage 134, the carriage drive mechanism 136 is configured to accelerate the carriage 134 in the second machine direction MD2 a predetermined distance to change the direction of movement of the article 10 from the first machine direction MD1 to the second machine direction MD2. The predetermined distance is enough to pick up the article from the infeed carrier apparatus 102 and to prepare the carriage 134 to receive another article 10 in the adjacent article receiving compartment 164. The movement of the carriage 134 in the second machine direction MD2 by a predetermined distance in the article receiving zone 140 may be described as "indexing" of the carriage 134.

The "indexing" motion profile for moving the carriage 134 may be designed to have a motion component where the carriage 134 advances and a dwell component where the carriage 134 is stationary. The dwell component of the carriage 134 motion profile can correspond to part or all of the time required for the article 10 to feed into the receiving compartment 164. One advantage of an indexing motion profile with a dwell component is that when the carriage 134 is stopped the dwell component can be extended indefinitely to wait for the next article 10. This, in turn, enables the system to compensate for missing or randomly spaced articles 10. The motion component of the indexing motion profile can further consist of a positive acceleration component where the carriage 134 speeds up and a negative acceleration component where the carriage 134 slows down. To help slow down the first machine direction MD1 velocity of an infeeding article 10, the indexing motion profile of the carriage 134 advancement can be timed such that the positive acceleration component of the carriage motion corresponds to as the article 10 feeds into the receiving compartment 164. A very high positive acceleration can generate a high normal force and a high frictional force between the trailing side of the article 10 and the leading support member 162 of the receiving compartment 164. The frictional force acting on the side of the article 10 during the positive acceleration advancement of the carriage 134 can be used to control the deceleration of the article 10 in the first machine direction MD1. This can prevent or reduce the impact of the article 10 against the guide member 170b.

The subsequent article 10 then advances into the next open article receiving compartment 164 and the carriage accelerates in the second machine direction MD2 to change the direction of movement of the article 10 from the first machine direction MD1 to the second machine direction MD2. Once the desired number of articles 10 has been received by a carriage 134, the carriage drive mechanism 136 then advances that carriage 134 toward the article discharge zone 142. The articles 10 may be disposed on the carriage 134 such that adjacent articles 10 are spaced apart in the second machine direction MD2 by an article pitch $P_2$. Article pitch $P_2$ may be different than article pitch $P_1$. For example, article pitch $P_2$ may be less than the article pitch $P_1$. Article pitch $P_2$ may be greater than article pitch $P_1$.

From the grouping apparatus 104, the row 110 of articles 10 advances onto an outfeed carrier apparatus 108. A transfer apparatus 106 may be used to remove of articles 10 from the grouping apparatus 104 and advance the articles 10 onto the outfeed carrier apparatus 108. The transfer apparatus 106 may also bring the articles 10 up to match the third machine direction MD3 outfeed carrier surface velocity, acceleration, and jerk of the outfeed carrier apparatus 108. The transfer apparatus 106 may position additional articles 10 adjacent to the last articles 10 placed on the outfeed carrier apparatus 108 to form an array 114 of articles 10.

An array of articles 114 may include one or more articles 10 in the second machine direction MD2. The articles 10 are spaced parallel with the second machine direction MD2 in lanes 112. An array of articles 114 may also include of one or more articles 10 spaced apart in the third machine direction MD3. The articles 10 are spaced in the third machine direction MD3 in rows 110. Lanes 112 and rows 110 can be evenly spaced or can have different spacing inside of an array 114. Adjacent rows 110 of articles 10 in the same array 114 may be spaced by a predetermined row spacing 118. It is also possible to create multiple arrays 114 of articles 10 across the third machine direction MD3 on the outfeed carrier apparatus 108 with space between adjacent arrays 114. Arrays 114 of articles 10 may be spaced from adjacent arrays 114 of articles 10 by an array spacing 116. The outfeed carrier apparatus 108 may advance the arrays 114 of articles 10 in the third machine direction MD3 to downstream processing, such as packaging articles into primary or secondary packaging.

With reference to FIGS. 3A and 3B, the outfeed carrier apparatus 108 may be configured to advance articles 10 in a third machine direction MD3 on an outfeed carrier surface 202. The outfeed carrier surface 202 may configured to advance the articles 10 to downstream processing, such as a secondary packaging operation. The outfeed carrier surface 202 may advance the articles 10 at a constant speed or at a variable speed. The outfeed carrier apparatus 108 may be configured in various ways. For example, the outfeed carrier apparatus 108 may be configured as a conveyor, including linear or curved conveyor, for example. The outfeed carrier apparatus 108 may comprise a belt 204 that forms the outfeed carrier surface 202. The belt 204 may advance about an endless loop. However, it is to be appreciated that the outfeed carrier apparatus 108 may be configured in various different ways in order to advance the articles 10 to downstream processing. Outfeed carrier surface 202 can alternatively be a chain; moving plates; multiple moving segments; individual moving carriers for each article 10; components of secondary packaging such as bottom of a case, shrink wrap, or tray; or a dead plate that is not moving.

The outfeed carrier surface 202 may be configured to move at a fixed surface speed or at a variable surface speed. For example, by operating the outfeed carrier surface 202 at a variable surface speed, the outfeed carrier apparatus 108 is able to adjust for various upstream processing conditions. In a particular example, if one or more articles 10 are rejected upstream of the infeed carrier apparatus 102, the outfeed carrier surface 202 may be slowed down to give the grouping apparatus 104 time to accumulate more articles 10. To maintain position and stability of the articles 10 organized in array 114 during variation in outfeed carrier surface velocity, acceleration, and jerk of the outfeed carrier surface 202, the maximum acceleration of outfeed carrier surface 202 is limited to be below a threshold acceleration that can cause articles 10 to tip, slip, or otherwise become unstable on the outfeed carrier surface 202.

If a large number of articles 10 are missing at the infeed carrier apparatus 102 or the supply of articles 10 upstream of the infeed carrier apparatus 102 stops, the velocity of the outfeed carrier surface 202 can be reduced or come to a stop. As articles 10 become available again, the speed of the outfeed carrier surface 202 may be increased.

With reference to FIGS. 3A, 3B, 6, and 22-25, the transfer apparatus 106 includes a frame 210 and an article stabilization member 214 operatively connected with the frame 210. The transfer apparatus 106 may also include an arm 212. The arm 212 may be operatively connected with the frame 210 at one end of the arm 212 and operatively connected with the article stabilization member 214 at the opposite end of the arm 212. The transfer apparatus 106 may also include a transfer apparatus drive mechanism 216 that is operatively connected with the frame 210 and the arm 212. The transfer apparatus 106 may include a transfer apparatus control system 222 that is operatively engaged with the transfer apparatus drive mechanism 216 and configured to move the arm 212 in such a way that the article stabilization member 214 moves about a travel path from an engaging location 218 in the article discharge zone 142 of the grouping apparatus 104 to a placement location 220 adjacent to the outfeed carrier surface 202 and back to the engaging location 218.

The transfer apparatus drive mechanism 216 is able to move the arm 212 in such a way that the placement location 220 may be variable. For example, the arm 212 may be able to discharge articles 10 in a variable third machine-directional MD3 position on the outfeed carrier surface 202 in order to form a plurality of arrays 114 of articles 10. The distance between the engaging location 218 and the placement location 220 may be different each time the article stabilization member 214 travels from the engaging location 218 to the placement location 220.

Figure 6:
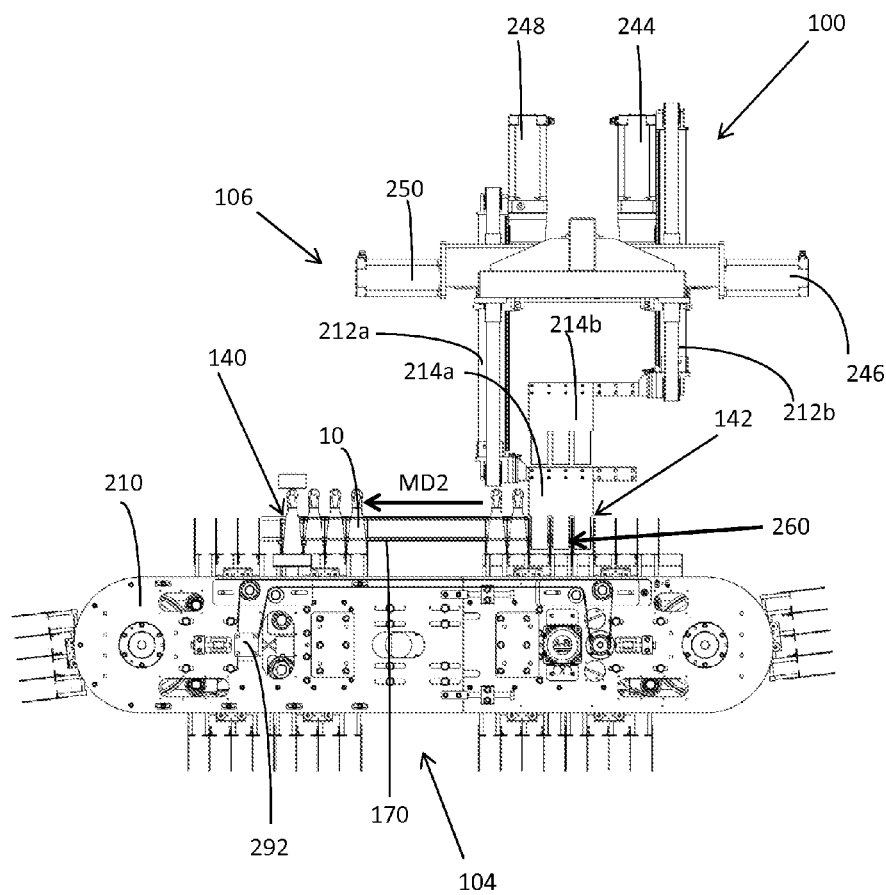
FIG. 6 is a side, elevation view of an article grouping system.

As shown in FIGS. 6 and 22-25, the transfer apparatus 106 may include at least two arms, shown as arms 212a and 212b for illustrative purposes only. Each arm 212a and 212b may be operatively connected with the frame 210 at one end of the arms 212a and 212b and operatively connected with an article stabilization member 214a and 214b, respectively, at the opposite end of the arms 212a and 212b. Each arm 212a and 212b may be independently driven by a separate transfer apparatus drive mechanism 216a and 216b, respectively. The transfer apparatus control system 222 may independently control movement of each of the arms 212a and 212b. With reference to FIG. 6, the article stabilization members 214a and 214b may be disposed in the same second machine-directional MD2 position so as to receive articles 10 in the same second machine-directional MD2 position in the engaging location 218 and to discharge articles 10 in the same second machine-directional MD2 position in the variable placement location 220. The two article stabilization members 214a and 214b may travel substantially out of phase with each other in their respective travel paths, with each article stabilization member 214a and 214b travelling from the engaging location 218 to a variable placement location 220 with each pass through the travel path.

Two or more article stabilization members 214 enables one article stabilization member 214 to be in the proximity of the engaging location 218 while another article stabilization member 214 is in the proximity of the placement location 220. This allows increased article throughput compared with a transfer apparatus 106 having only one article stabilization member 214. Two article stabilization members 214 allows the article stabilization member 214 to reciprocate back and forth and pass each other without impeding the motion of the other article stabilization member 214. With more than two article stabilization members 214, the article stabilization members 214 may follow in one direction along a closed path. Depending on the cycle time required to acquire the article at the engaging location 218 and to drop off the article at the placement location 220, it may be possible for both article stabilization members 214 to be in the proximity of the engaging location 218, the placement location 220, or in between at the same time.

With reference to FIGS. 22-25, each article stabilization member 214 may include an upstream support member 230 and a downstream support member 232. The upstream and downstream support members 230 and 232 may be joined at a connector member 234 of the article stabilization member 214 at one end of the upstream and downstream support members 230 and 232. The opposite ends of the upstream and downstream support members 230 and 232 may define an open end 236 of the article stabilization member 214. The upstream support member 230 may be spaced apart from the downstream support member 232 in the third machine direction MD3. The upstream support member 230, the downstream support member 232, and optionally the connector member 234 may combine to define an article transfer receptacle 238. Each article stabilization member 214 is configured to receive an article in the article transfer receptacle 238. The articles enter the article transfer receptacle 238 through the open end 236 of the article stabilization member 214.

With reference to FIGS. 3A, 3B, 6, and 22-25, each article stabilization member 214 is configured to receive one or more articles from a first device, shown as the grouping apparatus 104, and move the article onto a second device, shown as the outfeed carrier apparatus 108 for exemplary purposes only. Each article stabilization member 214 is connected with an arm 212 such that the open end 236 of the article stabilization member 214 remains positioned between the connector member 234 and the outfeed carrier surface 202 as the arm 212 moves the article stabilization member 214 about the travel path. By positioning an article or articles 10 between the upstream and downstream support members 230 and 232, each article stabilization member 214 is able to assist in controlling the third machine-directional MD3 position of the article. Moreover, the upstream and downstream support members 230 and 232 are spaced far enough apart to allow an article to be received within the article transfer receptacle 238; however, it is to be appreciated that the upstream and downstream support members 230 and 232 are spaced close enough together in the third machine direction MD3 so that the article or articles are unable to tip over while being moved from the engaging location 218 to the placement location 220.

Each article stabilization member 214 is configured to receive one or more articles. Each article stabilization member 214 may be sized to transfer a predetermined number of articles of a particular size. However, an article stabilization member 214 of a particular size may also be used to transfer different numbers of articles of different sizes. In addition, a transfer apparatus 106 may include multiple sets of article stabilization members 214 of different sizes that may be releasably connected with the arms 212 of the transfer apparatus 106. As a result, the transfer apparatus 106 may be able to transfer a variable number of articles of a wide range of sizes and shapes. It is to be appreciated that the article stabilization members 214 may be the only change parts of the article grouping system 100. The article stabilization members 214 can be rapidly changed by human or machine operators or can be designed to be automatically changed by an automated tool changer. The geometry of the article stabilization member 214 can also be adjusted to accommodate different article 10 shapes and sizes. For example the distance between upstream and downstream support members 230 and 232 may be adjustable.

Figure 23:
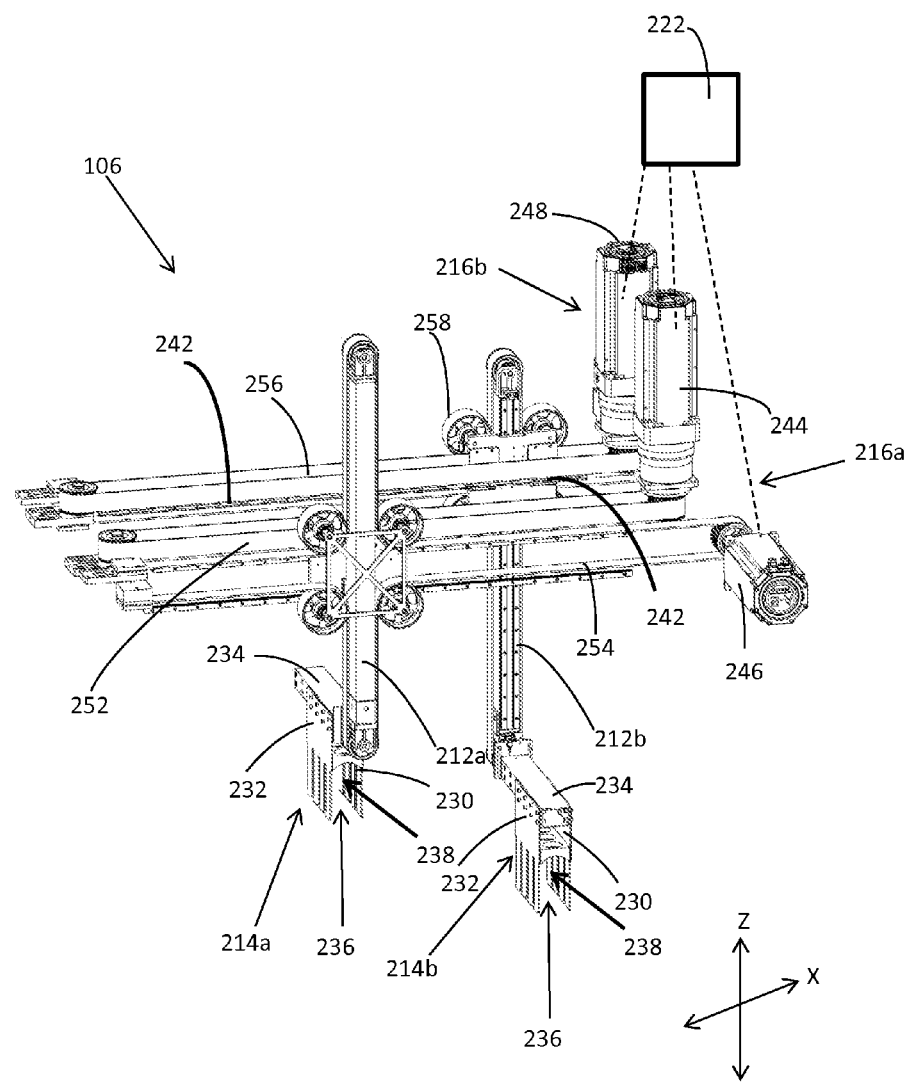
FIG. 23 is a perspective view of a transfer apparatus.
Figure 24:
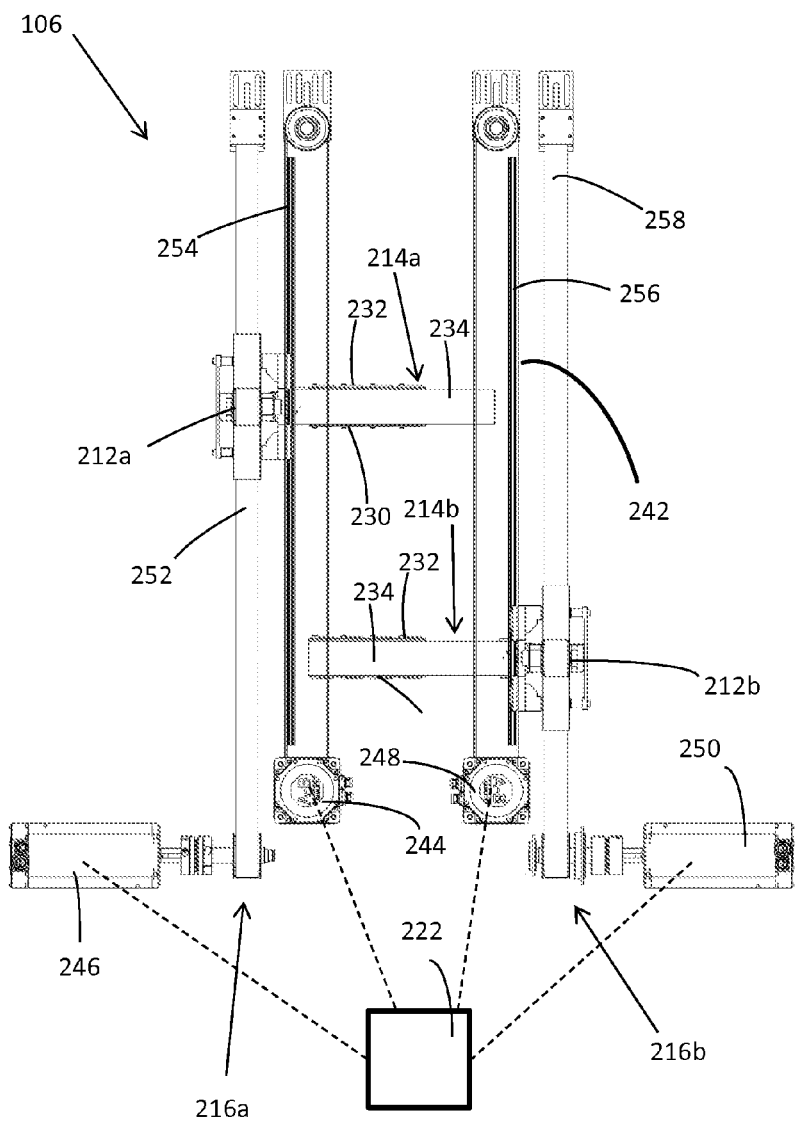
FIG. 24 is a top, plan view of a transfer apparatus.

The first and second arms 212a and 212b of the transfer apparatus may be configured in various ways. With reference to FIGS. 23 and 24, the arms 212a and 212b may be vertically oriented. The arms 212a and 212b may be operatively connected with the frame 210 at one end of the arms 212a and 212b and operatively connected with the article stabilization members 214a and 214b, respectively, at the opposite end of the arms 212a and 212b.

Figure 22:
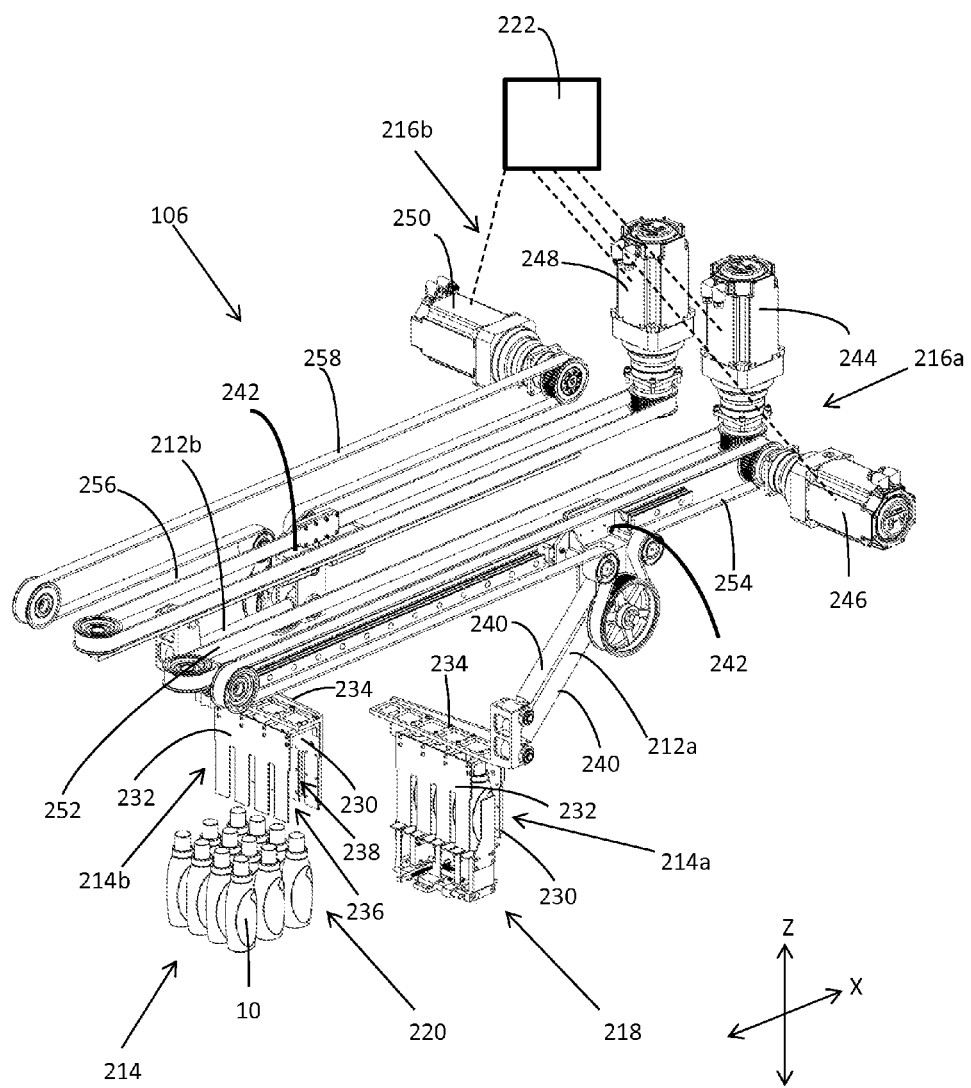
FIG. 22 is a perspective view of a transfer apparatus engaged with a carriage of a grouping apparatus.

With reference to FIG. 22, the arms 212 may be configured as a four-bar linkage. In a four-bar linkage, two bars 240 may be connected with an article stabilization member 214 at one end of the bars 240 and connected with a guide member 242 at the opposite end of the bars 240. The guide member 242 may be operatively connected with the frame 210.

The transfer apparatus drive mechanism 216 may be configured in various different ways. For example, with reference to FIGS. 22-25, the transfer apparatus drive mechanism 216a may include first and second electrical drives 244 and 246 operatively connected with the one arm 212a. A first lateral drive belt 252 may be operatively connected with the first electrical drive 244 and operatively connected with the arm 212a. A first vertical drive belt 254 may be operatively connected with a second electrical drive 246 and also with the arm 212a. The first electrical drive 244 may cause movement to the first arm by way of the first lateral drive belt 252. The second electrical drive 246 may also cause movement to the arm 212a by way of the first vertical drive belt 254. The first and second electrical drives 244 and 246 may be stationary relative to the arm 212a. Stationary electrical drives 244 and 246 are advantageous for maximizing the acceleration of arm 212a and article stabilization member 214a. This arrangement eliminates the need to accelerate the mass of the electrical drive motors as would be needed with configurations that do not include stationary electrical drive motors. The transfer apparatus control system 222 causes the first and second electrical drives 244 and 246 to move the first lateral and first vertical drive belts 252 and 254 in such a way that the arm 212a can move the article stabilization member 214 about the travel path at variable travel path velocities.

The transfer apparatus drive mechanism 216b may also include third and fourth electrical drives 248 and 250 operatively connected with the arm 212b. A second lateral drive belt 256 may be operatively connected with the third electrical drive 248 and operatively connected with the arm 212b. A second vertical drive belt 258 may be operatively connected with the fourth electrical drive 250 and also with the arm 212b. The third electrical drive 248 may cause movement to the arm 212b by way of the second lateral drive belt 256. The fourth electrical drive 250 may also cause movement to the arm 212b by way of the second vertical drive belt 258. The third and fourth electrical drives 248 and 250 may be stationary relative to the arm 212b. The transfer apparatus control system 222 causes the third and fourth electrical drives 248 and 250 to move the second lateral and second vertical drive belts 256 and 258 in such a way that the arm 212b moves the article stabilization member 214b about the travel path at variable travel path velocities.

With reference to FIG. 22, the first and second electrical drives 244 and 246 may cause the arm 212a to move the article stabilization member 214a in two directions, shown as the X-direction and Z-direction. The first and second electrical drives 244 and 246 may each contribute to the movement of the article stabilization member 214*a* in the X-direction and the Z-direction. The third and fourth electrical drives 248 and 250 may cause the arm 212*b* to move the article stabilization member 214*b* in the X-direction and the Z-direction. The third and fourth electrical drives 248 and 250 may each contribute to the movement of the article stabilization member 214*b* in the X-direction and the Z-direction. For example, when the linear velocities of first lateral drive belt 252 and the first vertical drive belt 254 are equal, then the stabilization arm 214*a* will move in the X-direction. When either the first lateral drive belt 252 or first vertical drive belt 254 is stopped and the other of the first lateral drive belt 252 and first vertical drive belt 254 is moving, the article stabilization member 214*a* will move along an arc defined by the four bar linkage which has some components of X-direction and Z-direction motion. When the linear velocity of first lateral drive belt 252 and first vertical drive belt 254 are not equal, then the stabilization arm 214*a* will move in a combination of X-direction motion and an arc defined by the four bar linkage.

With reference to FIG. 23, the first electrical drive 244 may cause movement of the article stabilization member 214*a* in the X-direction and the second electrical drive 246 may cause movement of the article stabilization member 214*a* in the Z-direction. The third electrical drive 248 may cause movement of the article stabilization member 214*b* in the X-direction and the fourth electrical drive 250 may cause movement of the article stabilization member 214*b* in the Z-direction.

Figure 25:
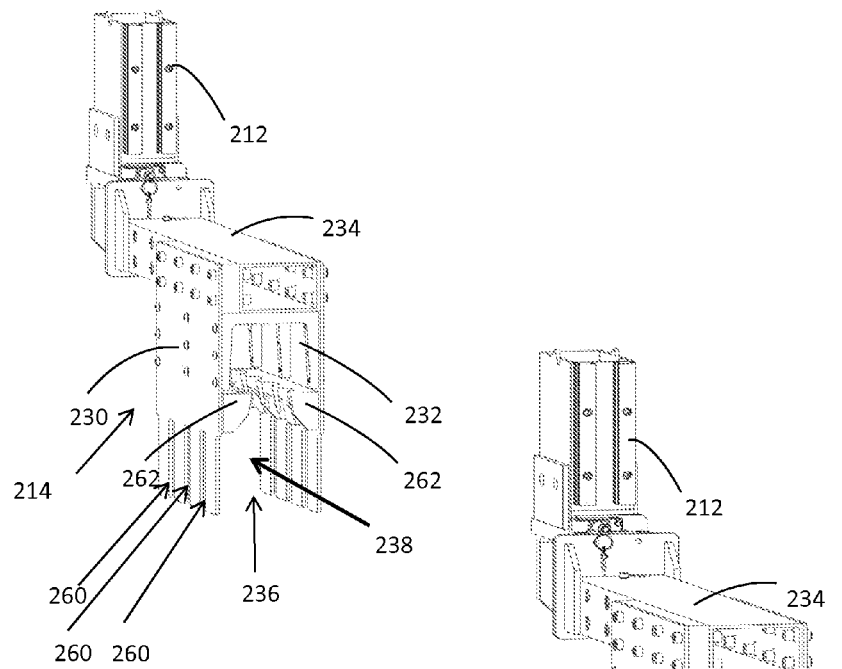
FIG. 25 is a perspective view of an article stabilization member.
Figure 26:
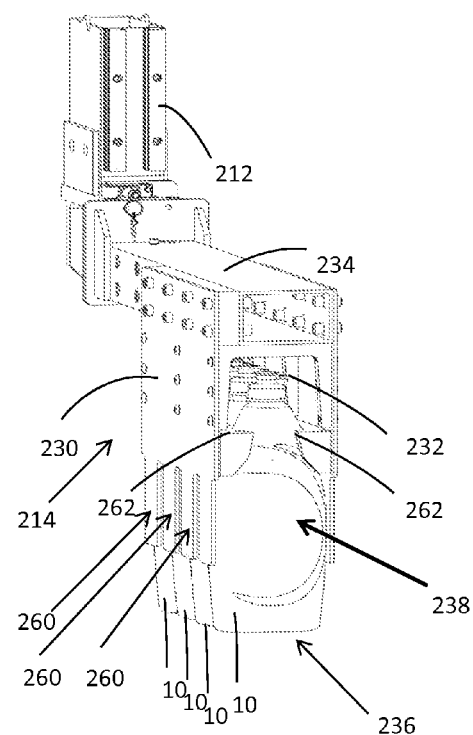
FIG. 26 is a perspective view of an article stabilization member engaged with a plurality of articles.
Figure 27:
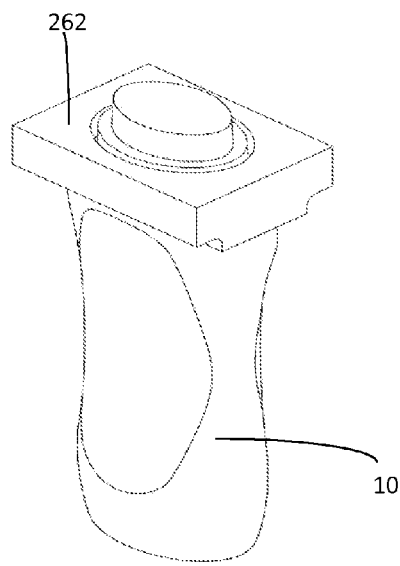
FIG. 27 is a perspective view of a centering bell engaged with an article.
Figure 28:
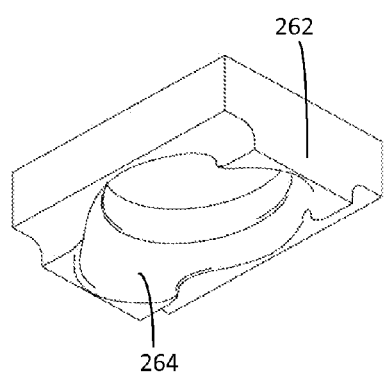
FIG. 28 is a bottom, perspective view of a centering bell.
Figure 29:
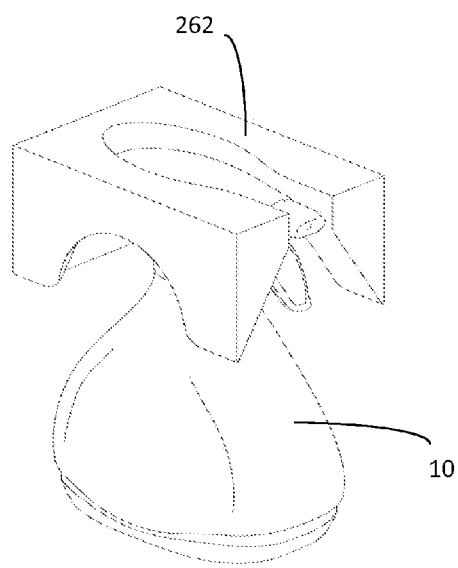
FIG. 29 is a perspective view of a centering bell of an article stabilization member engaged with an article.
Figure 30:
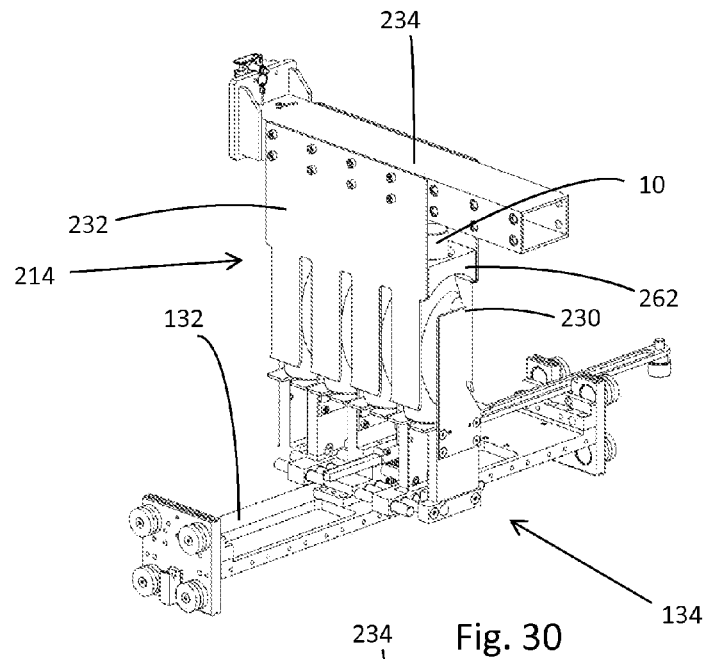
FIG. 30 is a perspective view of an article stabilization member engaged with a plurality of articles on a carriage.
Figure 31:
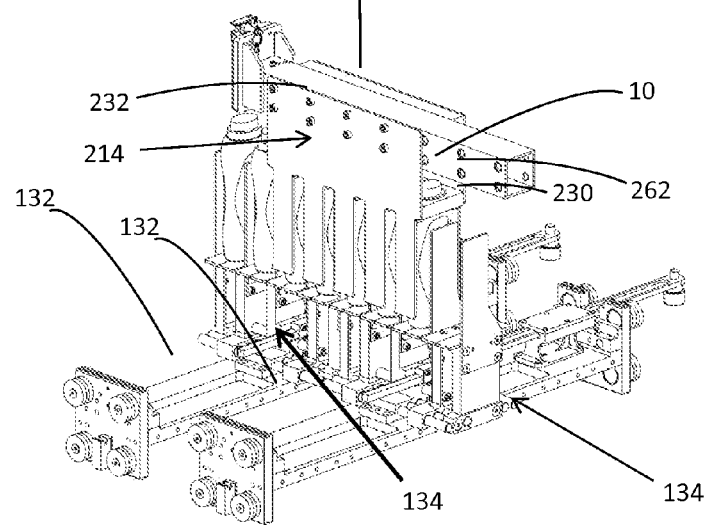
FIG. 31 is a perspective view of an article stabilization member engaged with a plurality of articles on two adjacent carriages.
Figure 32:
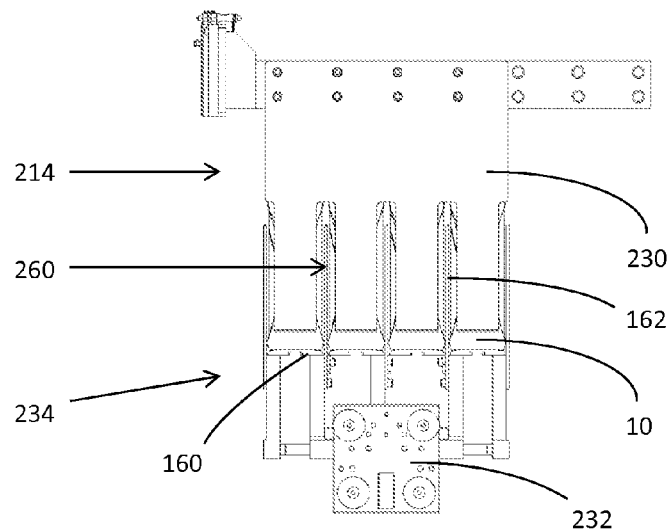
FIG. 32 is a side, elevation view of an article stabilization member engaged with a plurality of articles on a carriage.
Figure 33:
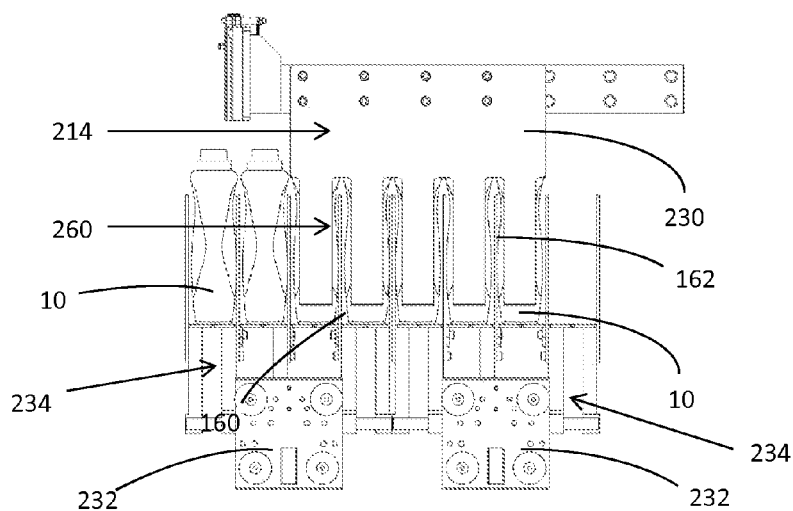
FIG. 33 is a side, elevation view of an article stabilization member engaged with a plurality of articles on two adjacent carriages.
Figure 34:
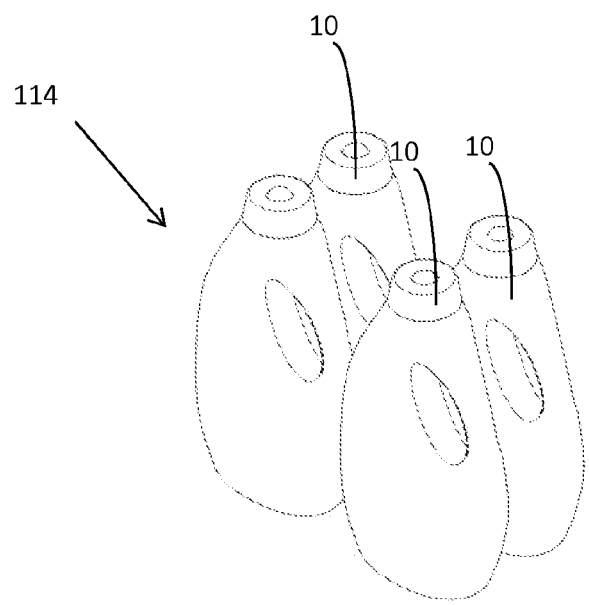
FIG. 34 is a perspective view of an array of articles comprising two rows of articles and two lanes of articles.
Figure 35:
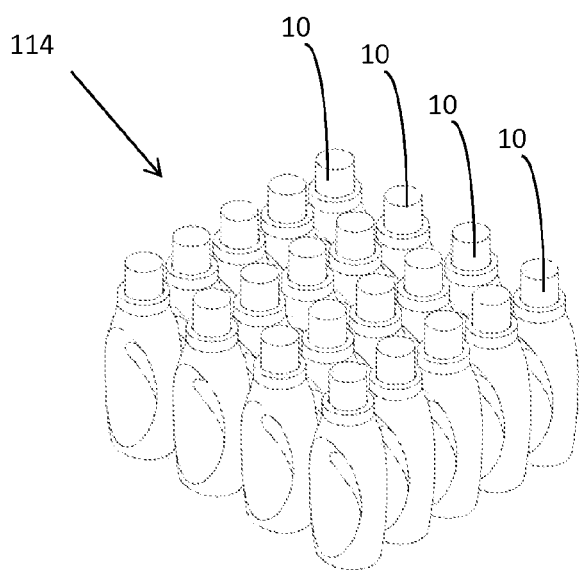
FIG. 35 is a perspective view of an array of articles comprising four rows of articles and five lanes of articles.
Figure 36:
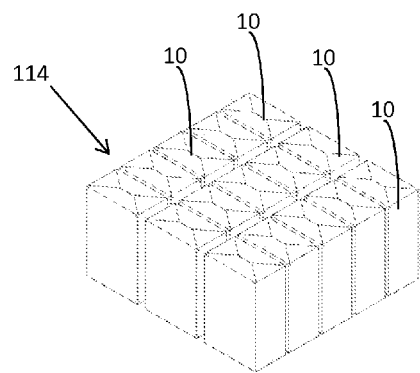
FIG. 36 is a perspective view of an array of articles comprising three rows of articles and five lanes of articles.
Figure 37:
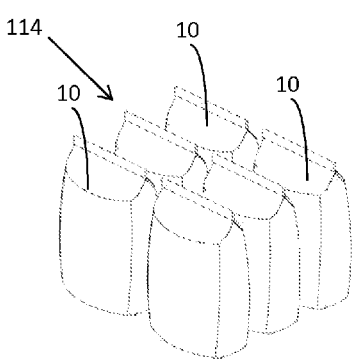
FIG. 37 is a perspective view of an array of articles comprising two rows of articles and three lanes of articles.
Figure 38:
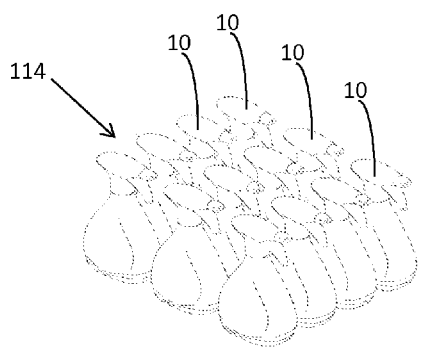
FIG. 38 is a perspective view of an array of articles comprising three rows of articles and four lanes of articles.
Figure 39:
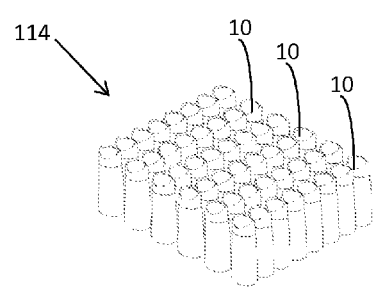
FIG. 39 is a perspective view of an array of articles comprising six rows of articles and eight lanes of articles.

The article stabilization members may be configured in various ways. With reference to FIGS. 3A, 3B, and 25, the upstream and downstream support members 230 and 232 may include one or more slits 260. The slit or slits 260 are arranged in the upstream and downstream support members 230 and 232 such that the slits 260 mate with the support members 162 of the carriages 134. Stated another way, the slits 260 provide clearance with the support members 162 of the carriage 134 so that the article stabilization member 214 is able to move down onto a carriage 134, engage the articles, and move the articles in the third machine direction MD3 through the carriage 134 and onto the outfeed carrier surface 202. The width of the slits 260 can be sized to allow for clearance with adjacent support members 162 from two adjacent carriages 134.

With reference to FIGS. 25-29, each article stabilization member 214 may include one or more centering bells 262. An interior surface of 264 the centering bell 262 is configured to surround a portion of an article so as to control the third machine-directional MD3 and second machine-directional MD2 position as well as rotation of the article as the transfer apparatus 106 moves the article from carriage 134 to the outfeed carrier surface 202. The interior surface 264 may be shaped to match a portion of the shape of the article 10 such that a portion of the article fits within the centering bell 262. A gap may be formed between an article engaged with the article stabilization member 214 and the centering bell 262. The gap may have various lengths. For example, the gap may be in the range of about 1 millimeter to about 10 millimeters, or about 0.2 mm to about 2.0 mm.

Motion between the infeed carrier apparatus 102, grouping apparatus 104, transfer apparatus 106, and outfeed carrier apparatus 108 may be synchronized in order to avoid collisions between system components and to enable desired operation timing of the article grouping system 100. Control can be provided by grouping apparatus control system 138 and transfer apparatus control system 222. These control systems can be stand alone or could be components of an overall control system within a Programmable Logic Controller (PLC) or other motion control computer.

While the transfer apparatus 106 is described with reference to the grouping apparatus 104, it is to be appreciated the transfer apparatus 106 may be used to remove articles from various other article carriers other than the grouping apparatus 104, such as a conveyor or the infeed carrier apparatus. The article carrier may include an article carrier surface.

The article grouping system 100 may include more than one transfer apparatus 106 and more than one outfeed carrier apparatus 108. For example, the article grouping system 100 may include two transfer apparatus 106 and two outfeed carrier apparatus 108 which may include two outfeed carrier surfaces 202. The grouping apparatus 104 may include two discharge zones 142. This can supply arrays 114 of articles 10 to different downstream equipment for various forms of secondary packing. The arrays 114 formed on multiple outfeed carrier apparatus 108 can have different configurations of lanes 112 and rows 110 for each outfeed carrier apparatus 108.

The article grouping system 100 may be used to create multiple parallel arrays 114 of articles separated by second machine-directional MD2 spacing on a single outfeed transfer apparatus 108. This may be accomplished by using the transfer apparatus 106 to transfer two groups of articles from two carriages 134 that are separated by a space equal to desired second machine direction MD2 spacing between arrays 114. This may also be accomplished by aggressively indexing the carriage 134 to cause the infeeding articles to miss an article receiving compartment 164. This can create a carriage 134 with an empty article receiving compartment 164 that will correspond to the desired second-machine directional MD2 spacing between arrays 114 at the article discharge zone 142.

One or more outfeed carrier surfaces 202 can be configured on the same side of the grouping apparatus 104 as the infeed carrier apparatus 102. In this configuration, the outfeed carrier surface 202 will advance articles in the direction opposite of the third machine direction MD3.

The article grouping system 100 can include more than one infeed carrier apparatus 102. The grouping apparatus 104 may include more than one article receiving zones 140 corresponding to multiple infeed carrier apparatus 102. This can enable more than one upstream source of articles 10 to be supplied to the article grouping system 100. These independent upstream sources of articles 10 may be selectively supplied or supplied simultaneously.

The outfeed carrier apparatus may include pockets in the outfeed carrier surface. The pockets may be configured to contain a portion of an article. In such a configuration, a robotic picking arm may be used to remove a row of articles from a carriage and place the row of articles into a row of pockets in the outfeed carrier surface.

With reference to FIGS. 3A, 3B, and 22-25, in operation, one or more carriages 134 advance in the second machine direction MD2 to the article discharge zone 142 of the grouping apparatus 104. Once in the article discharge zone 142, the one or more carriages 134 stops or substantially slows down so that the transfer apparatus 106 can transfer the articles from the carriages 134 onto the outfeed carrier surface 202. An arm 212 moves the article stabilization member 214 down over top of the articles in the one or more carriages 134 so as to surround a portion of the articles 10 in the article transfer receptacle 238 of the article stabilization member 214. Once the article stabilization member 214 reaches the engaging location 218 where the articles are partially surrounded by the article stabilization member 214, the arm 212 moves the article stabilization member 214 in the third machine direction MD3 adjacent to the outfeed carrier surface 202 of the outfeed carrier apparatus 108. In order to quickly transfer the articles 10 from the carriages 134, the arm 212 accelerates the article stabilization member 214 in the third machine direction MD3. The article stabilization member 214 continues to move the articles 10 on the outfeed carrier surface 202 until the articles 10 are in the desired placement location 220. The transfer member drive mechanism 216 also adjusts the travel path velocity, acceleration, and jerk of the article stabilization member 214 to match the surface velocity, acceleration, and jerk of the outfeed carrier apparatus 108 so that the articles 10 are moving at the same or substantially the same velocity, acceleration, and jerk as the outfeed carrier surface 202 when the articles 10 are released from the article stabilization member 214 in the placement location 220. Once the articles are at the placement location 220 on the outfeed carrier surface 202, the article stabilization member 214 moves up, away from the articles and the articles 10 continue advancing on the outfeed carrier surface 202. The arm 212 moves the article stabilization member 214 from the placement location 220 back to the engaging location 218 to transfer additional articles 10 onto the outfeed carrier surface 202.

The transfer apparatus 106 is able to form arrays of articles on the outfeed carrier surface 202 comprising various number of rows 110 and lanes 112 of articles 10. The transfer apparatus control system 222 causes the transfer apparatus drive mechanism 216 to release the articles 10 on the outfeed carrier surface 202 in the desired placement location 220. The placement location 220 depends upon the desired number of rows 110 in an array 114. If additional rows 110 are needed to complete an array 214, the transfer apparatus control system 222 causes the transfer apparatus drive mechanism 216 to move the article stabilization member 214 to a placement location 220 that is adjacent to the array 214 of articles. If the desired number of rows 110 have been formed in the current array 214, than the transfer apparatus control system 222 causes the transfer apparatus drive mechanism 216 to move the articles 10 in the article stabilization member 214 to a placement location 220 that is spaced apart from the adjacent array 114 of articles in order to begin forming a new array 114 of articles.

With reference to FIGS. 3A-4, adjacent rows 110 of articles 10 in an arrow 114 may be spaced by a row spacing 118. The row spacing 118 may be determined by may be determined by the transfer apparatus control apparatus 222. Adjacent articles 10 in a lane 112 may be spaced by a second article pitch $P_2$. The second article pitch $P_2$ may be constant or variable. The second article pitch $P_2$ may be determined by the geometry of the support members 162 and the article stabilization member 214. Adjacent arrays may be spaced apart in the third machine direction MD3 by an array spacing 116. The array spacing 116 can be constant or variable.

With reference to FIGS. 3A, 3B, 22, 30, and 31, depending upon the desired number of lanes 112 in a row 110 of articles, the grouping apparatus 104 may stop or substantially decelerate one or more carriages 134 in the article discharge zone 142. If the number of desired lanes 112 equals the number of article receiving compartments 164 in an individual carriage 134, then only one carriage 134 may be stopped or substantially decelerated in the article discharge zone 142 at one time. If the desired number of lanes 112 in a row 110 is greater than the number of article receiving compartments 164 in an individual carriage 134, then two or more carriages may be stopped or substantially decelerated in the article discharge zone 142 at one time. If the desired number of lanes 112 in a row 110 is less than the number of article receiving compartments 164 in an individual carriage 134 and if the desired number of lanes 112 in a row 110 is an integer divisor of the number of article receiving compartments 164 in an individual carriage 134, than only one carriage 134 may be stopped or substantially decelerated in the article discharge zone 142 at one time. If the desired number of lanes 112 in a row 110 is less than the number of article receiving compartments 164 in an individual carriage 134 and if the desired number of lanes 112 in a row 110 is not an integer divisor of the number of article receiving compartments 164 in an individual carriage 134, than combinations of one and two carriages 134 may be stopped or substantially decelerated in the article discharge zone 142 at one time. An article stabilization member 114 of the transfer apparatus 106 is able to transfer articles from one or more carriages 134 to the outfeed carrier apparatus 202.

If any articles remain in a carriage 134 after the article stabilization member 214 transfers some articles from that particular carriage 134 to the outfeed carrier surface 202, that carriage 134 may advance in the second machine direction MD2 to move the remaining articles into the article discharge zone 142 for the subsequent article stabilization member 214 to transfer the articles to the outfeed carrier surface 202. Moreover, if the number of desired lanes 112 of articles in a row 110 is not currently positioned in the article discharge zone 142, an additional carriage 134 may advance to the article discharge zone 142 to be transferred to the outfeed carrier apparatus 108.

As described above, the operation of the grouping apparatus 104 provides very high flexibly for creating arrays 114 with fully adjustable counts of lanes 112 and rows 110. With reference to FIG. 3B, for example, each carriage 134 may comprise four article receiving compartments 164. With reference to FIG. 3B, the grouping apparatus 104 and grouping apparatus control system 138 may be configured to produce arrays 114 having four lanes 112 and three rows 110 of articles 10. In such a configuration, the article grouping system may also comprise article stabilization members 214 capable of handling four articles. To create arrays 114 of four lanes 112, each carriage 134 carrying four articles may stop or slow down in the article discharge zone 142 and the article stabilization member 214 may remove four articles from the carriage 134 and transfer the four articles to four lanes 112 on the outfeed carrier surface 202. To create an array with three rows, the article stabilization member 214 may remove four articles from three successive carriages 134. Each of the three rows 110 may be placed at a placement location 220 on the outfeed carrier surface 202 with the desired row spacing 118 from the previously placed row 110. Once the three row array 114 is formed on the outfeed carrier surface 202, the fourth row removed by the article stabilization member 214 may be placed on the outfeed carrier surface 202 with the desired array spacing 116 to start forming a new array 114. If in this example the desired array 114 configuration is changed to four lanes 112 and five rows 110, the grouping apparatus control system 138 may adjust the motion of the article stabilization member 214 and the outfeed carrier surface 202. No mechanical components of the machine may be needed to adjust or change the article grouping system 100 to produce arrays of different number of rows 110 and lanes 112.

With reference to FIG. 3A, a grouping apparatus 104 and grouping apparatus control system 138 may be configured to produce arrays 114 of five lanes 112 and four rows 110.

Different article stabilization members 214 may be installed that include five article transfer receptacles 238. To create arrays 114 of five lanes 112, the first carriage 134 carrying four articles 10 may stop or slow down in the article discharge zone 142. Next, the second carriage 134 carrying four articles 10 may stop or slow down in the article discharge zone 142 in close proximity to the first carriage 134. The article stabilization member 214 may remove five articles 10 from both the first and second carriages 134. Four articles 10 may be removed from the first carriage 134 and one article 10 from the second carriage 134. The article stabilization member 214 may transfer the five articles 10 to five lanes 112 on the outfeed carrier surface 202. Then, to create the second row 110 of the array 114, the first carriage 134 will advance in the second machine direction MD2 to the article receiving zone 140. The second carriage 134 may move the remaining three articles 10 to the first three lanes in the article discharge zone 142. The third carriage 134 carrying four additional articles may stop or slow down in the article discharge zone 142 in close proximity to the second carriage 134. The article stabilization member 214 may remove five articles 10 from both the second and third carriages 134. Three articles may be removed from the second carriage 134 and two articles 10 from the third carriage 134. The article stabilization member 214 may transfer five articles to five lanes 112 on the outfeed carrier surface 202 with the desired row spacing 118 from the previously placed row 110. To create an array with four rows, the article stabilization member 214 may remove five articles 10 from four successive pairs of carriages 134. Each of the four rows 110 will be placed at a placement location 220 on the outfeed carrier surface 202 with the desired row spacing 118 from the previously placed rows 110. Once the four row array 114 is placed on the outfeed carrier surface 202, the fifth row removed by the article stabilization member 214 is placed on the outfeed carrier surface 202 with the desired array spacing 116 from the previously placed array 114 to establish the start of a new array 114.

With the article grouping system 100, it is possible to make a change in the number of rows 110 of an array by simply adjusting the transfer apparatus control system 222 and the grouping apparatus control system 134. It is possible to make a change in the number of lanes 112 of an array with a combination of changing or reconfiguring the article stabilization members 214 combined with adjustments to the transfer apparatus control system 222 and the grouping apparatus control system 134. In some cases it is also possible to make a change in the number of lanes 112 of an array by simply adjusting the transfer apparatus control system 222 and the grouping apparatus control system 134 without changing or reconfiguring the two article stabilization members 214. This may be accomplished by employing article stabilization members 214 that have article transfer receptacles 238 greater than or equal to the number of lanes 112 in the array 114. To create an array 114 with lanes 112 less than the number of article transfer receptacles 238, as carriages 134 are advanced to the article discharge zone 142, the carriage may be stopped or slowed down so that the articles 10 are aligned to populate the desired number of lanes 112. Articles in the carriages 134 may not line up with every article transfer receptacle 238. Care must be taken to only advance carriages 134 to the article receiving zone 140 once the carriage is clear of all article transfer receptacles 238.

It may be necessary to stop more than two carriages 134 at the article discharge zone 142. For example, with a carriage comprising four article receiving compartments 164, two or three carriages 134 may be stopped or substantially slowed down at the article discharge zone 142 to create seven lanes 112.

The total number of carriages 134 in the grouping apparatus 104 can be adjusted based on the range of lanes 112 desired for the arrays 114. It may be important when relatively high article throughput rates are needed to design the total number of carriages 134 in the grouping apparatus 104 so that there will always be a carriage 134 in the article receiving zone 140 to take an article 10 from the infeed carrier apparatus 102.

As described above, the article grouping system 100 is highly flexible in order to capable handle articles of different dimensions, sizes, and shapes. With reference to FIGS. 3A, 3B, 7B, 17-19, and 22-26, several adjustments may be made to adjust the article grouping system 100 to accommodate articles 10 of different depths 32. The spacing of infeed guide members 124 may be adjusted to provide sufficient clearance between the articles and the guide members 124. This adjustment may be automated and controlled by the grouping apparatus control system 138 through motorized translation to the guide members 124. The compartment width 186 of the article receiving compartments 164 for each carriage 134 can be adjusted. This may be automatically or manually adjusted with the adjustment mechanism 189 by way of the grouping apparatus control system 138. The article stabilization members 214 may also be changed or reconfigured in order to handle articles of different sizes or shapes.

Several adjustments may be made to adjust the article grouping system 100 to accommodate articles 10 of different widths 30 or depths 32. The spacing of the guide members 170 may be adjusted to provide the desired clearance between the articles and the guide members 170. This adjustment may be automated and controlled by the grouping apparatus control system 138 through motorized translation to the grouping apparatus guide members 170. The two article stabilization members 214 may also be changed or reconfigured.

In order to maximize article throughput of article 10, the motion of the article stabilization members 214 can require very high velocities and accelerations. Prior to arrival of the carriages 134 to the article discharge zone 142, the article stabilization member 214 may be positioned above the engaging location 218. When the article stabilization member 214 returns to the engaging location 218 from the placement location 220, the article stabilization member 214 will be at a Z-direction elevation that allowed passage over the other article stabilization members 214 without collision. Cycle time can be saved by reducing the elevation of the article stabilization members 214 above the engaging location 218 prior to moving the article transfer receptacles 238 down around the articles 10. It is possible to configure the article stabilization member 214 and/or centering bell 262 such that some portion of the articles can pass in the carriage 134 in the second machine direction MD2 through the open end 236 between the upstream 230 support member and downstream support member 232. This pass through can happen at an intermediate elevation between the high elevation needed to pass the other article stabilization members 214 and the lower elevation needed to engage the articles. This makes it possible to reduce the elevation of the transfer member 214 while the carriages 134 are moving into the discharge zone. Once the carriage 134 has arrived in the discharge zone 142, the article stabilization member 214 can lower the article transfer receptacles 238 and optionally the centering bells 262 around the articles 10. The centering bell 262 may be configured such that as it is lowered over an article 10, tapered surfaces may gradually engage with certain surfaces on the article 10, providing the corrective ability to adjust the second machine direction MD2 and third machine direction MD3 location of the article 10 and also adjust the rotation of the article 10. The centering bell 262 can also precisely adjust the second machine direction MD2 location of the articles 10 aligned in the lanes 112.

To further minimize cycle time, articles 10 may be removed in the third machine direction MD3 at high accelerations and velocities. As a result, the articles 10 and article stabilization member 214 are clear of the carriages 134 so they can rapidly return to the article receiving zone 140. When the articles 10 are accelerated in the third machine direction MD3 they are pushed by the upstream support member 230. The downstream support member 232 and centering bell 262 can provide some additional stability during this high acceleration move. To place the articles 10 at matched velocity, acceleration, and jerk on the outfeed carrier surface 202, the high third machine direction MD3 velocity of the article stabilization member 214 may be reduced with high negative acceleration. The downstream support member 232 carries much of the inertial load of the article 10 as it is slowed down. The downstream support member 232 and centering bell 262 can provide some additional stability during this high negative acceleration move. The ability of the upstream support member 230 and downstream support member 232 to cooperate together to maintain bottle stability during reversing accelerations allows the transfer apparatus 106 to handle unstable articles at high speeds.

Under steady state conditions, articles 10 feed into the grouping apparatus 104 on the infeed carrier apparatus 102 at a constant steady rate. At steady state, the velocity is constant for the outfeed carrier surface 202 of the outfeed carrier apparatus 108. At this constant outfeed carrier surface velocity, the placement locations 220 for the rows 110 of an array will follow a periodic pattern. For instance, the placement location 220 for the first row of a first array is the same as the placement location 220 for the first row of a second array.

The article grouping system 100 may be able to operate under transient conditions where articles 10 missing due to rejects from the upstream equipment and during ramp up and down of article supply rate. Traditionally this would be accomplished by adding a some accumulation or buffer upstream that will maintain steady state conditions at the article grouping system 100 even though the articles coming in may be experiencing transient conditions. Upstream accumulation systems typically rely on articles 10 coming into contact with adjacent articles and some means to separate and repitch the articles 10 such as a feed screw. These accumulation systems greatly limit the shapes of articles 10 that can be processed as many shapes can become very unstable when in contact with adjacent articles 10. This can result in articles tipping over, falling over, shingling, etc. To maintain positive control of each article and eliminate the need for accumulation relying on article to article interaction, an asynchronous control system allows the grouping apparatus 104 to function as an article accumulator.

During a transient condition such as missing articles 10, the carriage 134 in the article receiving zone 140 may simply wait for the next available article 10. This does create a shortage of carriages 134 carrying articles 10 to the article discharge zone 142. Once a carriage 134 is not available at the article discharge zone 142, the article stabilization member 214 may wait for the next available carriage 134. If this wait is relatively short, for instance as a result of a few missing articles, once the article stabilization member 214 acquires the row 110 of articles, the previously placed rows 110 of the array 114 have moved further away than would be usual under steady state conditions. The transfer apparatus control system 222 calculates the new placement location 220 and the new row 110 is placed at the proper position on the outfeed carrier surface 202. This required a longer third machine direction MD3 travel of the article stabilization member 214. The transfer apparatus control system 222 may slightly slow down the outfeed carrier surface velocity until the placement locations 220 returns to steady state. The acceleration changes to the outfeed carrier surface velocity may be controlled such that articles do not tip or become unstable on the outfeed carrier surface 202. Given a random input of articles into the article grouping system 100, the velocity of the outfeed carrier surface 202 might be continuously adjusted as will the placement location 220. If the disturbance stops the supply of articles 10 for a relatively long time, the outfeed carrier surface 202 and partially formed array may gradually come to a stop. Sufficient third machine direction MD3 travel of the article stabilization members 214 in the outfeed carrier apparatus 108 allows the article stabilization member 214 to travel to a placement location 220 further downstream to begin forming arrays 114 of articles 10 once articles 10 are available at the article discharge zone 142.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article grouping system capable of forming arrays of articles having a variable number of rows and lanes, the article grouping system comprising:
   an infeed carrier apparatus having an infeed carrier surface, wherein the infeed carrier surface is movable in a first direction;
   an outfeed carrier apparatus having an outfeed carrier surface, wherein the outfeed carrier surface is movable in a second direction;
   a grouping apparatus comprising a plurality of carriages and a carriage drive mechanism operatively connected with each carriage, wherein each carriage comprises a base and a plurality of support members operatively connected with the base to define a plurality of article receiving compartments for receiving individual articles, wherein each article receiving compartment is defined by a compartment width extending between adjacent support members, wherein the carriage drive mechanism causes a carriage to independently move in a third direction from an article receiving zone adjacent to the infeed carrier apparatus to an article discharge zone adjacent to the outfeed carrier apparatus, wherein a portion of the grouping apparatus is positioned intermediate the infeed carrier apparatus and the outfeed carrier apparatus, wherein each carriage is adjustable from a first configuration to a second configuration, wherein in the first configuration the compartment width is defined a first length, wherein in the second configuration the compartment width is defined by a second length, wherein the first length is different from the second length in order to receive articles of different dimensions; and a transfer apparatus comprising a frame and an article stabilization member operatively connected with the frame, wherein the article stabilization member moves from an engaging location in the article discharge zone to a variable placement location on the outfeed carrier apparatus and back to the engaging location such that spacing between rows is adjustable.

2. The article grouping system of claim 1, wherein the article stabilization member is configured to engage one or more articles disposed on one or more carriages in the article discharge zone and move the one or more articles onto the outfeed carrier apparatus while controlling a second-directional position of the one or more articles, wherein the number of articles that the article stabilization member engages is not an integer divisor of the number of article receiving compartments of the one or more carriages in the article discharge zone.

3. The article grouping system of claim 2, wherein adjacent rows of articles in an array are spaced apart in the second direction by a row spacing and adjacent rows of articles in different arrays are spaced apart in the second direction by an array spacing, wherein the row spacing and the array spacing are different.

4. The article grouping system of claim 1, wherein the transfer apparatus further comprises a second article stabilization member, wherein the second article stabilization member moves from the engaging location in the article discharge zone to a variable placement location on the outfeed carrier apparatus, wherein the first and second article stabilization members move substantially out of phase.

5. The article grouping system of claim 1, wherein the first and second directions are orthogonal to the third direction.

6. The article grouping system of claim 1, wherein the carriage drive mechanism indexes each carriage through the article receiving zone.

7. The article grouping system of claim 1, further comprising a sensor that is configured to sense the position of an article on the infeed carrier surface before the article is received by a carriage.

8. A method of grouping articles of manufacture into a predetermined array having at least one row and at least one lane, the method comprising the steps of:
a) advancing a plurality of articles in a first direction on an infeed carrier apparatus to an article receiving zone, wherein the articles are disposed in a single lane in the first direction and spaced apart from each other;
b) providing a plurality of carriages for receiving the articles, the carriages having a base and a plurality of support members that combine to define a plurality of article receiving compartments for receiving individual articles, wherein the article receiving compartments are each defined by a compartment width extending in the second direction;
c) sensing the location of an article on the infeed carrier surface;
d) receiving articles into each carriage one at a time and moving each carriage in a second direction a predetermined distance after each article is received by the carriage, wherein timing of the movement of each carriage in the second direction is based on the position of the most downstream article on the infeed carrier surface;
e) moving each carriage once filled with a plurality of articles in the second direction to an article discharge zone;
f) transferring articles from one or more of the plurality of carriages at a first placement location on an outfeed carrier apparatus to form a first row of articles, the number of articles offloaded equaling the number of lanes of the row;
g) moving the first row of articles in a third direction away from the article discharge zone on the outfeed carrier apparatus;
h) moving the plurality of carriages such that a plurality of articles are located in the article discharge zone;
i) transferring a second row of articles from one or more of the plurality of carriages onto a second placement location of the outfeed carrier apparatus that is adjacent to the first row of articles to form an array of articles, wherein the second placement location is different from the first placement location; and
j) optionally repeating steps c-i until the predetermined number of rows in the array of articles has been provided on the outfeed carrier apparatus.

9. The method of grouping articles of claim 8, wherein the number of articles in the first row of articles is not an integer divisor of the number of article receiving compartments of the one or more plurality carriages that the articles were transferred from.

10. The method of grouping articles of claim 8, wherein each carriage is adjustable from a first configuration to a second configuration, wherein in the first configuration the compartment width is defined a first length, wherein in the second configuration the compartment width is defined by a second length, wherein the first length is different from the second length in order to receive articles of different dimensions.

11. The method of grouping articles of claim 8 further comprising the steps of:
moving the second row of articles away from the article discharge zone on the outfeed carrier apparatus;
moving the plurality of carriages such that at least one article is located in the article discharge zone; and
transferring a third row of articles from one or more of the plurality of carriages onto a third placement location that is spaced apart from the second placement location on the carrier apparatus to form a second array of articles.

12. The method of grouping articles of claim 8, wherein the step of transferring at least one article from one or more of the plurality of carriages onto the first placement location on the outfeed carrier apparatus further comprises transferring articles from two carriages onto the first placement location on the outfeed carrier apparatus.

13. The method of grouping articles of claim 8, wherein the velocity of the outfeed carrier apparatus is variable.

14. The method of grouping articles of claim 8 further comprising the step of matching the velocity of the article and the velocity of the outfeed carrier apparatus.

15. The method of grouping articles of claim 8 further comprising the step of controlling the third-directional position of each article in the first row of articles as the article moves in the third direction on the outfeed carrier apparatus.

16. The method of grouping articles of claim 8, further comprising the steps of:
  decreasing the outfeed carrier surface velocity; and
  adjusting the second placement location such that the first and second rows of articles are spaced apart by a predetermined row spacing.

17. A method of grouping a plurality of articles into an array, wherein the plurality of the articles are received from an infeed carrier apparatus in a single lane and discharged onto an outfeed carrier apparatus in multiple lanes, the method comprising the steps of:
  a) providing a grouping apparatus comprising a first carriage, a second carriage, a third carriage, and a fourth carriage, wherein the first, second, third, and fourth carriages are operably engaged with the grouping apparatus, wherein the first, second, third, and fourth carriages each have a base and a plurality of support members that combine to define a plurality of article receiving compartments for receiving individual articles, wherein the article receiving compartments are each defined by a compartment width extending in the first direction, wherein the first, second, third, and fourth carriages are configured to advance in a first direction about an endless loop, wherein a portion of the grouping apparatus is positioned between the infeed carrier apparatus and the outfeed carrier apparatus;
  b) sensing the location of an article on the infeed carrier apparatus;
  c) indexing the first carriage in the first direction proximate to the infeed carrier apparatus in an article receiving zone to intermittently receive at least one article onto the first carriage, wherein timing of indexing the first carriage in the first direction is based on the position of the most downstream article on the infeed carrier apparatus;
  d) moving the at least one article on the first carriage in the first direction toward the outfeed carrier apparatus;
  e) indexing the second carriage in the first direction proximate to the infeed carrier apparatus in the article receiving zone to intermittently load at least one article onto the second carriage, wherein timing of indexing the second carriage in the first direction is based on the position of the most downstream article on the infeed carrier apparatus;
  f) transporting the at least one article on the second carriage to the outfeed carrier apparatus;
  g) stopping or decelerating the first carriage proximate to the outfeed carrier apparatus in an article discharge zone;
  h) stopping or decelerating the second carriage adjacent to the first carriage at the article discharge zone;
  i) transferring the at least one article from the first and second carriages onto the outfeed carrier apparatus to form a first row of articles, wherein the number of articles in the first row equals the number of lanes in the first row;
  j) advancing the first row of articles in a second direction on the outfeed carrier apparatus;
  k) indexing the third carriage in the first direction proximate to the infeed carrier in a receiving zone to intermittently load at least one article onto the third carriage;
  l) indexing the fourth carriage in the first direction proximate to the infeed carrier apparatus in the article receiving zone to intermittently load at least one article onto the second carriage; and
  m) transferring the at least one article from the third carriage onto the outfeed carrier apparatus to form a second row of articles adjacent to the first row of articles, wherein the number of articles in the second row equals the number of lanes in the second row, wherein the first and second rows of articles are spaced apart in the second direction by a row spacing.

18. The method of grouping articles of claim 17, wherein the step of indexing the first carriage in the first direction proximate to the infeed carrier apparatus in the article receiving further comprises stopping the first carriage in the first direction and subsequently advancing the first carriage in the first direction as the article advances onto the first carriage.

19. The method of grouping articles of claim 17 further comprising the step of advancing a plurality of articles in a third direction on an infeed carrier surface of the infeed carrier apparatus, wherein the second and third directions are each orthogonal to the first direction.

20. The method of grouping articles of claim 17, wherein the row spacing is variable.

* * * * *